United States Patent
Wigdahl et al.

(10) Patent No.: US 12,439,857 B2
(45) Date of Patent: Oct. 14, 2025

(54) CROP BALE WRAP DELIVERY SYSTEM AND METHOD

(71) Applicant: Deere & Company, Moline, IL (US)

(72) Inventors: Jeffrey S. Wigdahl, Ames, IA (US); Justin E. Hummel, Des Moines, IA (US)

(73) Assignee: Deere & Company, Moline, IL (US)

( * ) Notice: Subject to any disclaimer, the term of this patent is extended or adjusted under 35 U.S.C. 154(b) by 650 days.

(21) Appl. No.: 17/860,534

(22) Filed: Jul. 8, 2022

(65) Prior Publication Data

US 2024/0008414 A1  Jan. 11, 2024

(51) Int. Cl.
*A01F 15/07* (2006.01)

(52) U.S. Cl.
CPC .... *A01F 15/0715* (2013.01); *A01F 2015/076* (2013.01)

(58) Field of Classification Search
CPC ....................................................... A01F 15/07
See application file for complete search history.

(56) References Cited

U.S. PATENT DOCUMENTS

| | | |
|---|---|---|
| 6,370,852 B1 | 4/2002 | Ohlemeyer et al. |
| 7,591,628 B2 | 9/2009 | Noonan et al. |
| 7,694,491 B2 | 4/2010 | Noonan et al. |
| 8,028,499 B2 | 10/2011 | Vlaud |
| 8,087,216 B2 | 1/2012 | Noonan et al. |
| 10,279,940 B2 | 5/2019 | Weber et al. |
| 10,440,894 B2 | 10/2019 | Jacobson et al. |
| 10,440,895 B2 | 10/2019 | Eubanks et al. |
| 10,609,868 B2 | 4/2020 | Hummel et al. |
| 10,791,678 B2 | 10/2020 | Hackert et al. |
| 10,912,257 B2 | 2/2021 | Jacobson et al. |
| 10,980,182 B2 | 4/2021 | Hackert et al. |
| 11,071,254 B2 | 7/2021 | Noonan et al. |
| 11,109,536 B2 | 9/2021 | Goering et al. |
| 2009/0282788 A1* | 11/2009 | McClure ............ A01F 15/0715 53/587 |
| 2014/0290202 A1 | 10/2014 | Wigdahl et al. |
| 2016/0120126 A1 | 5/2016 | Weber |
| 2016/0235007 A1* | 8/2016 | Hoffmann ............ A01F 15/106 |
| 2016/0355292 A1 | 12/2016 | Wigdahl et al. |

(Continued)

OTHER PUBLICATIONS

Turkish Search Report issued in application No. 2023/005598 dated Jul. 29, 2024, 08 pages.

(Continued)

*Primary Examiner* — Paul B Yanchus, III
(74) *Attorney, Agent, or Firm* — Tucker Ellis LLP

(57) ABSTRACT

A crop bale wrap delivery system and method selectively pays out a sheet of wrap at a selectable sheet feed rate selected from a range of sheet feed rates. The wrap delivery system and method selectively pays out a first portion of the wrap onto a rotating crop module at a first sheet feed rate and pays out a second portion of the wrap onto the module at a second sheet feed rate different from the first sheet feed rate. Three or more portions of the wrap may be payed out onto the crop module at three of more differed sheet feed rates that may be selectable by an operator or based on properties of the wrap material or the crop. The wrap feed rate may be a selectable variable or a continuously variable sheet feed rate selected from a range of pay out feeds or feed rates.

21 Claims, 19 Drawing Sheets

(56) References Cited

U.S. PATENT DOCUMENTS

| | | |
|---|---|---|
| 2017/0049058 A1 | 2/2017 | Eubanks et al. |
| 2018/0020620 A1 | 1/2018 | Noonan et al. |
| 2019/0045719 A1 | 2/2019 | Goering et al. |
| 2019/0254235 A1 | 8/2019 | Hackert et al. |
| 2020/0367437 A1 | 11/2020 | Hackert et al. |
| 2021/0068348 A1 | 3/2021 | Wigdahl et al. |
| 2021/0282318 A1 | 9/2021 | Cracraft |
| 2022/0030772 A1 | 2/2022 | Wallestad et al. |

OTHER PUBLICATIONS

Diagnostic Technical Manual 7760 Cotton Picker Diagnosis and Tests dated Jan. 1, 2014, pp. 1, 240-20D-1 through 240-20D-8, 240-20H-1, 240-20H-4, 240-30H15, 245-30-7, 245-BIC-36, 280-1, 280-2 and 280-20-1 through 280-20-12 (28 pages).

* cited by examiner

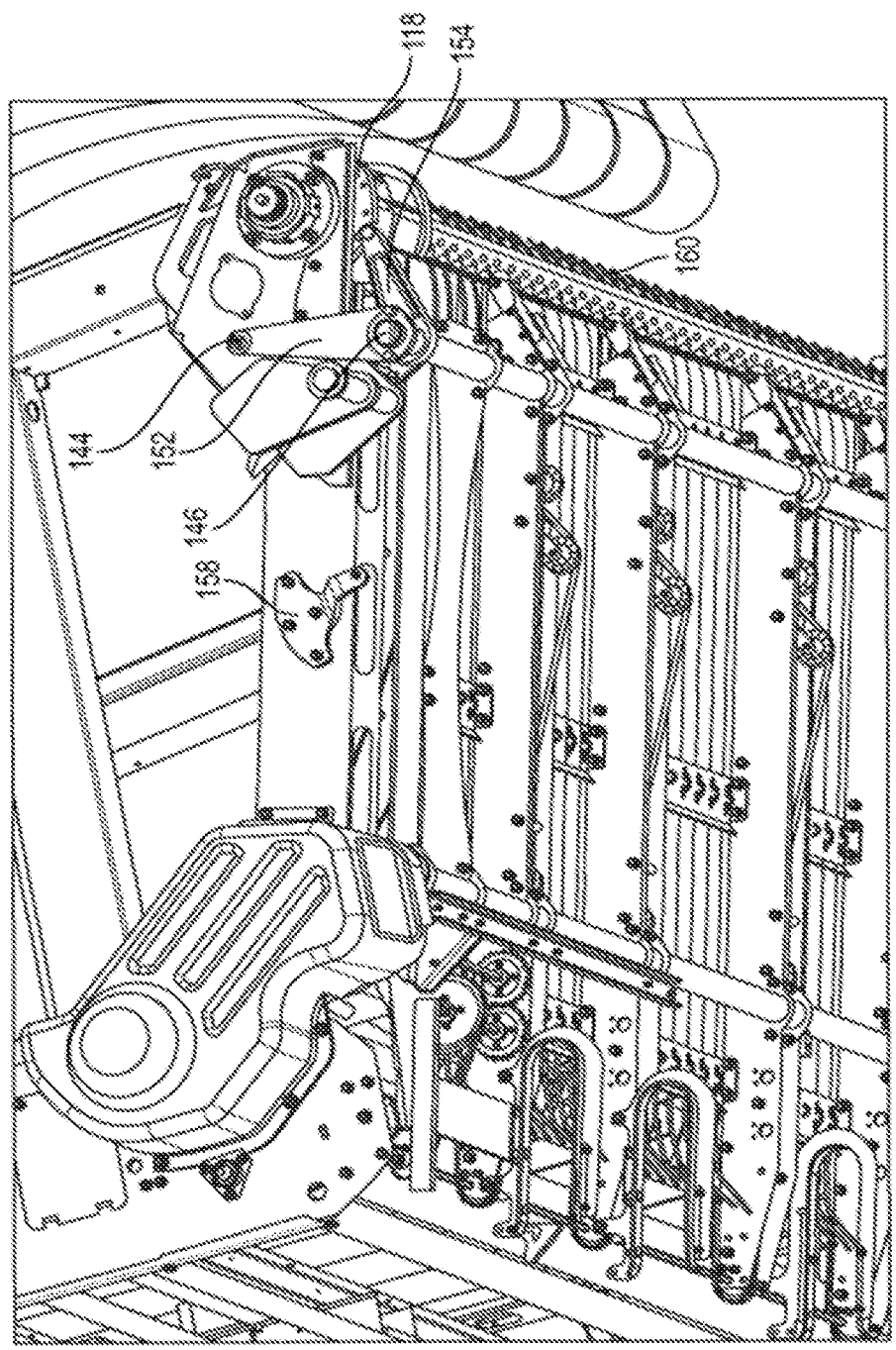

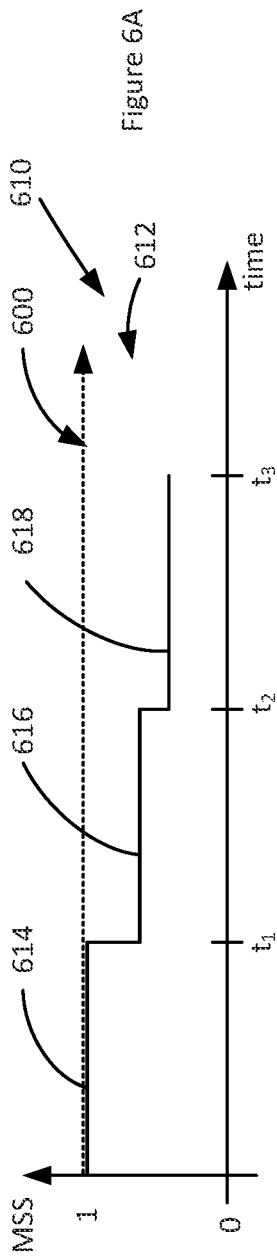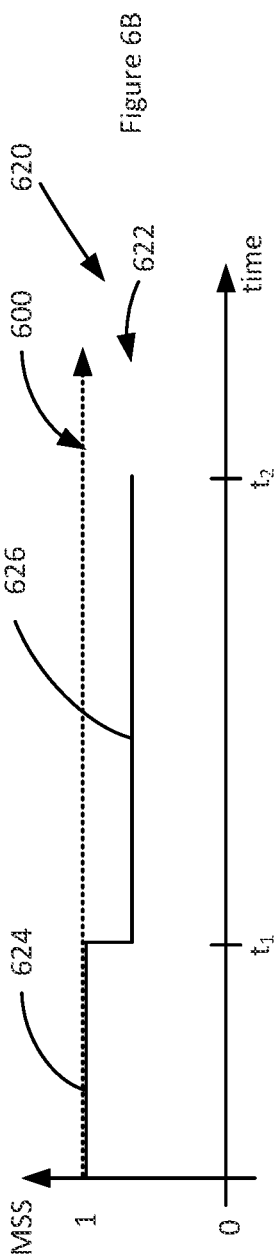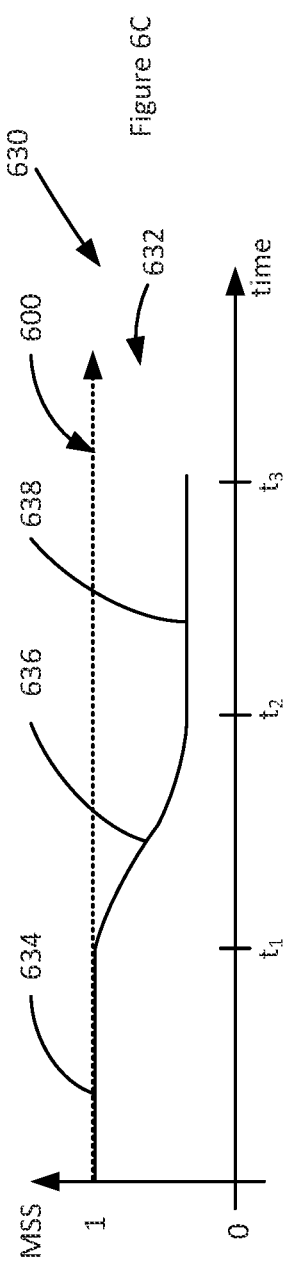

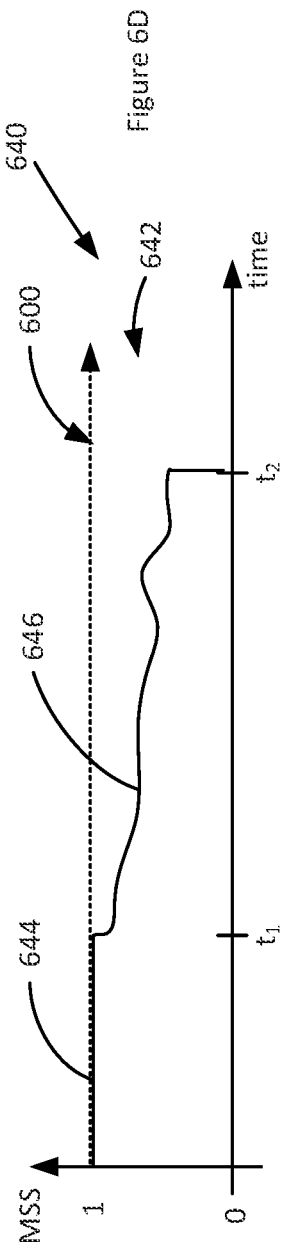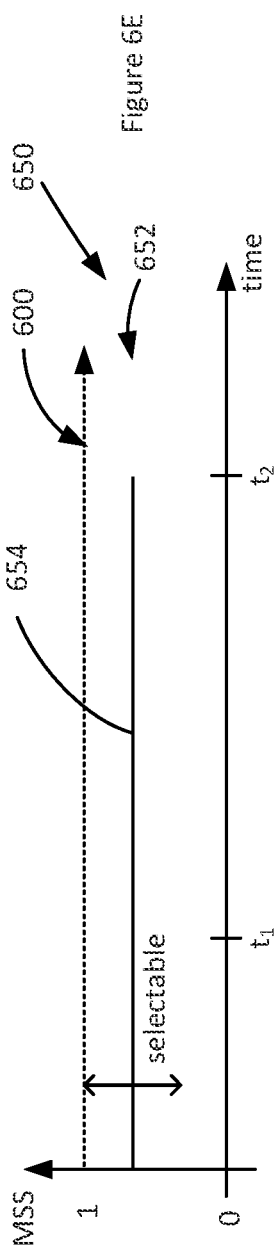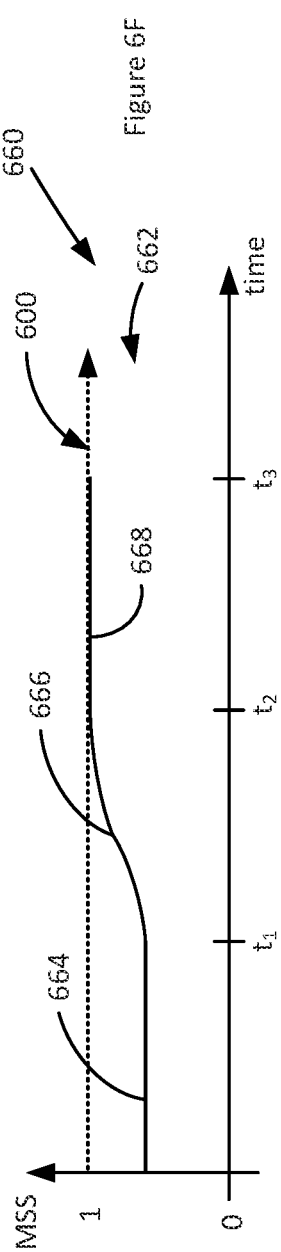

CROP BALE WRAP DELIVERY SYSTEM AND METHOD

FIELD OF THE DISCLOSURE

The present disclosure generally relates to crop baling systems and crop baling methods and, in particular, to systems and methods for delivering an outer covering onto bales of agricultural products. Although the implementations herein will be described in connection with systems and methods delivering sheets of wrap material onto cotton crops formed in round cotton modules, it is to be appreciated that the implementations have broader application including for example to systems and methods delivering covering materials for bundling or otherwise wrapping other items or products and other agricultural crop products such as hay, straw, and the like.

BACKGROUND

Round module builders or balers use belts and rollers to manipulate harvested material into a desired form. Round hay balers and round module builders for cotton both typically use belts extending in parallel under tension running on a series of rollers to compact the harvested material into a cylindrical shape. The belts travel along the rollers to generate a forming chamber wherein the harvested material is collected and formed into the desired shape and density. Once the harvested material is formed to the desired size, a wrap delivery system then delivers a protective and supportive wrap material into the forming chamber to wrap the module with the wrap material prior to ejecting the module from the forming chamber.

The wrap material is typically distributed by the wrap delivery system from a wrap roll positioned adjacent to the forming chamber. The wrap roll is positioned on delivery rollers and the wrap material is fed through the rollers to ultimately enter the forming chamber. Often, two wrap delivery rollers are positioned next to one another to cooperatively pinch the wrap material as it passes there between. The wrap delivery rollers are powered by a mechanical connection with the rollers and/or the driven belts of the module builder, and typically rotate at a speed that is slightly less than the speed of the belts and/or rollers of the module builder resulting in a nominal stretching of the wrap material as it is wrapped onto the harvested material. Plastic wrap material having desired elastic properties have been found to be particularly well suited for this application.

SUMMARY

The crop module builders and balers herein use endless members such as belts for example and rollers to manipulate harvested material into a desired form. Round crop module builders and round balers for cotton operate cooperatively using endless members such as belts under tension running on one or more series of rollers to compact and hold the harvested material into a cylindrical shape. In crop balers that use sheet-type wrap material to hold the harvested material in the cylindrical shape, a rear set of belts are carried on payout rollers that are mechanically driven by a set of gears interacting with a set of further drive members operatively coupled with one or more primary rollers contained in the wrap box of the module builder. The rear set of belts and payout rollers feed wrap material from the baler to the module builder whereat the wrap material is applied onto the harvested material in the cylindrical shape. The payout rollers in the wrap box are driven directly or indirectly by the primary rollers and/or the belts and/or the primary rollers of the module builder that are used to rotate the crop as it is manipulated in the module builder.

The gears are typically coupled with the payout rollers contained in the wrap box of the module builder via an electric clutch that is responsive to an electrical or mechanical signal for operation between disengaged and engaged states. In the disengaged state of the set of gears, the payout rollers and in turn the rear belts are essentially decoupled from the rotational power source such as may be provided by the primary rollers contained in the wrap box of the module builder. In this way, delivery of the sheet-type wrap material from the baler to the module builder may be selectively suspended in order to allow the harvested material is formed in the baler to its desired size and ready for wrapping.

Operation in the disengaged state typically occurs while the crop module is being built up, and is typically terminated when the crop module is fully built up to a desired size whereupon the gears and/or other mechanism(s) are responsive to a state transition of an electrical and/or mechanical control signal to itself transition from the disengaged state to the engaged state wherein the input to the gears is engaged with the payout rollers and in turn the rear belts for feeding the sheet-type wrap material from the baler to the module builder.

After a sufficient amount of wrap material is delivered onto the crop module the control signal sets the output from the gears or other mechanisms back to the disengaged state and also activates a brake causing the payout rollers and rear belts operatively coupled with the output of the gears to cease movement and lock in place to hold the payout rollers and the rear belts stationary. This in turn also causes the sheet-type wrap material held taut between a front nip formed between the moving module builder belts and the crop module on the leading end of the wrap, and a rear nip formed between the payout rollers held stationary to separate the wrap material into single or individual sheets of material at separation zones or the like formed in the sheet-type wrap material. The separation zones may be areas of the wrap material that are connected using an adhesive material that is breakable under appropriate circumstances without destroying the wrap material.

As described, the input of the gears is essentially linked with the belts of the module builder via the primary rollers. In that way, control of the sheet feed rate of the wrap material relative to the surface speed of the crop module rotating in the module builder is controlled by the ratio of the gears. However, sheets of wrap material may have different elastic properties and, in addition, sheets of wrap material may not necessarily have the same uniform elastic properties when used in different temperature extremes. Accordingly, a gear ratio is selected to provide a sheet feed rate that is about 12%-14% less than the surface speed of the crop module rotating in the module builder so that sheets of wrap material having a relatively wide range of elastic properties may be stretched onto the outer round extent of the crop module thereby providing an outer protective and supportive covering onto crop bales.

The crop bale wrap delivery systems and methods described herein pay out or otherwise feed a sheet of wrap material at one or more selectable controlled sheet feed rate(s) relative to rotating crop module selected from a range of sheet feed rates. In that way, the sheet feed rate relative to the surface speed of the rotating crop module may be selected as necessary or desired based on one or more conditions of the environment, one or more conditions of the wrap material, one or more conditions of the crop, one or more conditions of the module builder, or the like.

In still further addition, the crop bale wrap delivery systems and methods herein sense a property of the wrap material and pay out or otherwise feed a sheet of the wrap material at a selectable sheet feed rate relative to rotating crop module selected from a range of sheet feed rates based on the sensed property of the wrap material. In that way, the sheet feed rate may be selected and used as necessary or desired based on one or more conditions of the wrap material such as based on a sensed property of the wrap material, the crop, the module builder, or the like. The sensed property of the wrap material may comprise vendor information data, elastic property information data, or the like.

In still further addition, the crop bale wrap delivery systems and methods herein sense a property of the wrap material and pay out or otherwise feed a sheet of the wrap material at a selectable sheet feed rate relative to rotating crop module selected from a range of sheet feed rates based on the sensed property of the wrap material together with a sensed property of the environment of the wrap delivery system. In that way, the sheet feed rate may be selected and used as necessary or desired based on one or more conditions of the environment and/or of the wrap material such as based on a sensed temperature property of the wrap material, the crop, the module builder, or the like.

For handling sheets of wrap material having properties that vary along a length of the sheet the crop bale wrap delivery systems and methods herein may feed or otherwise pay out or otherwise feed a first portion of a sheet of wrap material at a first sheet feed rate relative to rotating crop module, and pay out a second portion of the sheet of wrap material at a second sheet feed rate relative to rotating crop module, wherein the second feed rate is different from the first sheet feed rate. In that way, the first and second portions of the sheet of wrap material may be layered onto the crop module within the module builder differently as may be necessary or desired based on one or more conditions and/or properties of the wrap material, the crop, the module builder, or the like.

The crop bale wrap delivery systems and method herein pay out or otherwise feed a sheet of wrap material at a selectable variable sheet feed rate relative to rotating crop module selected from a range of pay out or feed rates. In that way, the sheet feed rate may be varied as necessary or desired based on one or more conditions and/or properties of the environment, the wrap material, the crop, the module builder, or the like.

The crop bale wrap delivery systems and method herein pay out or otherwise feed a sheet of wrap material at a selectable continuously variable sheet feed rate relative to rotating crop module selected from a range of pay out or feed rates. In that way, the sheet feed rate may be continuously varied as necessary or desired based on one or more conditions and/or properties of the environment, the wrap material, the crop, the module builder, or the like.

The implementations herein provide a crop bale wrap delivery system and method for supplying wrap material to an associated baler rotating an agricultural product module using an endless member moving at a bale forming rate.

In an implementation, the delivery system and method pays out a sheet of wrap material at a sheet feed rate relative to rotating crop module that is based on one or more properties of the sheet material wherein different wrap materials having different properties are paid out at different sheet feed rates. In an implementation, the wrap material is an extensible paper wrap material having a selected elastic property. In an implementation, the wrap material is a plastic wrap material having a selected elastic property.

In an implementation, the delivery system and method supplies wrap material to an associated baler rotating an agricultural product module using an endless member moving at a bale forming rate by directing a leading end of the wrap material to a nip formed between the rotating agricultural product module and the moving endless member, and delivering the wrap material to the nip at a feed rate relative to the bale forming rate to transfer the wrap material onto the rotating agricultural product module under a desired wrap condition. In an implementation, the wrap material is an extensible paper wrap material having a selected elastic property. In an implementation, the wrap material is a plastic wrap material having a selected elastic property.

In an implementation, the delivery system and method supplies wrap material to an associated baler rotating an agricultural product module using an endless member moving at a bale forming rate by sensing a property of the wrap material, directing a leading end of the wrap material to a nip formed between the rotating agricultural product module and the moving endless member, and delivering the wrap material to the nip at a feed rate relative to the bale forming rate that is selected based on the sensed property of the wrap material to transfer the wrap material onto the rotating agricultural product module under a desired wrap condition. In an implementation, the wrap material is an extensible paper wrap material having a selected elastic property. In an implementation, the wrap material is a plastic wrap material having a selected elastic property.

In an implementation, the delivery system and method pays out a first portion of a sheet of wrap material at a first sheet feed rate and pays out a second portion of the sheet of wrap material at a second feed rate. In an implementation, the first sheet feed rate is different than the second sheet feed rate. In an implementation, the first and second sheet feed rates are the same. In an implementation, the first and second portions of the sheet of wrap material comprise different materials. In an implementation, the first and second portions of the sheet of wrap material comprise the same material.

In an implementation, the first and second portions of the sheet of wrap material comprise materials having different elastic properties.

In an implementation, the first portion of the sheet of wrap material comprises an extensible paper material, and the second portion of the sheet of wrap material comprises a plastic material. In an implementation, the first portion of the sheet of wrap material comprises an extensible paper material such as crepe paper or the like or a paper-like material having similar desired properties.

The implementations herein provide a crop bale wrap delivery system and method that pays out a sheet of wrap material at a one or more selectable sheet feed rate(s) relative to rotating crop module selected from a range of sheet feed rates.

The implementations herein further provide a crop bale wrap delivery system and method that pays out a first portion of a sheet of wrap material at a first sheet feed rate relative to rotating crop module and that pays out a second portion of the sheet of wrap material at a second sheet feed rate relative to rotating crop module different from the first sheet feed rate.

The implementations herein further provide a crop bale wrap delivery system and method that pays out a sheet of wrap material at a selectable variable sheet feed rate relative to rotating crop module selected from a range of pay out or feed rates.

The implementations herein further provide a crop bale wrap delivery system and method that pays out a sheet of wrap material at a selectable continuously variable sheet feed rate relative to rotating crop module selected from a range of pay out or feed rates.

In an aspect, a method is provided for supplying wrap material to an associated baler rotating an agricultural product module using an endless member moving at a bale forming rate. The method includes directing a leading end of the wrap material to a nip formed between the rotating agricultural product module and the moving endless member. The method further includes delivering a first portion of the wrap material to the nip at a first feed rate relative to the bale forming rate to transfer the first portion of the wrap material onto the rotating agricultural product module under a first wrap condition. The method further includes delivering a second portion of the wrap material to the nip at a second feed rate relative to the bale forming rate to transfer the second portion of the wrap material onto the rotating agricultural product module under a second wrap condition different than the first wrap condition. In accordance with an aspect, the first and second materials are different materials.

In a further aspect, a wrap delivery system is provided for controlling delivery of a sheet of wrap material from a wrap roll hopper of an associated harvester to a module builder of the associated harvester. The wrap delivery system includes a sheet drive system and a wrap delivery control module operably coupled with the sheet drive system. The sheet drive system of the wrap delivery system includes an output member configured to drive an associated wrap feed mechanism of the associated harvester engaged with the wrap material, and a drive mechanism configured to operate the output member responsive to a feed control signal to pay out the sheet of the wrap material from the wrap roll hopper. The wrap delivery control module of the wrap delivery system includes an output circuit operable to generate the feed control signal for controlling the sheet drive system to pay out the sheet of the wrap material from the wrap roll hopper at a one or more selectable sheet feed rate(s) selected from a range of sheet feed rates. This is useful to adjust for environmental conditions that may affect the mechanical properties of the sheet of wrap material such as for example temperature and/or humidity. One or more of a temperature sensor and/or a humidity sensor 134 provides respective one or more environmental feedback signal(s) 136 to the wrap delivery control module for generating appropriate feed control signal via the output circuit for controlling the sheet drive system to pay out the sheet of the wrap material from the wrap roll hopper at the one or more selectable sheet feed rate(s) based on the sensed environmental conditions.

In a further aspect, a wrap delivery system is provided for controlling delivery of a sheet of wrap material from a wrap roll hopper of an associated harvester to a module builder of the associated harvester. The wrap delivery system includes a sheet drive system and a wrap delivery control module operably coupled with the sheet drive system. The sheet drive system of the wrap delivery system includes an output member configured to drive an associated wrap feed mechanism of the associated harvester engaged with the wrap material, and a drive mechanism configured to operate the output member responsive to a feed control signal to pay out the sheet of the wrap material from the wrap roll hopper. The wrap delivery control module of the wrap delivery system includes an output circuit operable to generate the feed control signal for controlling the sheet drive system to: feed or otherwise pay out a first portion of the sheet of the wrap material from the wrap roll hopper at a first sheet feed rate, and feed or otherwise pay out a second portion of the sheet of the wrap material from the wrap roll hopper at a second sheet feed rate different than the first sheet feed rate. This is useful to adjust for sheets of wrap material having elastic properties that may vary along the length and/or width of the sheet for providing various functionalities such as for example inner wrap layer(s) providing an interface between the physical crop and the outer layer(s) of the wrap material, moisture control wrap layers, module edge-conforming wrap layers, and the like. One or more sheet property sensors provides respective one or more sheet property feedback signal(s) to the wrap delivery control module for generating appropriate feed control signal via the output circuit for controlling the sheet drive system to pay out the sheet of the wrap material from the wrap roll hopper at the first and second sheet feed rates. The one or more sheet property sensors may include for example optical and/or magnetic sensors or any other sensors using different modalities to detect information from the sheet of wrap material that differentiates different material properties of the sheet such as for example wrap material having elastic properties that may vary along the length and/or width of the sheet.

In a further aspect, a wrap delivery system is provided for controlling delivery of a sheet of wrap material from a wrap roll hopper of an associated harvester to a module builder of the associated harvester. The wrap delivery system includes a sheet drive system and a wrap delivery control module operably coupled with the sheet drive system. The sheet drive system of the wrap delivery system includes an output member configured to drive an associated wrap feed mechanism of the associated harvester engaged with the wrap material, and a drive mechanism configured to operate the output member responsive to a feed control signal to pay out the sheet of the wrap material from the wrap roll hopper. The wrap delivery control module of the wrap delivery system includes an output circuit operable to generate the feed control signal for controlling the sheet drive system to pay out the sheet of wrap material at a selectable variable sheet feed rate selected from a range of pay out or feed rates. This is useful for providing a smooth transition between different sheet feed rates. In that way sheets that may be sensitive to abrupt changes in tension may be used without damage to the material.

In a further aspect, a wrap delivery system is provided for controlling delivery of a sheet of wrap material from a wrap roll hopper of an associated harvester to a module builder of the associated harvester. The wrap delivery system includes a sheet drive system and a wrap delivery control module operably coupled with the sheet drive system. The sheet drive system of the wrap delivery system includes an output member configured to drive an associated wrap feed mechanism of the associated harvester engaged with the wrap material, and a drive mechanism configured to operate the output member responsive to a feed control signal to pay out the sheet of the wrap material from the wrap roll hopper. The wrap delivery control module of the wrap delivery system includes an output circuit operable to generate the feed control signal for controlling the sheet drive system to pay out the sheet of wrap material at a selectable continuously variable sheet feed rate selected from a range of pay out or feed rates. This is useful for adjusting for possible layering of the wrap onto the agricultural product such as to provide selected different degrees of tightness against the crop in different layers applied to the crop.

It is to be appreciated that in practice the agricultural product comprising a crop module for example is held in a condition of compression in the baler to a greater or lesser extent by the moving endless members. Accordingly, the wrap delivery system delivering wrap material to the nip between the crop module and the endless belts at a sheet feed rate that is less than the surface speed of the rotating crop module causes the wrap material to be loaded onto the crop module in a pre-stressed condition under tension caused by the relative speed differences thereby beneficially storing energy in the wrap material that is useful to hold the crop module together after it is removed from the endless belt members. The implementations of the various forms of wrap delivery systems and methods described herein advantageously control the delivery of the wrap material to the nip for loading onto the crop module in selectable pre-stressed conditions under various degrees of tension ranging from slight to substantial tension caused by the relative speed differences thereby beneficially storing energy in the wrap material that may be varied as necessary or desired based on one or more conditions and/or properties of the environment, the wrap material, the crop, the module builder, or the like.

Other features and aspects will become apparent by consideration of the detailed description and accompanying drawings.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein:

FIG. 4B is a bottom perspective view of a wrap floor system of the FIG. 3 embodiment.

FIG. 6A is a graph showing selectable sheet feed rates selected from a range of feed rates relative to the surface speed of the round crop module rotating in the module builder of the associated harvester.

FIG. 6B is a graph showing a first sheet feed rate relative to the surface speed of the round crop module rotating in the module builder of the associated harvester applied to a first portion of the sheet and a second sheet feed rate different from the first sheet feed rate relative to the surface speed of the rotating crop module applied to a second portion of the sheet.

FIG. 6C is a graph showing a selectable variable sheet feed rate selected from a range of pay out or feed rates relative to the surface speed of the round crop module rotating in the module builder of the associated harvester applied to a portion of the sheet of wrap material.

FIG. 6D is a graph showing a selectable continuously variable sheet feed rate selected from a range of pay out or feed rates relative to the surface speed of the round crop module rotating in the module builder of the associated harvester applied to a portion of the sheet of wrap material.

FIG. 6E is a graph showing a selectable sheet feed rate selected based on a property of the sheet wrap material from a range of pay out or feed rates relative to the surface speed of the round crop module rotating in the module builder of the associated harvester applied to the sheet of wrap material.

FIG. 6F is a graph showing a selectable variable sheet feed rate selected from a range of pay out or feed rates relative to the surface speed of the round crop module rotating in the module builder of the associated harvester applied to a portion of the sheet of wrap material.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
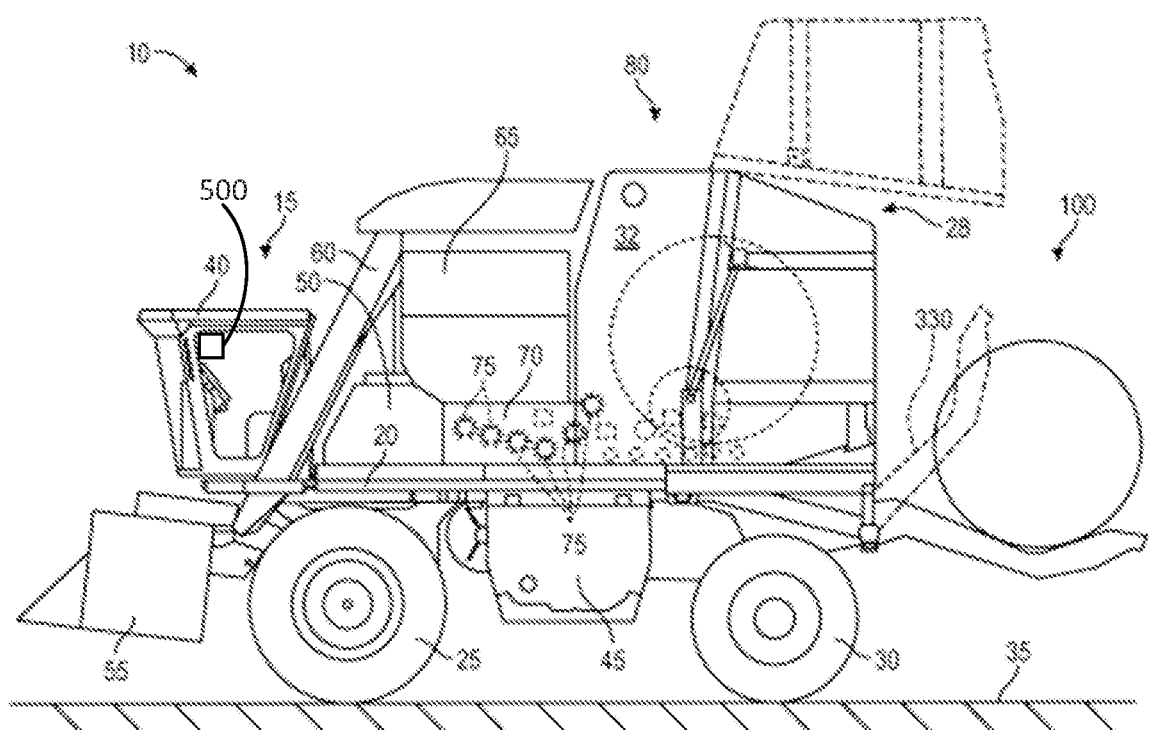
FIG. 1 is a side view of a cotton harvester.

FIG. 1 illustrates a harvester 10 according to one implementation. The illustrated harvester 10 is a cotton harvester 15. Alternatively, the harvester 10 may be any type of work machine that utilizes a wrapping assembly.

The harvester 10 includes a chassis 20. The chassis 20 is supported by front wheels 25 and rear wheels 30. The harvester 10 is adapted for movement through a field 35 to harvest cotton or other crops. An operator station 40 is supported by the chassis 20. A power module 45 may be supported below the chassis 20. The power module 45 may be an electric motor, an internal combustion engine, a motor-generator (MG) pair system, or any other form of system delivering power to the harvester for propulsion and other movement tasks and/or function of the vehicle as may be desired or necessary. Water, lubricant, and fuel tanks, indicated generally at 50, may be supported on the chassis 20.

A harvesting structure 55 is coupleable with the chassis 20. The illustrated harvesting structure 55 of the cotton harvester 15 shown is configured to remove a cotton crop from the field 35. Alternatively, the harvesting structure 55 may be configured to remove other crops and, further alternatively, other harvesting structures may be used to remove the other crops wherein specialized harvesting structures may be used to harvest particular crops. An air duct system 60 is coupleable with the harvesting structure 55, and an accumulator 65 is coupleable with the air duct system 60. The accumulator 65 of the cotton harvester 15 example is configured to receive cotton, or other crops, from the harvesting structure 55 via the air duct system 60. A feeder 70 is coupleable with the chassis 20. The feeder 70 is configured to receive cotton, or other crops, from the accumulator 65. The feeder 70 includes a plurality of rollers 75 configured to transfer the compressed cotton, or other crops, to a round module builder 80. The round module builder 80 has on opposite ends thereof a selectively operable baler gate 28 and a baler front 32. The baler gate 28 is operable pivot to the positon illustrated in the Figure in dashed lines to assist in ejecting the baled crop after it is formed and wrapped in accordance with implementations to be described in greater detail below, and the baler front 32 is configured to receive the crop from the feeder 70.

While a round module builder 80 is shown and described as part of a cotton harvester 15, this disclosure is not limited to such an application of a module builder. More specifically, other implementations considered for this disclosure include, but are not limited to, balers for other types of harvesters, and to pull type round balers for cotton and/or other crops. A pull type round baler may not include a chassis, header, air system, and other components shown on the cotton harvester 15. Rather, the pull behind round baler may have a hitch, wheels, and a crop pickup assembly coupled to the round module builder. A person having skill in the relevant art understands how the teachings of this disclosure can be applied to any round-type baler or module builder and this disclosure is not limited in application to the cotton harvester 15 shown and described herein. In addition, a person having skill in the relevant art understands how the teachings of this disclosure can further be applied to any type of material handling system that wraps gathered materials into a modular form such as products, boxes of products, or the like, that may be stacked and wrapped into a desired modular form for ease of handling, shipping, storage, or the like of the materials.

Figure 2:
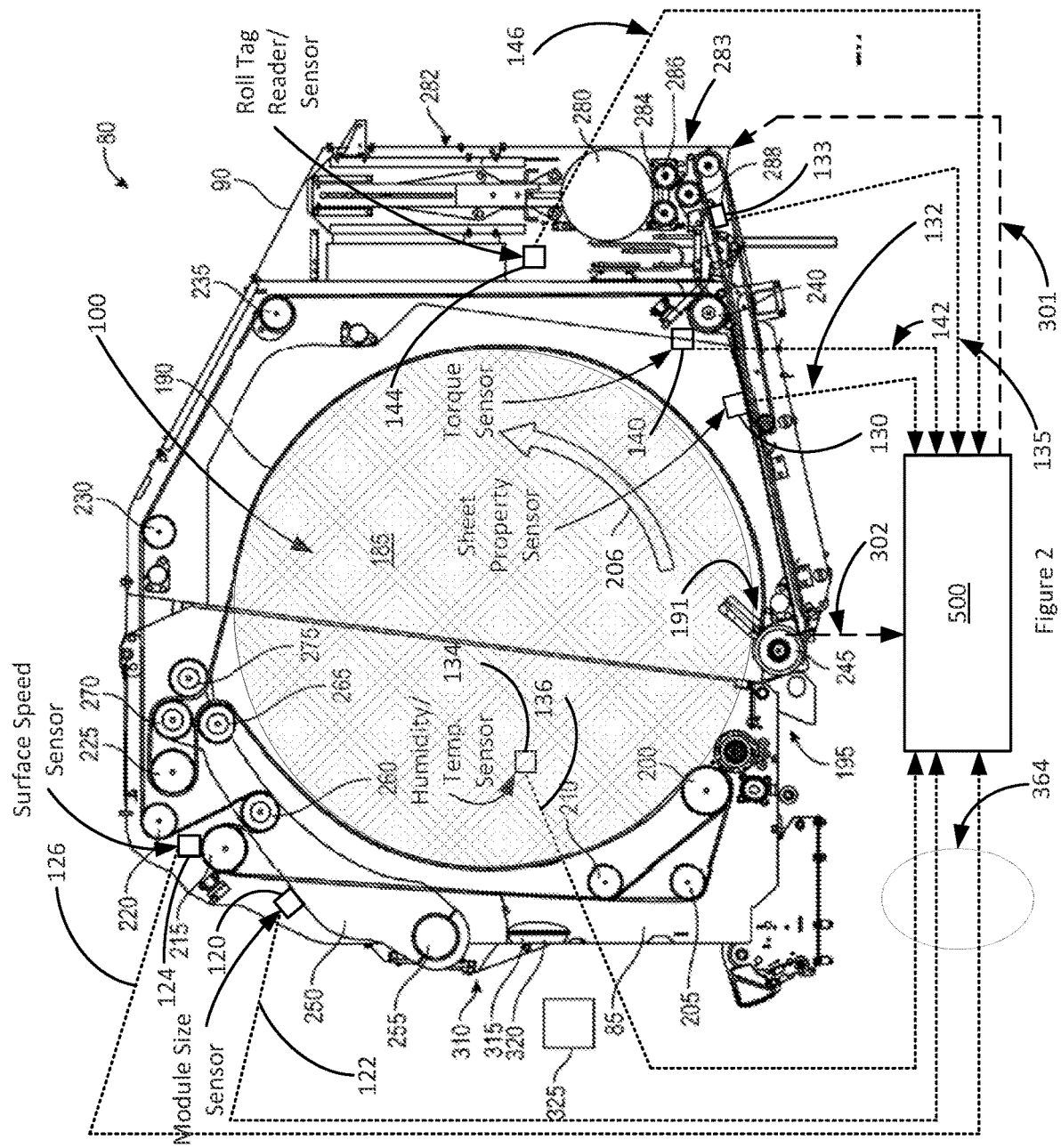
FIG. 2 is a cross-sectional side view of a round module builder and wrapping assembly of the cotton harvester of FIG. 1.

Referring to FIG. 2, a module-forming chamber 185 may have a plurality of endless members 190 such as belts that define a circumference of the module-forming chamber 185. The plurality of endless members 190 such as belts are supported in a side-by-side relationship (into the page as viewed in FIG. 2) across a support roller arrangement comprising a plurality of fixed rollers and a plurality of movable rollers. Specifically, proceeding clockwise from a chamber inlet 195 where crop enters the module-forming chamber 185, the fixed rollers include a lower drive roller 200, a first separation roller 205, a second separation roller 210, an upper drive roller 215, an upper front frame roller 220, an upper rear frame roller 225, an upper front gate roller 230, an upper rear gate roller 235, a lower rear gate roller 240, and a lower front gate roller 245. In the implementation, each of the plurality of fixed rollers 200, 205, 210, 215, 220, 225, 230, 235, 240, and 245 is coupled for rotation within the round module builder 80.

In FIG. 2, a conventional pair of transversely spaced (into the page as viewed in FIG. 2) belt tensioning or rockshaft arms 250 are pivotally mounted to a belt tensioning arm pivot 255. The plurality of movable rollers are generally carried on the belt tensioning or rockshaft arms 250 and comprise a first movable roller 260, a second movable roller 265, a third movable roller 270, and a fourth movable roller 275, which extend between and have opposite ends, respectively, rotatably coupled to the transversely-spaced belt tensioning arms 250. As illustrated, one or more of the fixed rollers are driven to cause the plurality of endless baler members 190 such as belts to be driven, with the drive direction being such as to cause the incoming cotton, or other crop, to travel counterclockwise 206 as it is added as a spiral layer to a growing round module 100. The one or more of the fixed rollers may be driven using a hydraulic or electric motor or by any other drive system as may be necessary or desired including for example by direct or indirect coupling with the power module 45. As the round module 100 grows within the module-forming chamber 185, the transversely spaced belt tensioning or rockshaft arms 250 rotate counterclockwise until a round module 100 (FIG. 1) having a predetermined diameter has been formed in the module-forming chamber 185. A module size sensor 120 is located on or in the area of the rockshaft arms 250 in accordance with an implementation for generating a module size signal 122 representative of the size of the crop module as it is formed. The module size sensor 120 may generate an electric module size signal for example that is representative of the size of the crop module as it is being formed.

A wrapping assembly 90 is disposed along the rear portion of the round module builder 80. As shown, the wrapping assembly 90 houses one or more wrap rolls 280. In the embodiment illustrated in FIG. 2, only one wrap roll 280 is shown positioned in the wrapping assembly 90. However, the wrapping assembly 90 is configured to stack multiple wrap rolls 280 on top of one another within a wrap roll hopper 282. The bottom most wrap roll 280 may rest on a set 283 of mutually spaced apart front and rear carry rollers 284, 286. The front and rear carry rollers 284, 286 may be coupled to a bracket (not particularly shown) that allows the front and rear carry rollers 284, 286 to move along a linear path towards, and away from, a lower wrap roller 288. Although they are shown as having similar size, the rear carrier roller 286 may be sized differently from the front carrier roller 284. In an implementation, one or the other or both of the front and/or rear carry rollers 284, 286 may be powered or unpowered as may be necessary or desired.

The wrap roll 280 may be a sheet of wrap material rolled onto a carrier structure such as a cardboard tube or the like. The wrap material may have various physical properties selected to inexpensively and efficiently cover the exterior circumference of the round module 100, and to hold the harvested material in the desired cylindrical shape after it is wrapped for retaining its shape as it is ejected from the harvester 10 via the baler gate 28 and afterwards such as during collection from the field 35, further handling, transport, etc. In the harvester 10 as shown, the wrap material may transition from the wrap roll 280, partially around the front carry roller 284, between the front carry roller 284 and the lower wrap roller 288, partially around the lower wrap roller 288 and to the lower front gate roll 245. Once the wrap material enters the module forming chamber 185 at the lower front gate roll 245, the wrap material follows the endless baler members 190 such as belts about the circumference of the round module 100 until the outer periphery is substantially covered with the wrap material. During use, a front nip 191 is formed between the moving module builder members 190 such as belts carried on the lower front gate roll 245 and the physical crop module. The forward nip 191 is used to draw the leading end of the wrap material into the module forming chamber 185 and between the rotating physical crop module and the moving module builder members 190 such as belts. In practice, the forward nip 191 draws the leading end of the wrap material into the module forming chamber 185 and between the rotating physical crop module and the moving module builder members 190 at the rate of the rotating crop module. Accordingly, by feeding the wrap material at one or more selected feed rates relative to the surface speed of the rotating crop module, the implementations described herein beneficially store energy in the wrap material by selectively stretching some or all of the wrap material as it is delivered onto the crop via the nip wherein the stretch and resultant energy stored in the wrap material may be varied as necessary or desired and more or less based on one or more conditions and/or properties of the environment, the wrap material, the crop, the module builder, or the like. For hay and forage balers, a cutting assembly (not specifically shown) may then cut the wrap material from the wrap roll and the wrap material may adhere to the round module to substantially maintain its form once ejected from the module forming chamber 185 via the baler gate 28 at the rear of the round module builder 80.

In the illustrated implementation, the wrap material is preferably formed of a plurality of wrapping units that are coupled sequentially to one another such that the trailing edge of a first wrapping unit is releasably attached to the leading edge of a second wrapping unit. In this regard, releasable connections are provided for mutually attached the trailing edges of each leading wrapping unit on the roll 280 with the leading edges of each following wrapping unit on the roll, and so on for each of the plurality of wrapping units carried on the wrap roll 280. The releasable connections essentially provide separation zones between each of the wrapping units carried on the roll 280 so that the wrapping units may be dispatched onto the agricultural product module without the need for using a cutting device or similar mechanism. The separation zones are provided at longitudinally spaced apart locations wherein the longitudinal (along the wrap sheet length) distance between the separation zones is sized for individual portions from the wrap roll 280 to wrap around the module more than once and preferably about three (3) times, and to self-adhere to overlapping layers of the material wound onto the round module 100 to maintain its form once ejected from the module forming chamber 185. In an implementation, the wrap material is formed of a plurality of wrapping units that are formed of an extensible paper material and that are coupled sequentially to one another such that the trailing edge of a first wrapping unit is releasably attached to the leading edge of a second wrapping unit. In an implementation, the wrap material is formed of a plurality of wrapping units that are formed of an elastic plastic material and that are coupled sequentially to one another such that the trailing edge of a first wrapping unit is releasably attached to the leading edge of a second wrapping unit. In an implementation, the wrap material is formed of a plurality of wrapping units that include a first portion formed of a paper material having a selected elastic property and a second portion that is formed of a plastic material having a selected elastic property. In an implementation, the wrap material is formed of a plurality of wrapping units that include a first portion formed of a first paper material having a selected first elastic property and a second portion that is formed of a second paper material having a selected second elastic property that is different than the first elastic property. In an implementation, the wrap material is formed of a plurality of wrapping units that include a first portion formed of a first plastic paper material having a selected first elastic property and a second portion that is formed of a second plastic material having a selected second elastic property that is different than the first elastic property.

Figure 3:
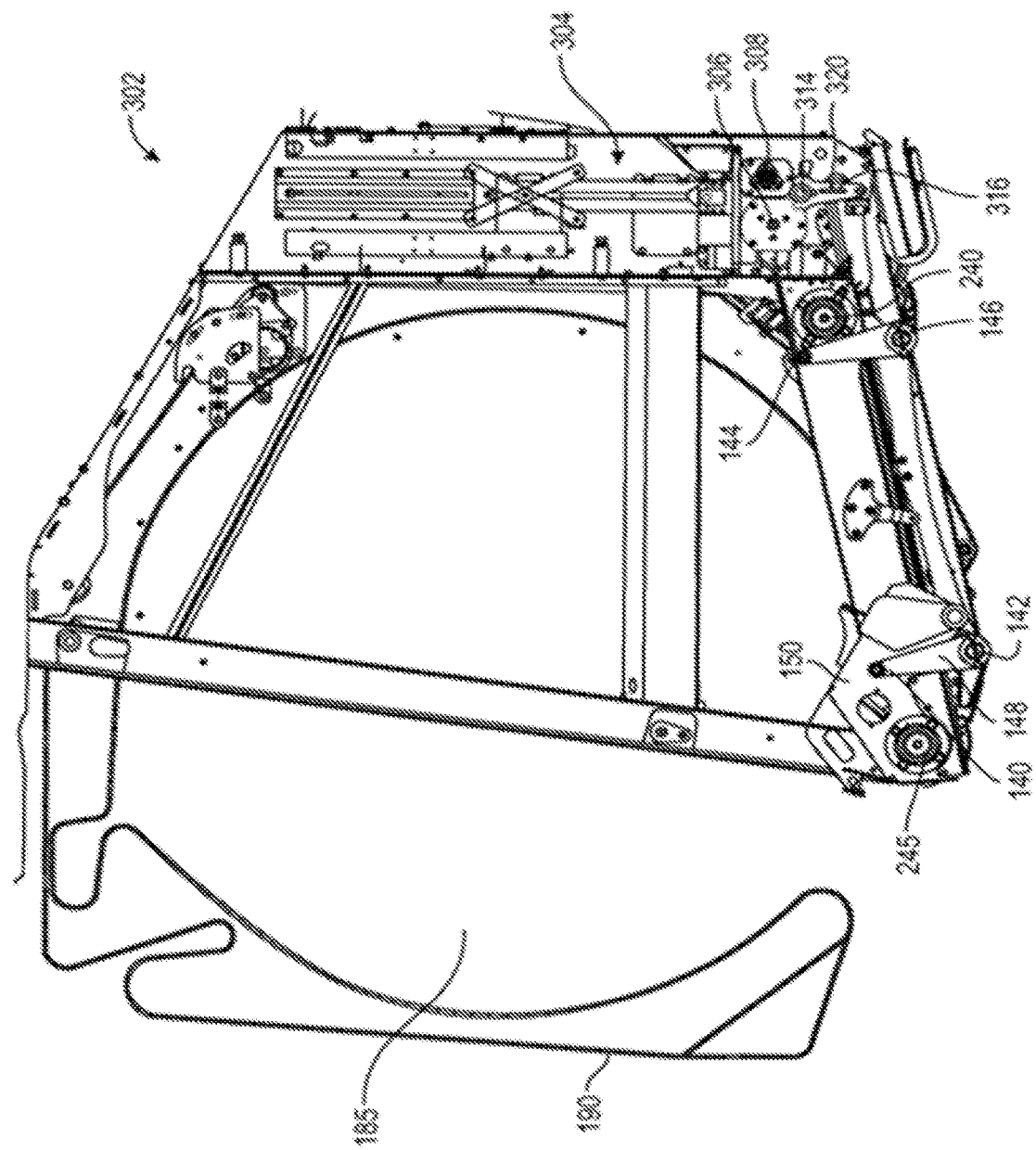
FIG. 3 is a cross-sectional view of a further embodiment of a round module builder and wrapping assembly of the cotton harvester of FIG. 1.
Figure 4A:
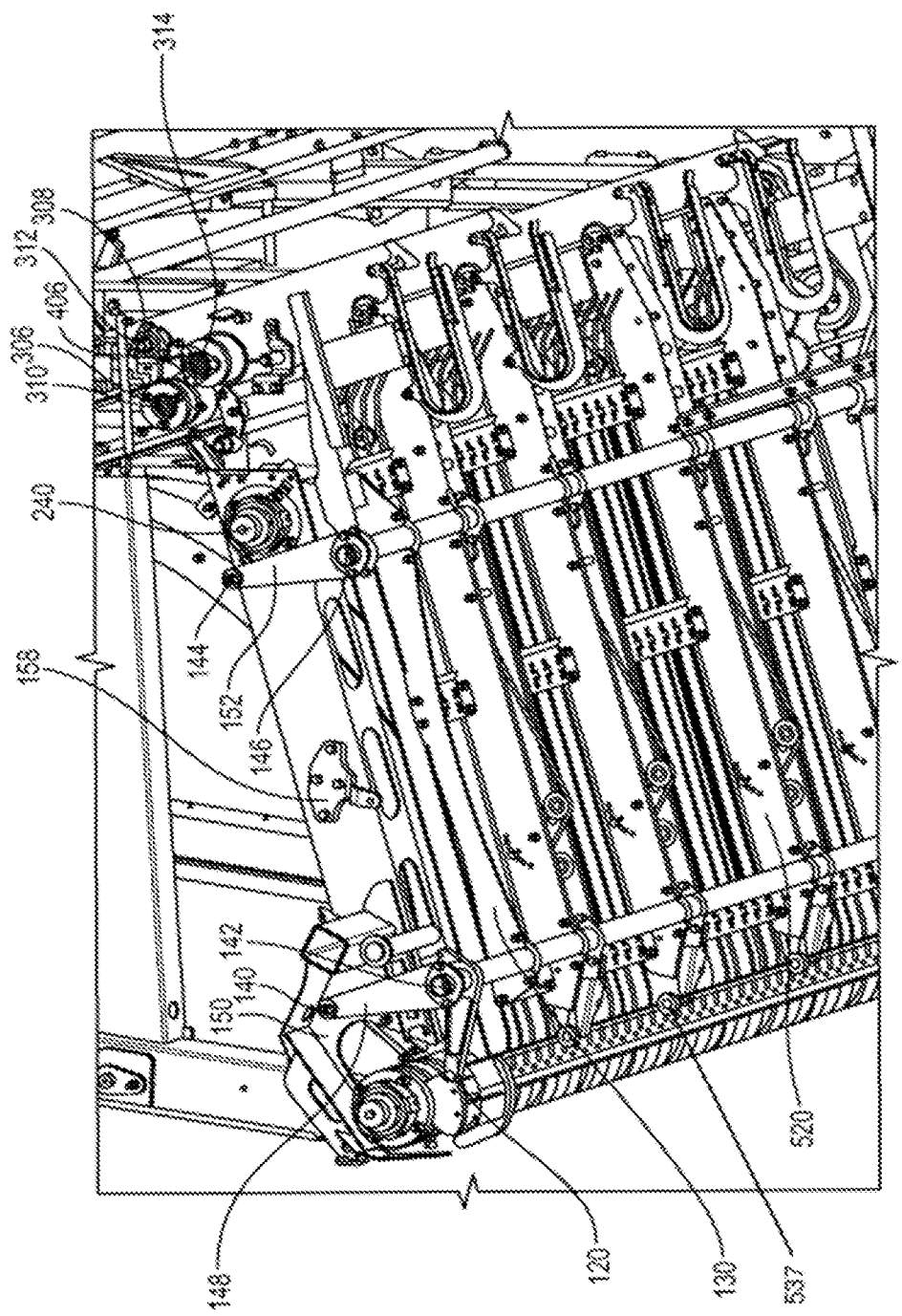
FIG. 4A is a bottom perspective view of a wrap floor system of the FIG. 3 embodiment.

Referring now to FIGS. 3, 4A, and 4Bb, a slightly different implementation of a wrapping assembly 302 is illustrated. More specifically, the wrapping assembly 302 may have a wrap roll hopper 304 similar to the wrap roll hopper 282 described above. The wrap roll hopper 304 may provide for storage for a plurality of wrap rolls (not shown) wherein the bottom-most wrap roll contacts an upper front wrap roller 306 and a carry roller 308. The wrap roll may hold wrap material such as described above rolled onto a carrier structure such as a cardboard tube or the like. The wrap material may have various physical properties selected to inexpensively and efficiently cover the exterior circumference of the round module 100, and to hold the harvested material in the desired cylindrical shape after it is wrapped for retaining its shape as it is ejected from the harvester 10 via the baler gate 28 and afterwards such as during collection from the field further handling, transport, etc. The wrap roll may include a plurality of wrapping units that are coupled sequentially to one another using releasable connections such that the trailing edge of a first wrapping unit is releasably attached to the leading edge of a second wrapping unit. In the illustrated embodiment, both the upper front wrap roller 306 and the carry roller 308 may be rotationally coupled to first and second walls of 32 or 28 (rear, not shown in view of FIG. 3) of the round module builder 80. The upper front wrap roller 306 may be rotationally coupled to the first and second side walls of 32 or 28 about a first axis 310 and the carry roller 308 may be rotationally coupled to the first and second side walls of 32 or 28 about a carry axis 312. Both the first axis 310 and the carry axis 312 may be defined through a fixed portion of the first and second side wall of 32 or 28. The first axis 310 and the carry axis 312 may not move relative to the first and second side walls of 32 or 28 or otherwise relative to the round module builder 80.

The wrapping assembly 302 may also have a lower wrap roller 314 that is positionable adjacent to the upper front wrap roller 306. The lower wrap roller 314 may be rotationally coupled between a first bracket 316 and second bracket 318 (rear, not shown in view of FIG. 3). The first bracket 316 may be pivotally coupled to a first wall of 32 or 28 about a bracket axis 320 and the second bracket may be pivotally coupled to the second wall of 32 about the bracket axis 320.

The lower wrap roller 314 may be pivotal about the bracket axis 320 between a first position (as shown in FIG. 3), and a second position. In the first position, the outer surface of the lower wrap roller 314 may be positioned adjacent to the outer surface of the upper front wrap roller 306. More specifically, in the first position the wrap material may be pinched between the upper front wrap roller 306 and the lower wrap roller 314 at a pinch point 406 (see FIG. 4). Pinching the wrap material between the upper front wrap roller 306 and the lower wrap roller 314 allows the rotation speed of the rollers 306, 314 to partially control the feed speed as is described in more detail below.

In one aspect of the implementation of FIGS. 3, 4A, and 4B, the outer surface of the upper front wrap roller 306 and the outer surface of the lower wrap roller 314 may be coated in a material that grips the wrap material such as rubber or the like. The outer surface of the rollers 306, 314 may then control the feed speed of the wrap material to the lower front gate roll 245 without allowing the wrap material to slip there between. In other words, the outer surface of the rollers 306, 314 may frictionally engage the wrap material as it is pinched between the respective rollers 306, 314 at the pinch point 406 and as it travels from the wrap roll to the module forming chamber 185. In this configuration, the stretch force generated on the wrap material between the lower front gate roll 245 and the lower wrap roller 314 may be insufficient to cause the wrap material to slip between the upper front wrap roller 306 and the lower wrap roller 314.

In one embodiment, a biasing member (not illustrated) such as a spring or the like may be positioned between the first and second bracket 316, 318 and the corresponding first and second walls of 32 or 28 (rear, not shown in view of FIG. 3) to pivot the lower wrap roller 314 about the bracket axis 320 towards the upper front wrap roller 306. The force applied to the brackets 316, 318 (rear, not shown in view of FIG. 3) by the biasing member may increase the pinch force on the wrap material and thereby reduce the likeliness of the wrap material slipping there between during heavy stretch forces.

The biasing member may be any type of spring or the like known in the art and is not limited to any particular type. More specifically, the biasing member may be generated by any type of mechanical, pneumatic, hydraulic, electrical or the like force. In one non-limiting example, the biasing member 402 is a coil spring. In another example, the biasing member is a hydraulic, pneumatic, or electrical actuator. A person having skill in the relevant art understands the many different types of biasing members 402 that can be utilized to bias a pivoting member about an axis and this disclosure is not limited to any particular one.

With continued reference to FIG. 3 and also with reference again to FIG. 2, it is to be appreciated that although the round module itself moves at an overall rotational speed that decreases as the incoming cotton, or other crop, is added as a spiral layer to the growing round module 100, the outer surface speed of the module remains a constant as the module is being formed owing to the module being rotatably driven by the interaction of the plurality of endless members 190 such as belts with the outer circumference of the module. That is, the outer surface speed of the module is, effectively at all times during the module build process, the same as the travelling speed of the plurality of endless members 190 regardless of the diameter of the module as it is being formed. In further addition and after the module is formed and as it is being wrapped, the outer surface speed of the module is, effectively at all times, the same as the travelling speed of the plurality of endless members 190 regardless of the diameter of the module as the module is wrapped. In this regard and as will be described in greater detail below, the wrap material is delivered by a wrap delivery system at a feed rate that is based on the outer surface speed of the module or, equivalently based on the speed of the members 190, wherein the wrap material may be delivered at a feed rate that is the same as the outer surface speed of the module, or at a feed rate that is less than the outer surface speed of the module, or further at a feed rate that is variable relative to the outer surface speed of the module and controlled based on one or more properties of the wrap material that may change in a wrap sheet longitudinal direction (in the plane of the page as viewed in FIG. 2—along the length of the sheet) as it is payed out or otherwise fed for wrapping onto the module. In accordance with an implementation, a module surface speed sensor 124 is located on or in the area of one or more of the rollers such as being operatively coupled with the upper drive roller 215 for generating a module surface speed signal 126 representative of an outer circumferential surface speed of the crop module as it is formed. The module surface speed sensor 124 may generate an electric surface speed signal 126 for example that is representative of the outer circumferential surface speed of the crop module as it is being formed.

In one aspect of the wrapping assemblies 90 illustrated in FIGS. 2 and 3, one or more of the front and rear carry rollers 284, 286 and the lower wrap roller 288 (FIG. 2) and/or the upper front wrap roller 306 and the lower wrap roller 314 (FIG. 3) upper front wrap roller 306 and the lower wrap roller 314 (FIG. 3) may be operatively coupled with wrap delivery system 500 (FIG. 5) and as such the one or more of the front and rear carry rollers 284, 286 may be powered to feed wrap material from the wrap roll 280 to the module forming chamber 185. In an aspect, the one or more of the front and/or rear carry rollers 284, 286 and the lower wrap roller 288 (FIG. 2) or the upper front wrap roller 306 and the lower wrap roller 314 (FIG. 3) may be powered 301 directly and/or indirectly by one or more components of the wrap delivery system 500 as will be described in greater detail below to feed wrap material from the wrap roll 280 to the module forming chamber 185. In a further aspect, the wrap delivery system 500 may itself be powered 302 directly and/or indirectly by one or more components of the module builder 80 such as for example by a connection with the lower front gate roller 245 component. Further, the wrap material may be pinched between the front and rear carry rollers 284, 286 and the lower wrap roller 288 (FIG. 2) or the upper front wrap roller 306 and the lower wrap roller 314 (FIG. 3) as it is fed from the wrap roll 280 to the module forming chamber 185. That is, a rear nip is formed between two or more of the payout rollers 284, 286, 288. In that way the wrap delivery system 500 may not only pay out the wrap material to the module builder 80 in a controlled fashion, but may also be used to selectively hold one or more of the front, rear, and/or lower wrap rollers 284, 286, 288 (FIG. 2) or the upper front wrap roller 306 and the lower wrap roller 314 (FIG. 3) slowed for stretching the wrap material between the wrap delivery system 500 and the nip 191, and motionless for temporarily causing the wrap material feed to cease so that the tension between the material already in the crop module held at the forward nip described above and the pinched material held at the rear nip may be used to decouple the sheet from the next sheet along a separation zone provided at the longitudinally spaced apart locations. The one or more of the front and rear carry rollers 284, 286 and the lower wrap roller 288 (FIG. 2) or the upper front wrap roller 306 and the lower wrap roller 314 (FIG. 3) may be driven by the wrap delivery system 500 of the implementations herein using a hydraulic or electric motor or by any other drive system as may be necessary or desired including for example by direct or indirect coupling with the power module 45 using various clutches and/or gear boxes or the like.

It is to be appreciated that the one or more of the front and rear carry rollers 284, 286 and the lower wrap roller 288 (FIG. 2) or the upper front wrap roller 306 and the lower wrap roller 314 (FIG. 3) may be driven by the wrap delivery system 500 of the implementations herein by essentially applying a counterforce and/or counter torque to the sheet against the drawing force on the sheet occurring at the front or forward nip 191 formed between the moving module builder belts and the crop module on the leading end of the wrap. In various implantations herein the counterforce and/or counter torque applied to the sheet against the drawing force on the sheet may be generated using a hydraulic or electric motor or by any other drive system as may be necessary or desired including for example by direct or indirect coupling with the power module 45 using various clutches and/or gear boxes, brakes such as disc brakes, or the like.

The wrap delivery system 500 in accordance with an implementation operates to selectively deliver the wrap material onto the crop module in the chamber 185 in various stretch conditions including for example in a stretched condition, in various stretched conditions, in various degrees of stretch, in an un-stretched condition, and/or in stretched and un-stretched conditions. In an implementation, a first portion (a leading side) of a wrapping unit of the wrap material may be transferred onto the crop module in an un-stretched condition, and a second portion (a trailing side) of the wrapping unit of the wrap material may be transferred onto the crop module in a stretched condition. In an implementation, the first portion (the leading side) of the wrapping unit of wrap material may be transferred onto the crop module in a stretched condition having first stretching parameters, and the second portion (the trailing side) of the wrapping unit of wrap material may be transferred onto the crop module in a stretched condition having second stretching parameters different than the first stretching parameters. In this regard of the wrapping assembly 90 illustrated in FIGS. 2 and 3 and by way of example, after the lead edge of the sheet (delivered in the un-stretched condition) becomes pinched between the crop module and the endless members 190 such as belts carried on the lower front gate roller 245, the wrap material is stretched as it extends between the lower wrap roller 288 and the lower front gate roll 245. More specifically, one or more of the front and rear carry rollers 284, 286 and the lower wrap roller 288 (FIG. 2) or the upper front wrap roller 306 and the lower wrap roller 314 (FIG. 3) are powered by the wrap delivery system 500 to feed the wrap material from the wrap roll 280 to the module forming chamber 185 at a linear surface speed that is less than the outer surface speed of the round module 100 as it rotates in the module forming chamber 185. In that way the elastic properties of certain wrap materials such as for example those made of a plastic material may be advantageously used to form compressed round crop modules having a desired tight cylindrical shape.

The wrap delivery system 500 in accordance with a further implementation operates to selectively deliver the wrapping units of the wrap material onto the crop module in the chamber 185 in an un-stretched condition or, equivalently, the wrapping units of the wrap material is transferred onto the crop module while holding a minimal amount of tension to keep the material taught during feeding the material. In this regard of the wrapping assembly 90 illustrated in FIGS. 2 and 3, after the lead edge of the sheet (wrapping unit) becomes pinched between the crop module and the endless members 190 such as belts carried on the lower front gate roller 245, the wrap material is not stretched as it extends between the lower wrap roller 288 and the lower front gate roll 245 or between the lower front gate roll 245 and the upper front wrap roller 306 and the lower wrap roller 314. More specifically, one or more of the front and rear carry rollers 284, 286 and the lower wrap roller 288 (FIG. 2) and/or the upper front wrap roller 306 and the lower wrap roller 314 (FIG. 3) are powered by the wrap delivery system 500 to feed the wrap material from the wrap roll 280 to the module forming chamber 185 at a linear surface speed that is the similar to but slightly less than the outer surface speed of the round module 100 as it rotates in the module forming chamber 185. In that way certain wrap materials that are relatively inelastic but that exhibit strength and/or protective properties such as for example those made of a paper material and/or another material that has paper-like properties may be advantageously used to form round crop modules having a desired outer protective layer.

The wrap delivery system 500 in accordance with yet a further implementation operates to deliver a wrap material that is formed by a material having different properties including for example different elasticity properties or that is formed by two or more different materials, each having different properties including for example different elasticity properties. The wrap delivery system 500 in accordance with yet a further implementation operates to deliver the wrap material onto the module 100 in the chamber 185 in an un-stretched condition followed by a stretched condition. In this regard of the wrapping assembly 90 illustrated in FIGS. 2 and 3, a lead end portion (leading side) of a leading side of the wrap material is not stretched as it extends between the lower wrap roller 288 and the lower front gate roll 245 (FIG. 2) or between the lower front gate roll 245 the upper front wrap roller 306 and the lower wrap roller 314 (FIG. 3), and tail end portion (trailing side) of the portion (wrapping unit) of the wrap material is stretched as it extends between the lower wrap roller 288 and the lower front gate roll 245. More specifically, one or more of the front and rear carry rollers 284, 286 and the lower wrap roller 288 (FIG. 2) and/or between the lower wrap roller 288 and the lower front gate roll 245 are powered by the wrap delivery system 500 to initially feed the wrap material from the wrap roll 280 to the module forming chamber 185 at a linear surface speed that is the same as the outer surface speed of the round module 100 as it rotates in the module forming chamber 185, and then to feed the wrap material from the wrap roll 280 to the module forming chamber 185 at a linear surface speed that is less than the outer surface speed of the round module 100 as it rotates in the module forming chamber 185. In that way, portions of the wrap material having different properties such as elastic properties for example may be delivered onto the crop module differently and in accordance with the different properties. In particular and by way of example, the leading side of a wrapping unit of the wrap material that is relatively inelastic but that exhibits strength and/or protective properties such as for example those made of a paper material and/or another material that has paper-like properties may be advantageously used to form a first or inner layer having a desired protective property surrounding the round crop module, and the trailing side of the wrapping unit of the wrap material having elastic properties as for example a portion of the material made of a plastic material may be advantageously used to form one or more outer layers on the module to form compressed round crop modules having a desired tight cylindrical shape. In an implementation, the wrap delivery system 500 delivers the inelastic leading side portion of the wrapping unit (single wrap sheet) onto the crop module in an un-stretched condition, and delivers the elastic portion of the wrapping unit (single wrap sheet) onto the crop module in a stretched condition. In a particular implementation, the wrap delivery system 500 delivers an inner wrap paper portion of the wrap sheet (wrapping unit) onto the crop module in the un-stretched condition, and delivers an outer wrap plastic portion of the wrap sheet (wrapping unit) onto the crop module in a stretched condition layered over the paper portion.

The wrap delivery system 500 in accordance with still yet a further implementation operates to deliver the wrap material onto the module 100 in the chamber 185 in a controlled variable stretch condition as the wrap material is payed out. In this regard of the wrapping assembly 90 illustrated in FIGS. 2 and 3, the stretch of the wrap material as it extends between the lower wrap roller 288 (FIG. 2) or the upper front wrap roller 306 and the lower wrap roller 314 (FIG. 3) and the pinch point between the crop module and the belt 190 carried on the lower front gate roll 245 is controlled based on a desired form of the module in accordance with various properties of the sheet of wrap material that may change along its longitudinal direction. More specifically, one or more of the front and rear carry rollers 284, 286 and the lower wrap roller 288 (FIG. 2) and/or the upper front wrap roller 306 and the lower wrap roller 314 (FIG. 3) are powered by the wrap delivery system 500 to feed the wrap material from the wrap roll 280 to the module forming chamber 185 at a linear surface speed that is controlled relative to the outer surface speed of the round module 100 as it rotates in the module forming chamber 185, wherein the wrap delivery speed is controlled based on the various properties of the sheet of wrap material that may change along its longitudinal direction. In that way, the different portions of the wrap material that have different elastic and/or other properties such as for example protective properties, hydrophilic properties, UV protection and other properties, and the like may be wrapped onto the module using variable tensions as may be necessary and/or desired.

With continued reference to FIGS. 2 and 3, one or more of the rollers 284, 286, 288, 306, 314 may be powered by the wrap delivery system 500 in accordance with the implementations herein operate to send the wrap material toward the lower front gate roll 245 at a feed speed or rate that is controlled by the wrap delivery system 500. The feed speed for at least a portion of the wrap material may be slightly less than the speed required to match the rotation speed of the round module 100. In one non-limiting example, the round module may have a twenty-three foot circumference and thereby require approximately twenty-three linear feet of wrap material per rotation. However, the wrapping assembly 90 may only have a feed speed of twenty-two linear feet per rotation. In this implementation, as the wrap material transitions from the wrap roll 280 to the module forming chamber 185 and onto the crop module, the wrap material is stretched as it moves between the lower wrap roller 288 and/or the rollers 306, 314 and the pinch point between the crop module and the belt 190 carried on the lower front gate roller 245. In addition, the feed speed for at least a portion of the wrap material may be the same as or may match the rotation speed of the round module 100. In one non-limiting example, the round module may have a twenty-three foot circumference and thereby require approximately twenty-three linear feet of wrap material per rotation, and the wrapping assembly 90 may also have a feed speed of twenty-three linear feet per rotation. In this implementation, as the wrap material transitions from the wrap roll 280 to the module forming chamber 185, the wrap material is un-stretched as it moves between the lower wrap roller 288 and/or rollers 306, 314 and the pinch point between the crop module and the belt 190 carried on the lower front gate roller 245.

In further addition, the feed speed for the wrap material may be variably controlled relative to the rotation speed of the round module 100. The feed speed of the wrap material may be variably and/or continuously controlled by the wrap delivery system 500 relative to the rotation speed of the round module 100. In an implementation, the feed speed of the wrap material may be controlled by the wrap delivery system 500 based on an amount of the wrap material payed out. In an implementation, the feed speed of the wrap material may be controlled by the wrap delivery system 500 based on one or more signals received by the wrap delivery system 500 from one or more indicia sensors 110 configured to sense indicia on the wrap material as it is payed out, wherein the indicia on the wrap material is representative of feed speed commands. In one non-limiting example, the round module may have a twenty-three foot circumference and thereby require approximately twenty-three linear feet or less of wrap material per rotation. In this implementation, as the wrap material transitions from the wrap roll 280 to the module forming chamber 185, the wrap material is variably stretched for portions of the wrap material and is un-stretched for other portions of the wrap material as it moves between the lower wrap roller 288 and/or the rollers 306, 314 and the lower front gate roll 245.

Stretching selected portions of the wrap material by the wrap delivery system 500 in accordance with an implementation as it transitions from the wrapping assembly to the module forming chamber 185 may provide for a tightly packed round module 100 that has a high density and therefor transports a large amount of harvested crop. Further, the wrap material may compact the round module 100 so that it maintains the proper form. Further, the wrap material may hold the round module 100 in a compact form imparted by the endless members 190 by resisting expansion of the module after releasing it from the module building portion of the harvester. In that way, the crop module may maintain its desired proper tight and compact form. Properly covering the outer surface of the round module 100 with a plastic wrap material for example may also inhibit moister from penetrating the outer surface of the round module 100.

However, it may be desirable to separate plastic wrapping material from direct contact with the crop, particularly a cotton crop, because of the potential for plastic contamination in post-harvest processes such as for example in cotton ginning processes and also in the cotton dying processes afterwards. Therefore, some portions of the wrap material may be formed of substances other than plastic such as for example reduced risk materials that are less impactful if it becomes cross-contaminated with the crop. More importantly, some portions of the wrap material may be formed of reduced risk substances that are more readily removed from the modules without leaving behind residue that might adversely affect cross-contamination in the various post-harvest processes such as for example in cotton ginning processes. Such reduced risk materials may include innocuous materials such as for example organic materials or synthetic materials formed using natural organic raw materials. Representative examples of such innocuous materials include for example paper or paper-like materials, stiff plastic materials, and other materials for example. It may desirable therefore to wrap the module in as much reduced risk innocuous materials such as much paper material as is reasonably possible for reasons of reducing waste caused by the cross-contamination, while yet using enough stretchable material such as plastic to provide for the desired tightly packed round modules 100 that have a high density and that maintain the proper form and moisture protection.

Since paper and other similar reduced risk innocuous materials wrap materials are not readily amenable to stretching without tearing, those selected portions of the wrap material are delivered by the wrap delivery system 500 in accordance with an implementation in an un-stretched condition as it transitions from the wrapping assembly to the module forming chamber 185. In an implementation, the wrap delivery system 500 delivers the wrap material at the same feed rate as the outer surface speed of the rotating module for portions of the wrap roll that comprise a paper or other non-stretchable material and, further in the implementation, the wrap delivery system 500 delivers the wrap material at a reduced feed rate relative to the outer surface speed of the rotating module for portions of the wrap roll that comprise a plastic or other stretchable material.

Referring back to FIG. 1, after the round module 100 is formed and wrapped, a module handling system 330 may receive the round module 100. The module handling system 330 temporarily supports the round module 100 and then discharges it from the harvester 10.

In operation, the harvester 10 is driven through the field 35 to harvest cotton or other crop. The illustrated harvesting structure 55 picks cotton from cotton plants in the field 35. Alternatively, the harvesting structure 55 may strip the cotton from the cotton plants. Cotton is transferred to the accumulator 65 via the air duct system 60. The accumulator 65 holds the cotton until a predetermined cotton level is reached and then transfers the cotton to the feeder 70. In an exemplary embodiment, the accumulator 65 transfers cotton to the feeder 70 approximately four times for each round module 100 produced. When the feeder 70 receives cotton, the plurality of rollers 75 are activated to distribute the cotton to a feed conveyor belt that transfers the cotton to the round module builder 80. The round module builder 80 uses the endless baler belts 90 to compress the cotton while forming the module 100.

After the round module builder 80 receives compressed cotton, the plurality of endless baler members 190 such as belts rotate the cotton into the round module 100. After the round module builder 80 receives sufficient cotton from the feeder 70 as may be determined for example from the electric module size signal 122 generated by the module size sensor 120 that is representative of the size of the crop module as it is being formed, the round module may be wrapped and the round module 100 can be ejected onto the module handling system 330. The module handling system 330 supports the round module 100 and then discharges it from the harvester 10. The harvester 10 is adapted for movement through a field 35 to harvest cotton.

In one implementation, the outer surface of the upper front carry roller 284, the lower wrap roller 288, the upper front wrap roller 306, and the lower wrap roller 314 may be coated in a material that grips the wrap material such as rubber or the like. The outer surface of the rollers 284, 288, 306, 314 may then control the feed speed of the wrap material to the lower front gate roll 245 without allowing the wrap material to slip there between. In other words, the outer surface of the rollers 284, 288, 306, 314 may frictionally engage the wrap material as it is pinched between the respective rollers 284, 288, 306, 314 at a pinch point therebetween and as it travels from the wrap roll 280 to the module forming chamber 185. In this configuration, the stretch force generated on the wrap material between the lower front gate roll 245 and the lower wrap roller 288 or between the upper front wrap roller 306 and the lower wrap roller 314 may be insufficient to cause the wrap material to slip between the upper front wrap roller 284 and the lower wrap roller 288 or to slip between the upper front wrap roller 306 and the lower wrap roller 314 (FIG. 3).

In one implementation, a biasing member (not illustrated) such as a spring or the like may be positioned between brackets (not shown) to pivot the lower wrap roller 288 and/or the lower wrap roller 314 about an axis towards the upper front wrap roller 284 or towards the upper front wrap roller 306, respectively. The force applied to the rollers by the biasing member may increase the pinch force on the wrap material and thereby reduce the likeliness of the wrap material slipping therebetween during heavy stretch forces.

The biasing member may be any type of spring or the like known in the art and is not limited to any particular type. More specifically, the biasing member may be generated by any type of mechanical, pneumatic, hydraulic, electrical or the like force. In one non-limiting example, the biasing member is a coil spring. In another example, the biasing member is a hydraulic, pneumatic, or electrical actuator. A person having skill in the relevant art understands the many different types of biasing members that can be utilized to bias a pivoting member about an axis and this disclosure is not limited to any particular one.

Figure 5:
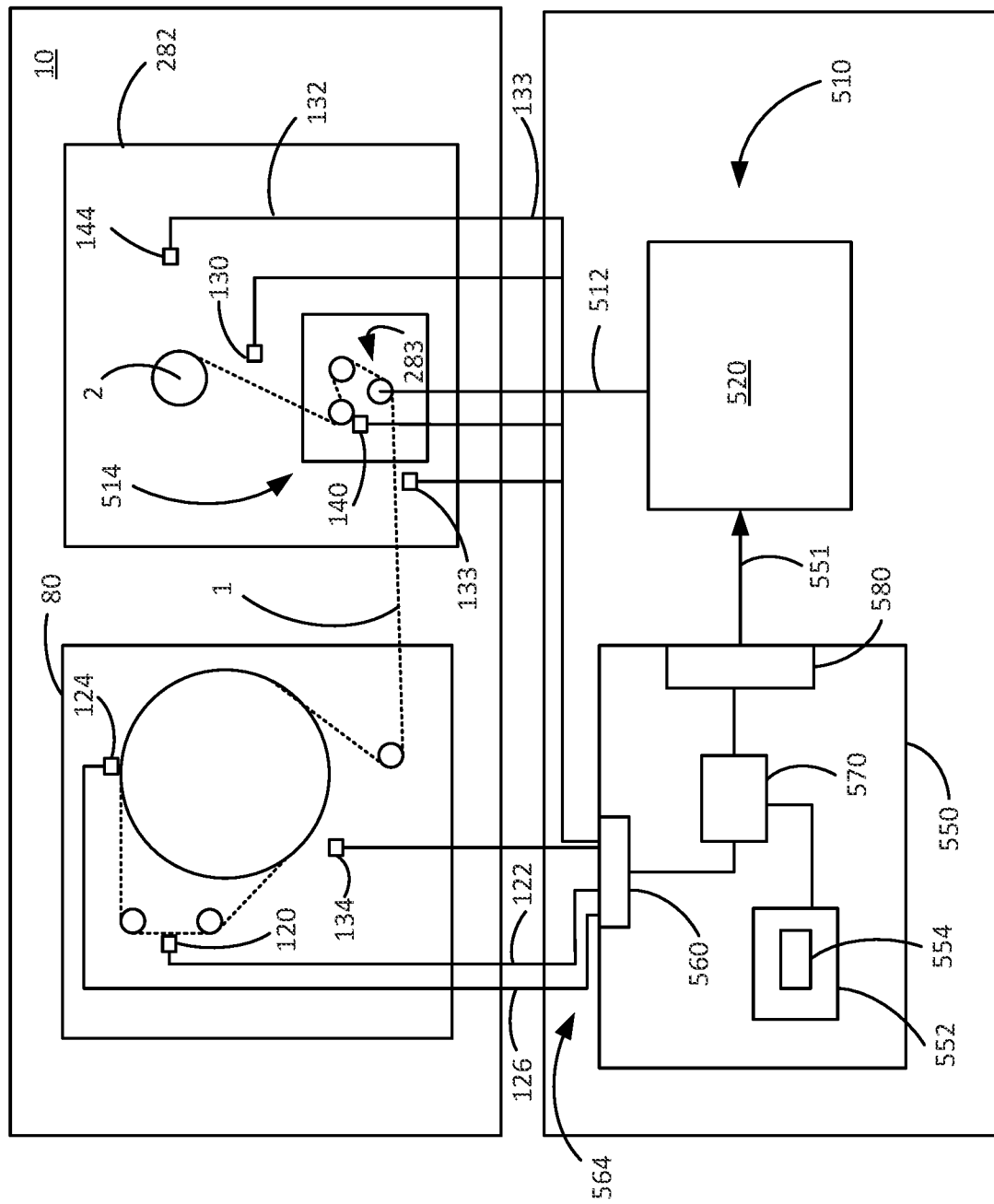
FIG. 5 is a schematic diagram of an example wrap delivery system.

FIG. 5 is a schematic diagram of an implementation of a delivery system 500. The wrap delivery system 500 is operable to control delivery of a sheet 1 of wrap material 2 from a wrap roll hopper 282 of an associated harvester 10 to a module builder 80 of the associated harvester 10. The wrap delivery system 500 of the implementation includes a sheet drive system 510 and a wrap delivery control module 550 operably coupled with the sheet drive system 510. The sheet drive system 510 includes an output member 512 configured to drive an associated wrap feed mechanism 514 of the associated harvester engaged with the wrap material 2, and a drive mechanism 520 configured to operate the output member 512 responsive to a feed control signal 551 to pay out or otherwise feed the sheet 1 (wrapping unit) of the wrap material 2 from the wrap roll hopper 282.

In an implementation, the drive mechanism 520 is an electromechanical apparatus comprising various mechanisms including for example gears, clutches, brakes, pulleys and the like. In a further implementation, the drive mechanism 520 is an electromechanical apparatus comprising one or more electric motors, gears, clutches, brakes, pulleys, transmissions, and the like. However, it is to be appreciated that in alternative implementations the drive mechanism 520 is a hydraulic motor or by any other drive system as may be necessary or desired including for example by direct or indirect coupling with the power module 45. In further alternative implementations the drive mechanism 520 is an electric and/or hydraulic motor in combination with a mechanical and/or hydraulic braking mechanism such as suitably-sized and arranged friction disk brakes or the like for applying counter torque on the sheet as necessary or desired. In still further alternative implementations the drive mechanism 520 is an electric and/or hydraulic motor in combination with a mechanical and/or hydraulic gear system including for example a multiple (>1) speed gear system, a continuously variable transmission (CVT) or any other mechanism for applying counter torque on the sheet as it is pulled by the portion located in the nip 191 (FIG. 2) as necessary or desired.

In an implementation the drive mechanism 520 includes a clutch, a gear mechanism, and an electric motor. The clutch is responsive to a signal to selectively decouple the wrap roller 288 from operative connection with the endless members 190 while a new crop module is being built in the module builder 80 in a free-wheel mode of operation of the drive mechanism 520. After the crop module is built to a sufficient size in the module builder 80 as determined for example from a module size signal 122 representative of the size of the crop module as it is formed received by the wrap delivery control module 550 from the module size sensor 120, the electric motor is activated by the wrap delivery control module 550 to pay out a portion of the wrap material at a feed rate that is nominally the same as or slightly less than the surface speed of the rotating crop module or, equivalently, at a feed rate that is nominally the same as or slightly less than the linear speed of the moving endless members 190. This enables a portion of the wrap material that may be intolerant of stretching to be loaded onto the crop module without breaking. The first portion of the wrap material is added onto the crop module while the wrap roller 288 remains decoupled from operative connection with the endless members 190 in an un-stretched condition. Thereafter, the clutch is responsive to a signal from the wrap delivery control module 550 to selectively couple the wrap roller 288 into operative connection with the endless members 190 thereby driving the wrap roller 288 for feeding the second portion of the wrap material into the nip 191 and onto the crop module. The gear mechanism disposed between the wrap roller 288 and the moving endless members 190 has a gear ratio that set the wrap feed rate relative to the surface speed of the rotating crop preferably to being less than the surface speed thereby laying the wrap material onto the crop module in a stretched condition. After a sufficient amount of wrap material is fed to the nip 191 a brake portion of the clutch is responsive to a signal from the wrap delivery control module 550 to hold the wrap material at a null feed rate thereby enabling separation of the first wrap sheet from the second sheet at a provided separation zone.

In an implementation, the wrap delivery control module 550 includes an output circuit 580 operable to generate the feed control signal 551 for controlling the sheet drive system 510 to pay out the sheet 1 (wrapping unit) of wrap material 2 at a selectable sheet feed rate selected from a range of sheet feed rates. By way of example and with reference to FIG. 6A, a graph 610 showing the sheet feed rate 612 relative to the module surface speed (MSS) 600 is illustrated. The graph is normalized to the MSS. As shown, during the period of time from initialization of sheet movement at t0 to a first time t1 the sheet feed rate 612 is nominally the same 614 as the MSS 600. That is, a first selectable sheet feed rate is nominally the same as the module surface speed. The sheet drive system 510 pays out the sheet 1 of wrap material 2 at a selectable sheet feed rate 616 slightly less than the MSS between the first time t1 and a second time t2. That is, a second selectable sheet feed rate is slightly less than the module surface speed. Similarly, the sheet drive system 510 pays out the sheet 1 of wrap material 2 at a selectable sheet feed rate 618 slightly less than the feed rate 616 and substantially less than the MSS between the second time t2 and a third time t3. That is, a third selectable sheet feed rate is substantially less than the module surface speed. The sheet drive system 510 ceases paying out the sheet 1 of wrap material 2 at the third time t3.

It is to be appreciated that the difference between the module surface speed 600 and the sheet feed rate 612 is representative of a resultant counterforce and/or counter torque applied to the sheet by the wrap delivery system 500 of the implementations herein by essentially applying against the drawing force on the sheet occurring at the front or forward nip formed between the moving module builder belts and the crop module on the leading end of the wrap. In various implantations herein the counterforce and/or counter torque applied to the sheet against the drawing force on the sheet resulting from the crop surface speed and sheet feed rate differences may be generated using a gear system mechanically coupled with one or more mechanisms that motivate the motion of the endless members 190. In various further implantations herein the counterforce and/or counter torque may be generated using a hydraulic or electric motor or by any other drive system as may be necessary or desired including for example by direct or indirect coupling with the power module 45 using various clutches and/or gear boxes or the like. In the implementations the wrap delivery control module 550 is operable to generate the feed control signal 551 via the output circuit 580 the based on one or more of a module surface speed signal 126 received from the module surface speed sensor 124 and/or a feedback torque signal 142 received from a torque sensor 140 or the like.

In FIG. 6A the wrap delivery module 550 is responsive to one or more sensors for controlling the sheet drive system 510 to pay out the sheet 1 of wrap material 2 at a selectable sheet feed rate selected from a range of sheet feed rates. By way of example the one or more sensors may include a sheet property sensor 130 sensing one or more properties of the sheet of wrap material. The sheet property sensor 130 may also sense an amount of the sheet of wrap material payed out. In this regard the sheet property sensor 130 may include a resolver coupled to one or more of the feed rolls 284, 286, 288, 306, 314. The sheet property sensor 130 may sense markings provided on the sheet of wrap material such as markings showing the end of the first portion of the sheet and the start of the second portion of the sheet as it is payed out for applying the selectable second sheet feed rate 616, and markings showing the end of the second portion of the sheet and the start of the third portion of the sheet as it is payed out for applying the selectable third sheet feed rate 618.

As shown in the graph of FIG. 6A, during the period of time from initialization of sheet movement at t0 to a first time t1 the sheet feed rate 612 is nominally the same 614 as the MSS 600. That is, a first selectable sheet feed rate is nominally the same as the module surface speed. This is useful for paying out a leader portion of the wrap sheet that might be relatively inelastic such as paper or stiff plastic leader portion, for example. Some portions of the wrap material may be formed of reduced risk substances that are more readily removed from the modules without leaving behind residue that might adversely affect cross-contamination in the various post-harvest processes such as for example in cotton ginning processes. Such reduced risk materials may include innocuous materials such as for example organic materials or synthetic materials formed using natural organic raw materials. Representative examples of such innocuous materials include for example paper or paper-like materials, stiff plastic materials, and other materials for example. It may desirable therefore to wrap the module in as much reduced risk innocuous materials such as much paper material as is reasonably possible for reasons of reducing waste caused by the cross-contamination, while yet using enough stretchable material such as plastic to provide for the desired tightly packed round modules 100 that have a high density and that maintain the proper form and moisture protection.

Since paper and other similar reduced risk innocuous materials wrap materials are not readily amenable to stretching without tearing, those selected portions of the wrap material are delivered by the wrap delivery system 500 in accordance with an implementation in an un-stretched condition as it transitions from the wrapping assembly to the module forming chamber 185. In an implementation, the wrap delivery system 500 delivers the wrap material at the same feed rate as the outer surface speed of the rotating module for portions of the wrap roll that comprise a paper or other non-stretchable material and, further in the implementation, the wrap delivery system 500 delivers the wrap material at a reduced feed rate relative to the outer surface speed of the rotating module for portions of the wrap roll that comprise a plastic or other stretchable material.

The sheet drive system 510 may then pay out the sheet 1 of wrap material 2 at a selectable sheet feed rate 616 slightly less than the MSS between the first time t1 and a second time t2. That is, a second selectable sheet feed rate is slightly less than the module surface speed. Similarly, the sheet drive system 510 pays out the sheet 1 of wrap material 2 at a selectable sheet feed rate 618 slightly less than the feed rate 616 and substantially less than the MSS between the second time t2 and a third time t3. That is, a third selectable sheet feed rate is substantially less than the module surface speed. This may be used to help to divide the sheets along a separation zone.

In an implementation and with reference next to FIG. 6B, the wrap delivery control module 550 includes an output circuit 580 operable to generate the feed control signal 551 for controlling the sheet drive system 510 to feed or otherwise pay out a first portion of the sheet of wrap material at a first sheet feed rate and to feed or otherwise pay out a second portion of the sheet of wrap material at a second sheet feed rate different from the first sheet feed rate. By way of further example and as shown in FIG. 6B, a graph 620 showing the sheet feed rate 622 relative to the module surface speed (MSS) 600 is illustrated. The graph is normalized to the MSS and shows a first sheet feed rate 624 relative to the surface speed 600 of the round crop module rotating in the module builder of the associated harvester applied to a first portion of the sheet during the period of time from initialization of sheet movement at t0 to a first time t1. The graph 620 further shows a second sheet feed rate 626 different from the first sheet feed rate 624 relative to the surface speed of the rotating crop module 600 applied to a second portion of the sheet between the first time t1 and a second time t2. The sheet drive system 610 ceases paying out the sheet 1 of wrap material 2 at the second time t2.

It is to be appreciated that the difference between the module surface speed 600 and the sheet feed rate 622 is representative of a counterforce and/or counter torque applied to the sheet by the wrap delivery system 500 of the implementations herein by essentially applying against the drawing force on the sheet occurring at the front or forward nip formed between the moving module builder belts and the crop module on the leading end of the wrap. In various implantations herein the counterforce and/or counter torque applied to the sheet against the drawing force on the sheet may be generated using a hydraulic or electric motor or by any other drive system as may be necessary or desired including for example by direct or indirect coupling with the power module 45 using various clutches and/or gear systems or the like. In the implementations the wrap delivery control module 550 is operable to generate the feed control signal 551 via the output circuit 580 the based on one or more of a module surface speed signal 126 received from the module surface speed sensor 124 and/or a feedback torque signal 142 received from a torque sensor 140 or the like.

As mentioned above, since paper and other similar reduced-risk innocuous materials wrap materials are not readily amenable to much stretching without tearing, those selected portions of the wrap material are delivered by the wrap delivery system 500 in accordance with an implementation in a substantially un-stretched condition as it transitions from the wrapping assembly 90 to the module forming chamber 185. In an implementation, the wrap delivery system 500 delivers the wrap material at substantially the same feed rate as the outer surface speed of the rotating module for portions of the wrap roll that comprise a paper or other non-stretchable material and, further in the implementation, the wrap delivery system 500 delivers the wrap material at a reduced feed rate relative to the outer surface speed of the rotating module for portions of the wrap roll that comprise a plastic or other stretchable material. In practice, the wrap delivery system 500 delivers the wrap material at a feed rate that is slightly less than the outer surface speed of the rotating module for portions of the wrap roll that comprise a paper or other non-stretchable material. In that way, the wrap material may be transferred onto the rotating module in a taut condition. In this sense, the paper and other similar reduced-risk innocuous materials wrap materials, although not being readily amenable to much stretching, they are amenable to some amount of stretching without tearing and it is within this range of stretchability that the wrap material may be transferred onto the rotating module to produce the taut placement condition on the crop product. In some implementations the reduced-risk innocuous material portion of the wrap may be readily amenable to stretching without tearing, and those selected portions of the wrap may be delivered by the wrap delivery system 500 in accordance with an implementation in a stretched condition as it transitions from the wrapping assembly 90 to the module forming chamber 185, wherein the wrap delivery system 500 delivers the portion of the wrap formed of that material at a reduced feed rate relative to the outer surface speed of the rotating module.

The system 500 operates to supply wrap material to an associated baler rotating an agricultural product module using an endless member moving at a bale forming rate by directing a leading end of the wrap material to a nip 191 formed between the rotating agricultural product module and the moving endless member, delivering a first portion of the wrap material to the nip 191 at a first feed rate 624 relative to the bale forming rate MSS to transfer the first portion of the wrap material onto the rotating agricultural product module under a first wrap condition, and delivering a second portion of the wrap material to the nip 191 at a second feed rate 626 relative to the bale forming rate MSS to transfer the second portion of the wrap material onto the rotating agricultural product module under a second wrap condition different than the first wrap condition.

In an implementation, the delivering the first portion of the wrap material to the nip 191 at the first feed rate 624 comprises delivering the first portion of the wrap material to the nip at a first feed rate 624 substantially the same as the bale forming rate MSS of the moving endless member, and the delivering the second portion of the wrap material to the nip at the second feed rate comprises delivering the second portion of the wrap material to the nip 191 at a second feed rate 626 different than the bale forming rate MSS of the moving endless member.

In an implementation, the delivering the first portion of the wrap material to the nip at the first feed rate comprises delivering the first portion of the wrap material to the nip at a first feed rate 624 substantially the same as the bale forming rate MSS to transfer the first portion of the wrap material onto the rotating agricultural product module under an un-stretched wrap condition, and the delivering the second portion of the wrap material to the nip at the second feed rate comprises delivering the second portion of the wrap material to the nip 191 at a second feed rate 626 different than the bale forming rate MSS to transfer the second portion of the wrap material onto the rotating agricultural product module under a stretched wrap condition.

In an implementation, the delivering the first portion of the wrap material to the nip comprises delivering the first portion of the wrap material comprising a substantially inelastic material to the nip at the first feed rate substantially the same as the bale forming rate to transfer the substantially inelastic material onto the rotating agricultural product module under the un-stretched wrap condition, and the delivering the second portion of the wrap material to the nip comprises delivering the second portion of the wrap material comprising an elastic material to the nip at the second feed rate different than the bale forming rate to transfer the elastic material onto the rotating agricultural product module under the stretched wrap condition.

In an implementation, the delivering the first portion of the wrap material comprising the substantially inelastic material to the nip comprises delivering a substantially inelastic paper portion of the wrap material to the nip, and the delivering the second portion of the wrap material comprising the elastic material to the nip comprises delivering an elastic plastic portion of the wrap material to the nip.

In an implementation, the delivering the first portion of the wrap material to the nip at the first feed rate comprises delivering the first portion of the wrap material to the nip at a first feed rate relative to the bale forming rate configured to transfer the first portion of the wrap material onto the rotating agricultural product module under an un-stretched wrap condition, and the delivering the second portion of the wrap material to the nip at the second feed rate comprises delivering the second portion of the wrap material to the nip at a second feed rate relative to the bale forming rate configured to transfer the second portion of the wrap material onto the rotating agricultural product module under a stretched wrap condition.

In an implementation, the first feed rate 624 relative to the bale forming rate MSS is different than the second feed rate 626 relative to the bale forming rate MSS.

In an implementation, the difference between the first feed rate 624 and the bale forming rate MSS is less than the difference between the second feed rate and the bale forming rate.

In an implementation, the delivering the first portion of the wrap material to the nip at the first feed rate comprises delivering the first portion of the wrap material to the nip at a first feed rate relative to the bale forming rate configured to transfer the first portion of the wrap material onto the rotating agricultural product module under a stretched wrap condition, and the delivering the second portion of the wrap material to the nip at the second feed rate comprises delivering the second portion of the wrap material to the nip at a second feed rate relative to the bale forming rate configured to transfer the second portion of the wrap material onto the rotating agricultural product module under a stretched wrap condition. In an implementation, the first feed rate is less than bale forming rate. In an implementation, the second feed rate is less than the bale forming rate. In an implementation, the delivering the first portion of the wrap material to the nip comprises delivering an extensible paper portion of the wrap material to the nip, and the delivering the second portion of the wrap material to the nip comprises delivering an elastic plastic portion of the wrap material to the nip.

In an implementation, the first feed rate is substantially the same as the second feed rate as shown in FIG. 6E to be discussed below.

In an implementation, the delivering the first portion of the wrap material comprises delivering a first portion of the wrap material comprising a first material to the nip at the first feed rate relative to the bale forming rate, and the delivering the second portion of the wrap material comprises delivering a second portion of the wrap material comprising a second material to the nip at the second feed rate relative to the bale forming rate.

In an implementation, the delivering the second portion of the wrap material comprising the second material to the nip comprises delivering the second portion of the wrap material comprising a second material different than the first material to the nip.

In an implementation, the wrap delivery control module 550 includes an output circuit 580 operable to generate the feed control signal 551 for controlling the sheet drive system 510 to pay out the sheet 1 of wrap material 2 at a selectable variable sheet feed rate selected from a range of pay out or feed rates. By way of example and with reference to FIG. 6C, a graph 630 showing the sheet feed rate 632 relative to the module surface speed (MSS) 600 is illustrated. The graph is normalized to the MSS and shows a first sheet feed rate 634 relative to the surface speed 600 of the round crop module rotating in the module builder of the associated harvester applied to a first portion of the sheet during the period of time from initialization of sheet movement at t0 to a first time t1. The graph 630 further shows a selectable variable sheet feed rate 636 selected from a range of pay out or feed rates applied to a second portion of the sheet between the first time t1 and a second time t2. The graph further shows a second sheet feed rate 638 relative to the surface speed 600 of the round crop module rotating in the module builder of the associated harvester applied to a third portion of the sheet during a time period between the second time t2 and a third time t3. The sheet drive system 510 ceases paying out the sheet 1 of wrap material 2 at the third time t3.

It is to be appreciated that the difference between the module surface speed 600 and the sheet feed rate 632 is representative of a resultant counterforce and/or counter torque applied to the sheet by the wrap delivery system 500 of the implementations herein by essentially applying against the drawing force on the sheet occurring at the front or forward nip formed between the moving module builder belts and the crop module on the leading end of the wrap. In various implantations herein the counterforce and/or counter torque applied to the sheet against the drawing force on the sheet may be generated using a hydraulic or electric motor or by any other drive system as may be necessary or desired including for example by direct or indirect coupling with the power module 45 using various clutches and/or gear systems or the like. In the implementations the wrap delivery control module 550 is operable to generate the feed control signal 551 via the output circuit 580 the based on one or more of a module surface speed signal 126 received from the module surface speed sensor 124 and/or a feedback torque signal 142 received from a torque sensor 140 or the like.

In an implementation, the wrap delivery control module 550 includes an output circuit 580 operable to generate the feed control signal 551 for controlling the sheet drive system 510 to pay out the sheet 1 of wrap material 2 at a selectable continuously variable sheet feed rate selected from a range of pay out or feed rates. By way of further example and with reference next to FIG. 6D, a graph 640 showing the sheet feed rate 642 relative to the module surface speed (MSS) 600 is illustrated. The graph is normalized to the MSS and shows a first sheet feed rate 644 relative to the surface speed 600 of the round crop module rotating in the module builder of the associated harvester applied to a first portion of the sheet during the period of time from initialization of sheet movement at t0 to a first time t1. The graph 640 further shows a selectable continuously variable sheet feed rate 646 selected from a range of pay out or feed rates applied to a second portion of the sheet between the first time t1 and a second time t2. The sheet drive system 510 ceases paying out the sheet 1 of wrap material 2 at the second time t2.

It is to be appreciated that the difference between the module surface speed 600 and the sheet feed rate 642 is representative of a counterforce and/or counter torque applied to the sheet by the wrap delivery system 500 of the implementations herein by essentially applying against the drawing force on the sheet occurring at the front or forward nip formed between the moving module builder belts and the crop module on the leading end of the wrap. In various implantations herein the counterforce and/or counter torque applied to the sheet against the drawing force on the sheet may be generated using a hydraulic motor, an electric motor, an electromechanical apparatus comprising one or more electric motors, gears, clutches, brakes, pulleys, transmissions, an electric and/or hydraulic motor in combination with a mechanical and/or hydraulic braking mechanism such as suitably-sized and arranged friction disk brakes or the like for applying counter torque on the sheet as necessary or desired. In still further alternative implementations the drive mechanism 520 is an electric and/or hydraulic motor in combination with a mechanical and/or hydraulic gear system including for example a multiple (>1) speed gear system, a continuously variable transmission (CVT) or any other mechanism for applying counter torque on the sheet as it is pulled by the portion located in the nip 191 (FIG. 2) as necessary or desired, or by any other drive system as may be necessary or desired including for example by direct or indirect coupling with the power module 45 using various clutches and/or gear systems or the like. In the implementations the wrap delivery control module 550 is operable to generate the feed control signal 551 via the output circuit 580 the based on one or more of a module surface speed signal 126 received from the module surface speed sensor 124 and/or a feedback torque signal 142 received from a torque sensor 140 or the like.

FIG. 6E is a graph showing a selectable sheet feed rate selected based on a property of the sheet wrap material from a range of pay out or feed rates relative to the surface speed of the round crop module rotating in the module builder of the associated harvester applied to the sheet of wrap material. In FIG. 6E the wrap delivery module 550 is responsive to one or more sensors for controlling the sheet drive system 510 to pay out the sheet 1 of wrap material 2 at a selectable sheet feed rate selected from a range of sheet feed rates. By way of example the one or more sensors may include a sheet property sensor 130 sensing one or more properties of the sheet of wrap material. The sheet property sensor 130 may also sense an amount of the sheet of wrap material payed out. In this regard the sheet property sensor 130 may include a resolver coupled to one or more of the feed rolls 284, 286, 288, 306, 314. The sheet property sensor 130 may sense markings provided on the sheet of wrap material such as markings showing the end of the first portion of the sheet and the start of the second portion of the sheet as it is payed out for applying the selectable second sheet feed rate 616, and markings showing the end of the second portion of the sheet and the start of the third portion of the sheet as it is payed out for applying the selectable third sheet feed rate 618.

The system 500 operates to supply wrap material to an associated baler rotating an agricultural product module using an endless member moving at a bale forming rate by directing a leading end of the wrap material to a nip 191 formed between the rotating agricultural product module and the moving endless member, delivering the wrap material to the nip 191 at a selectable feed rate 654 relative to the bale forming rate MSS to transfer the wrap material onto the rotating agricultural product module under a selected wrap condition.

In an implementation, the delivering the wrap material to the nip 191 at the selected feed rate 654 comprises sensing one or more properties of the wrap material such as by using the sheet property sensor 130, and delivering the wrap material to the nip 191 at a selected feed rate 654 different than the bale forming rate MSS of the moving endless member.

In an implementation, the delivering the wrap material to the nip at the selected feed rate 654 comprises delivering the wrap material to the nip at a selected feed rate relative to the bale forming rate configured to transfer the wrap material onto the rotating agricultural product module under an un-stretched wrap condition.

In an implementation, the delivering the wrap material to the nip at the selected feed rate comprises delivering the wrap material to the nip 191 at a selected feed rate 654 different than the bale forming rate MSS to transfer the second portion of the wrap material onto the rotating agricultural product module under a stretched wrap condition.

In an implementation, the delivering the wrap material comprising the elastic material to the nip comprises delivering an elastic plastic wrap material to the nip.

In an implementation, the delivering the wrap material comprising the elastic material to the nip comprises delivering an expansible paper wrap material to the nip.

In an implementation, the delivering the wrap material to the nip comprises delivering the wrap material comprising an elastic material to the nip at a selected feed rate different than the bale forming rate to transfer the elastic material onto the rotating agricultural product module under the stretched wrap condition.

FIG. 6F is a graph showing a selectable variable sheet feed rate selected from a range of pay out or feed rates relative to the surface speed of the round crop module rotating in the module builder of the associated harvester applied to a portion of the sheet of wrap material. In an implementation, the wrap delivery control module 550 includes an output circuit 580 operable to generate the feed control signal 551 for controlling the sheet drive system 510 to pay out the sheet 1 of wrap material 2 at a selectable variable sheet feed rate selected from a range of pay out or feed rates. By way of example and with reference to FIG. 6F, a graph 660 showing the sheet feed rate 662 relative to the module surface speed (MSS) 600 is illustrated. The graph is normalized to the MSS and shows a first sheet feed rate 664 relative to the surface speed 600 of the round crop module rotating in the module builder of the associated harvester applied to a first portion of the sheet during the period of time from initialization of sheet movement at t0 to a first time t1. The graph 660 further shows a selectable variable sheet feed rate 666 selected from a range of pay out or feed rates applied to a second portion of the sheet between the first time t1 and a second time t2. The graph further shows a second sheet feed rate 668 relative to the surface speed 600 of the round crop module rotating in the module builder of the associated harvester applied to a third portion of the sheet during a time period between the second time t2 and a third time t3. The sheet drive system 510 ceases paying out the sheet 1 of wrap material 2 at the third time t3.

It is to be appreciated that the difference between the module surface speed 600 and the sheet feed rate 662 is representative of a resultant counterforce and/or counter torque applied to the sheet by the wrap delivery system 500 of the implementations herein by essentially applying against the drawing force on the sheet occurring at the front or forward nip formed between the moving module builder belts and the crop module on the leading end of the wrap. In various implantations herein the counterforce and/or counter torque applied to the sheet against the drawing force on the sheet may be generated using a hydraulic or electric motor or by any other drive system as may be necessary or desired including for example by direct or indirect coupling with the power module 45 using various clutches and/or gear systems or the like. In the implementations the wrap delivery control module 550 is operable to generate the feed control signal 551 via the output circuit 580 the based on one or more of a module surface speed signal 126 received from the module surface speed sensor 124 and/or a feedback torque signal 142 received from a torque sensor 140 or the like.

With reference again to FIG. 5, an implementation of a delivery system 500 is shown. The wrap delivery system 500 is operable to control delivery of a sheet 1 (FIGS. 6A-6F) such as a wrapping unit of wrap material 2 from a wrap roll hopper 282 of an associated harvester 10 to a module builder 80 of the associated harvester 10. The wrap delivery system 500 of the implementation includes a sheet drive system 510 and a wrap delivery control module 550 operably coupled with the sheet drive system 510. The sheet drive system 510 includes an output member 512 configured to drive an associated wrap feed mechanism 514 of the associated harvester 10 engaged with the wrap material 2, and a drive mechanism 520 configured to operate the output member 512 responsive to a feed control signal 551 to pay out the sheet 1 of the wrap material 2 from the wrap roll hopper 282. The wrap delivery control module 550 includes an output circuit 580 operable to generate the feed control signal 551 for controlling the sheet drive system 510 to feed or otherwise pay out a first portion 3 of the sheet 1 of the wrap material 2 from the wrap roll hopper 282 at a first sheet feed rate SF1 614, 624, 634, 644, and feed or otherwise pay out a second portion 4 of the sheet 1 of the wrap material 2 from the wrap roll hopper 282 at a second sheet feed rate SF2 616, 626, 636, 646 different than the first sheet feed rate SF1.

In accordance with an implementation the output circuit 580 of the wrap delivery control module 550 is operable to generate the feed control signal 551 for controlling the sheet drive system 510 to pay out the first portion 3 of the sheet 1 of the wrap material 2 from the wrap roll hopper 282 at the first sheet feed rate $SF_1$ 414, 424, 434, 444 matching a surface speed SS of a round module rotating in the module builder 80 of the associated harvester 10, and to pay out the second portion 4 of the sheet 1 of the wrap material 2 from the wrap roll hopper 282 at the second sheet feed rate $SF_2$ 416, 426, 436, 446 mismatching the surface speed SS of a round module rotating in the module builder 80 of the associated harvester 10 for a first portion of the sheet.

In accordance with an implementation the output circuit 580 of the wrap delivery control module 550 is operable to generate the feed control signal 551 for controlling the sheet drive system 510 to pay out the second portion 4 of the sheet 1 of the wrap material 2 from the wrap roll hopper 282 at the second sheet feed rate $SF_2$, wherein the second sheet feed rate $SF_2$ is less than the surface speed SS of the round module rotating in the module builder 80 of the associated harvester 10. Although the implementation described herein by way of example shows the collected crop being formed and wrapped in a module builder, it is to be appreciated that the collected crop may be aggregated and formed into a module or other form for presentation to a wrap delivery system such as the one shown herein by a builder apparatus or other device and is not limited to the specific or any other form of module builder shown and described herein.

In accordance with an implementation the output circuit 580 of the wrap delivery control module 550 is operable to generate the feed control signal 551 for controlling the sheet drive system 510 to sequentially pay out the first portion 3 of the sheet 1 of the wrap material 2 as a leading portion 5 of the sheet 1 at the first sheet feed rate $SF_1$ matching the surface speed SS of the round module, then pay out the second portion 4 of the sheet 1 of the wrap material 2 as a trailing portion 6 of the sheet 1 at the second sheet feed rate $SF_2$ less than the surface speed SS of the round module.

In accordance with an implementation the wrap delivery control module 550 includes an input circuit 560 operable to receive a module property signal 564 representative of a property of the round module rotating in the module builder 80 of the associated harvester 10. In addition, the wrap delivery control module 550 of the implementation is operable to generate the feed control signal 551 based on the received module property signal 564.

In accordance with an implementation the input circuit 560 is operable to receive a module size signal 122 as the module property signal 564, wherein the module size signal 122 is representative of a formed size of the round module rotating in the module builder 80 of the associated harvester 10. In addition, the wrap delivery control module 550 is operable to initiate generation of the feed control signal 551 based on the module size signal 122.

In accordance with an implementation the wrap delivery system 500 further includes a module size sensor 120 operatively coupled with the input circuit 560 of the wrap delivery control module 550. The module size sensor 120 is operable to generate the module size signal 122 as the module property signal 564. The module size signal 122 is representative of a diameter the round module rotating in the module builder 80 of the associated harvester 10. In addition, the wrap delivery control module 550 is operable to initiate generation of the wrap feed control signal 551 based on a predetermined level of the module size signal 122.

In accordance with an implementation the wrap delivery control module 550 of the wrap delivery system 500 includes a memory device 552 storing feed control logic 554, and a processor device 570 operatively coupled with the memory device 552, the input circuit 550, and the input circuit 560. The processor device 570 is operable to execute the feed control logic 554 to generate feed control data based on the module property signal 564. In addition, the output circuit 580 of the wrap delivery control module 550 generates the feed control signal 551 based on the feed control data to pay out the first portion 3 of the sheet 1 of the wrap material 2 at the first sheet feed rate $SF_1$ and pay out the second portion 4 of the sheet 1 of the wrap material 2 at the second sheet feed rate $SF_2$ different than the first sheet feed rate $SF_1$.

In accordance with an implementation the input circuit 550 of the wrap delivery control module 550 is operable to receive a sheet property signal 132 representative of a property of the sheet 1 of wrap material 2, and the wrap delivery control module 550 is operable to generate the feed control signal 551 based on the received sheet property signal 132. In an implementation the sheet property signal 132 may be representative of a property of the sheet 1 of wrap material 2 being an extensible paper wrap material, and the wrap delivery control module 550 is operable to generate the feed control signal 551 based on the received sheet property signal 132 for wrapping the extensible paper wrap material onto the crop module such as shown in FIG. 6E under a controlled stretch condition. In an implementation the sheet property signal 132 may be representative of a property of the sheet 1 of wrap material 2 being an elastic plastic wrap material, and the wrap delivery control module 550 is operable to generate the feed control signal 551 based on the received sheet property signal 132 for wrapping the elastic plastic wrap material onto the crop module such as shown in FIG. 6E under a controlled stretch condition.

In accordance with an implementation the wrap delivery system 500 further includes a sheet property sensor 130 operatively coupled with the input circuit 560 of the wrap delivery control module 550. The sheet property sensor 130 may be disposed anywhere in the system as may be convenient and practical. The sheet property sensor 130 is operable to generate the sheet property signal 132, wherein the sheet property signal 132 is representative of a physical characteristic of the sheet 1 of wrap material 2. In addition, the wrap delivery control module 550 is operable to generate the feed control signal 551 based on a level of the sheet property signal 132.

In accordance with an implementation the sheet drive system 510 is operable to pay out via the output member 512 the sheet 1 of the wrap material 2 from the wrap roll hopper 282 in a feed direction defining a longitudinal axis X of the sheet 1, and the sheet transition sensor 133 is operable to generate a sheet transition signal 135 representative of a location on the sheet 1 along the longitudinal axis X of a boundary 700 between the first portion 3 and the second portion 4 of the sheet 1. In addition, the wrap delivery control module 550 is operable to generate the feed control signal 551 for controlling the sheet drive system 510 to pay out the first portion 3 of the sheet 1 of the wrap material 2 at the first sheet feed rate $SF_1$ and pay out the second portion 4 of the sheet 1 of the wrap material 2 at the second sheet feed rate $SF_2$ different than the first sheet feed rate $SF_1$ based on one or more of the sheet property signal 132 and/or the sheet transition signal 135.

In accordance with an implementation the sheet transition sensor 133 is a sheet sensor operatively coupled with the input circuit 560 of the wrap delivery control module 550. The sheet transition sensor 133 is operable to generate a sheet transition signal 135 representative of a location on the sheet 1 along the longitudinal axis X of an edge of the sheet or of a transverse separation zone 701 defined in the sheet 1, wherein the transverse separation zone 701 extends in a direction perpendicular to the longitudinal axis X. In addition, the wrap delivery control module 550 is operable to generate the feed control signal 551 for controlling the sheet drive system 510 to hold an end of the sheet 1 fixed relative to the wrap roll hopper 282 based on the sheet transition signal 135, whereby tension in the sheet 1 between the leading portion 5 of the sheet 1 wrapped onto the round module rotating in the module builder 80 of the associated harvester 10 and the end held fixed relative to the wrap roll hopper 282 causes the sheet 1 to decouple along the transverse separation zone 701 permitting the trailing end 6 of the sheet 1 to be wrapped onto the rotating module. In an implementation the sheets may be caused to tear or otherwise separate along designated zones provided in and/or on the rolled sheets by the manufacturer.

In accordance with an implementation the sheet transition sensor 133 is an optical sensor operable to sense the transverse separation zone 701 defined in the sheet 1 and to generate the sheet transition signal 135 representative of the location on the sheet 1 along the longitudinal axis X of the transverse separation zone 701 defined in the sheet 1. However, it is to be appreciated that the sheet transition sensor 133 may be any sensor capable of sensing the transverse separation zone 701 defined in the sheet 1, and generating the sheet transition signal 135 representative of the location on the sheet 1 along the longitudinal axis X of the transverse separation zone 701 defined in the sheet 1.

In accordance with an implementation the sheet transition sensor 133 is a magnetic sensor operable to sense one or more magnetic notations 404 such as a metal label or the like disposed on the sheet 1 and to generate the sheet transition signal 135 representative of the location on the sheet 1 along the longitudinal axis X of the transverse separation zone 701 defined in the sheet 1.

It is to be appreciated that the wrap delivery system 500 of the various implementations permits the use in a harvester 10 of a wide range of wrapping units (sheets) of the wrap material and, further, permits the use of a wide range of wrapping units (sheets) of the wrap material in a wide range of environmental conditions. As described above, the wrap delivery control module 550 is operable to generate the feed control signal 551 for controlling the sheet drive system 510 to pay out the sheet of material based on one or more signals representative of properties of the material from which the sheet is formed, and also representative of operating conditions such as temperature and humidity. With regard to the wide range of sheets of wrap material FIGS. 7a-7d show sheets 1', 1'', 1''', 1'''' having different material properties. Elastic properties of certain wrap materials such as for example those made of a plastic material may be advantageously used to form compressed round crop modules having a desired tight cylindrical shape. Certain wrap materials that are relatively inelastic but that exhibit strength and/or protective properties such as for example those made of a paper material may be advantageously used to form round crop modules having a desired outer protective layer.

Figure 7A:
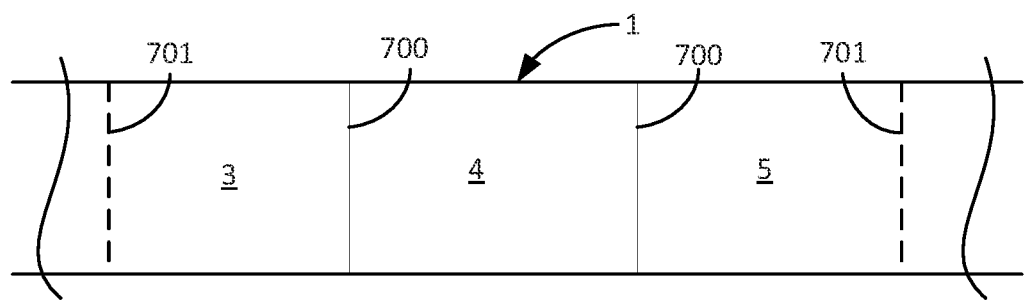
FIGS. 7A-7D show wrapping units (sheets) of wrap material having different elasticity and other material properties and characteristics.

The sheet 1 (wrapping unit) of FIG. 7A for example includes a substantially rectangular first portion 3 (leading side) having a first property, a substantially rectangular second portion 4 (center side) having a second property, and a substantially rectangular third portion 5 (trailing side) having a third property. The properties of the wrap may relate to the type of material such as a property of the material. The material properties may include a thickness property, a tackiness property, an elasticity property, a composition property (paper, plastic, etc.) or the like. The sheet 1 (wrapping unit) of FIG. 7A for example includes a substantially rectangular first portion 3 (leading side) having an inelastic property, a substantially rectangular second portion 4 (center side) having an elastic property, and a substantially rectangular third portion 5 (trailing side) having a further elastic property. The wrap protocol 610 shown in FIG. 6A would be appropriate for a sheet 1 having these characteristics. It is to be appreciated that although three portions are shown for the example sheet the system and method of the implementations here are adapted for use with such additional sheet types as may be necessary or desired.

Figure 7B:
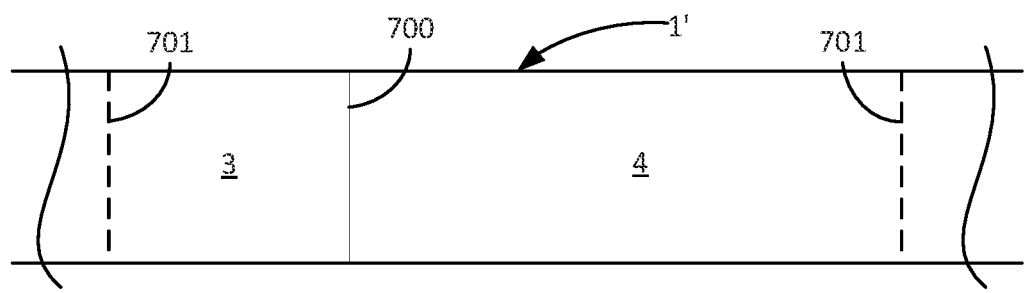

The sheet 1' (wrapping unit) of FIG. 7B for example includes a substantially rectangular first portion 3 (leading side) having an inelastic property, and a substantially rectangular second portion 4 (trailing side) having an elastic property. The wrap protocols 620, 630, 640 shown in FIGS. 6B, 6C and 6D would be appropriate for a sheet 1' having these characteristics.

Figure 7C:
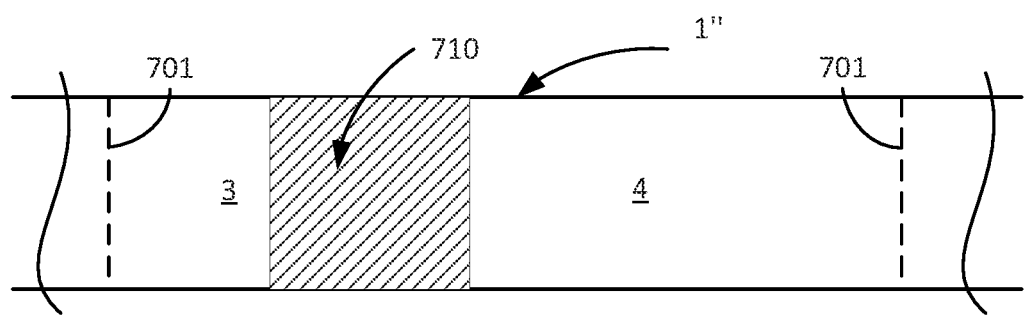
Figure 7D:
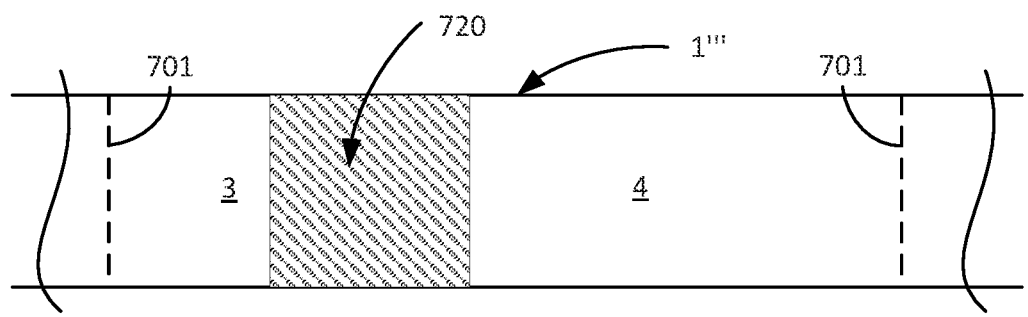

The sheets 1", 1''' (wrapping units) of FIGS. 7C and 7D for example include a substantially rectangular first portion 3 (leading side) having a first elastic property, and a substantially rectangular second portion 4 (trailing side) having a second elastic property. However, the interface portions 710, 720 between the first and second portions 3, 4 of the sheets 1", 1''' have intermediate degrees of elasticity. For example if the sheet 1" (wrapping unit) of FIG. 7C includes a substantially rectangular first portion 3 (leading side) having an inelastic property, and a substantially rectangular second portion 4 (trailing side) having an elastic property, the transition zone 710 has an elastic property that transitions from an inelastic property at the edge abutting the first portion 3 to an elastic property at the edge abutting the second portion 4. Preferably, the elastic property of the transition zone 710 at the edge abutting the first portion 3 matches the elastic property of the first portion 3, and the elastic property of the transition zone 710 at the edge abutting the second portion 4 matches the elastic property of the second portion 4. Similarly, if the sheet 1''' (wrapping unit) of FIG. 7D includes a substantially rectangular first portion 3 (leading side) having an elastic property, and a substantially rectangular second portion 4 (trailing side) having an inelastic property, the transition zone 720 has an elastic property that transitions from an elastic property at the edge abutting the first portion 3 to an inelastic property at the edge abutting the second portion 4. Preferably, the elastic property of the transition zone 720 at the edge abutting the first portion 3 matches the elastic property of the first portion 3, and the elastic property of the transition zone 720 at the edge abutting the second portion 4 matches the elastic property of the second portion 4. The wrap protocols 620, 630, 640 shown in FIGS. 6B, 6C and 6D would be appropriate for sheets 1", 1''' having these characteristics.

As described above, the sheet drive system 510 (FIG. 5) includes an output member 512 configured to drive an associated wrap feed mechanism 514 of the associated harvester 10 engaged with the wrap material 2, and a drive mechanism 520 configured to operate the output member 512 responsive to a feed control signal 551 to pay out or otherwise feed the sheet 1 (wrapping unit) of the wrap material 2 from the wrap roll hopper 282. In some implementations, the drive mechanism 520 includes cooperative first and second drive systems that are operable to drive the associated wrap feed mechanism 514 and a wrap floor system of the module builder 80 of the associated harvester 10, respectively. In this regard and referring now to FIGS. 8, 9, and 10, a first drive system 802 is illustrated. The first drive system 802 may have a drive sprocket 804 coupled to a driven sprocket 806 via a chain, belt, or the like 808. Further, a tensioner 810 may be positioned partially between the drive and driven sprocket 804, 806 to ensure the proper chain tension is maintained between the sprockets 804, 806. In one non-limiting implementation, the drive sprocket 804 may be rotationally coupled to the lower rear gate roll 240 or any other roll of the module forming chamber 185. In the implementation illustrated and by way of example, the ratio of teeth of the sprockets 804, 806 may dictate the feed speed of the wrapping assembly 302 relative to the rotation speed of the rolls of the module forming chamber 185. In another non-limiting implementation, the drive sprocket 804 may be rotationally coupled to a second drive system 809 which may be any type of system such as mechanical, pneumatic, hydraulic, electrical or the like that engages and rotates the drive sprocket 804.

Figure 8:
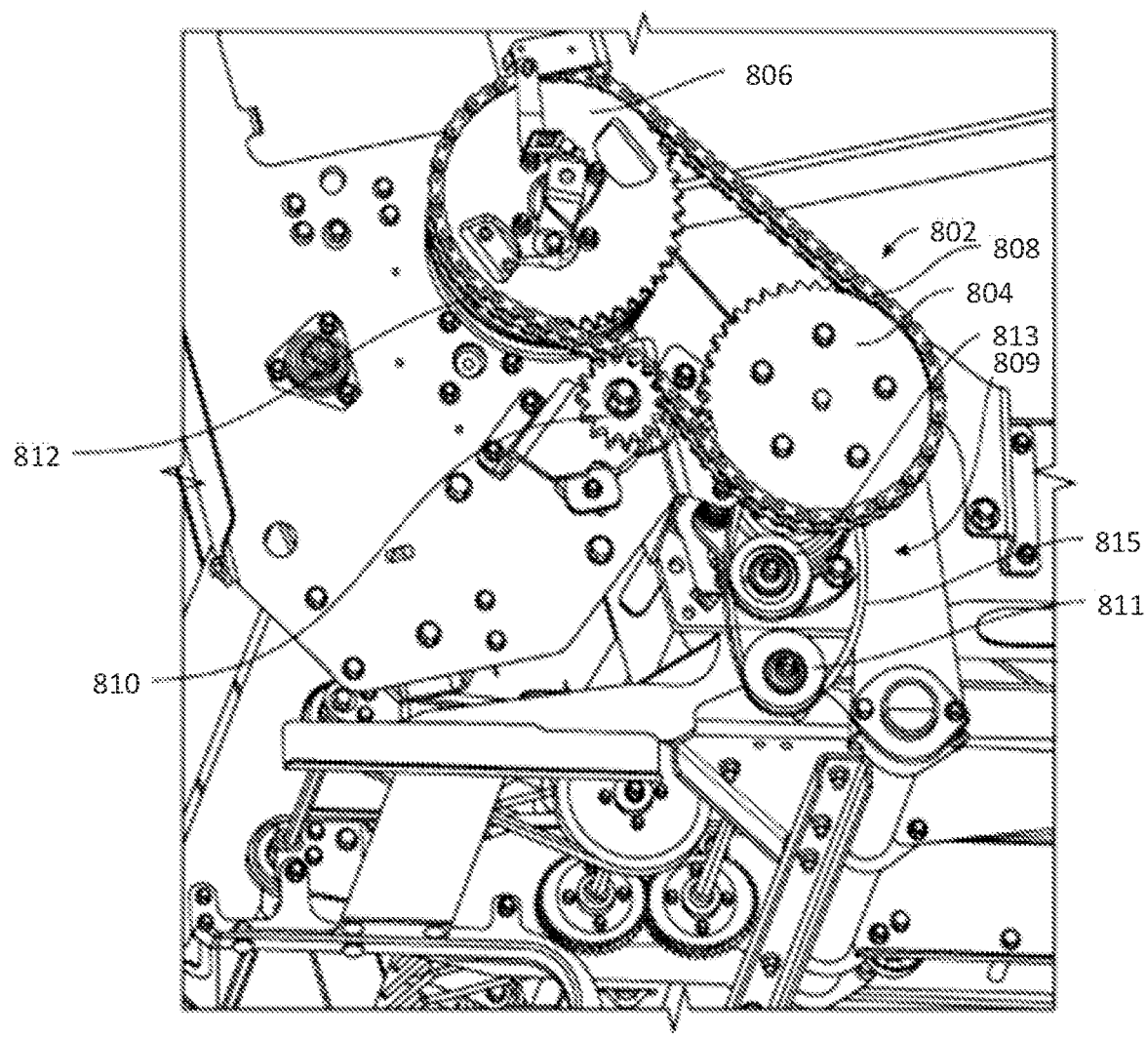
FIG. 8 is a perspective view of an implementation of a drive system for the FIG. 3 implementation.
Figure 9:
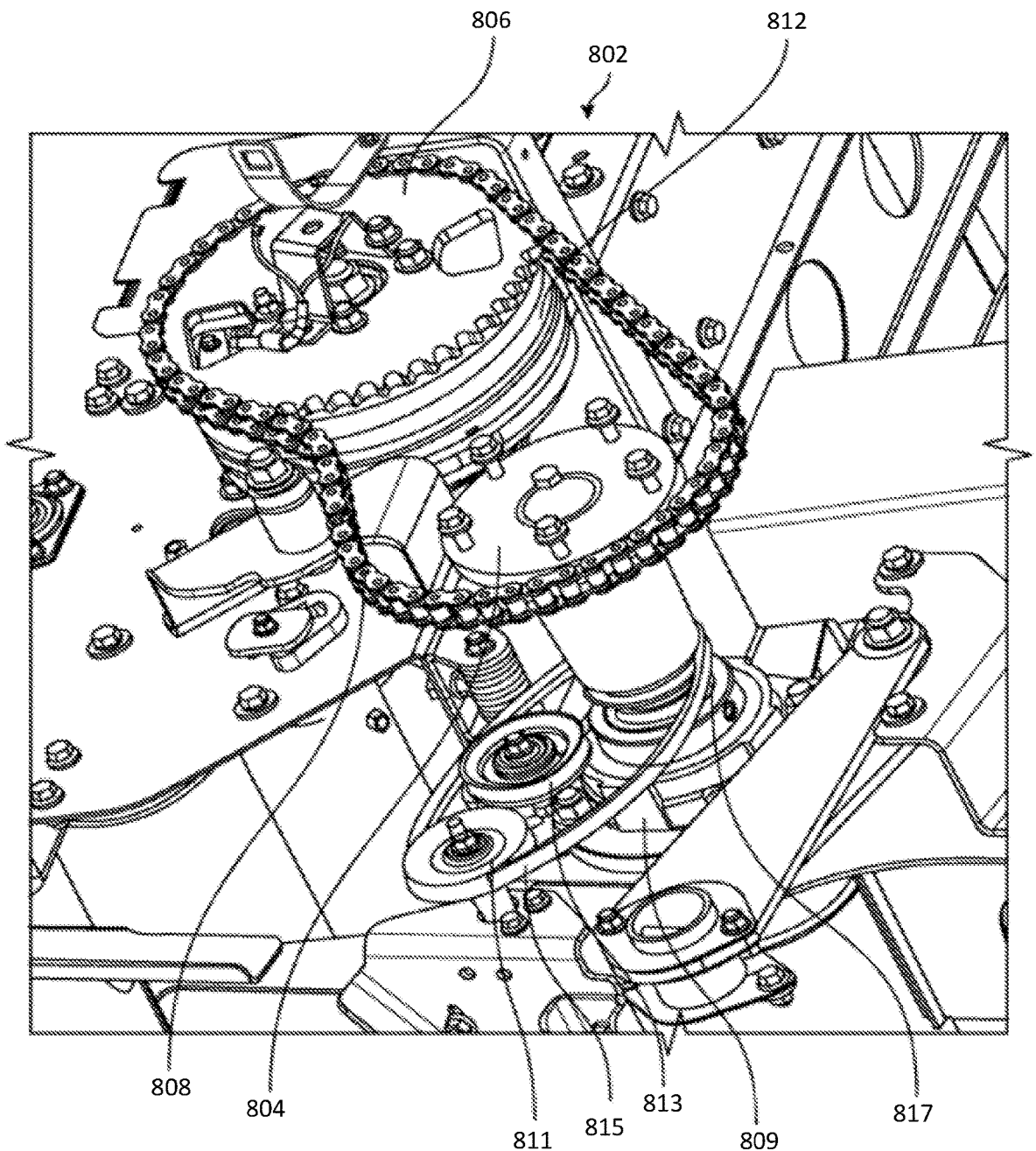
FIG. 9 is a another perspective view of the drive system from FIG. 8.
Figure 10:
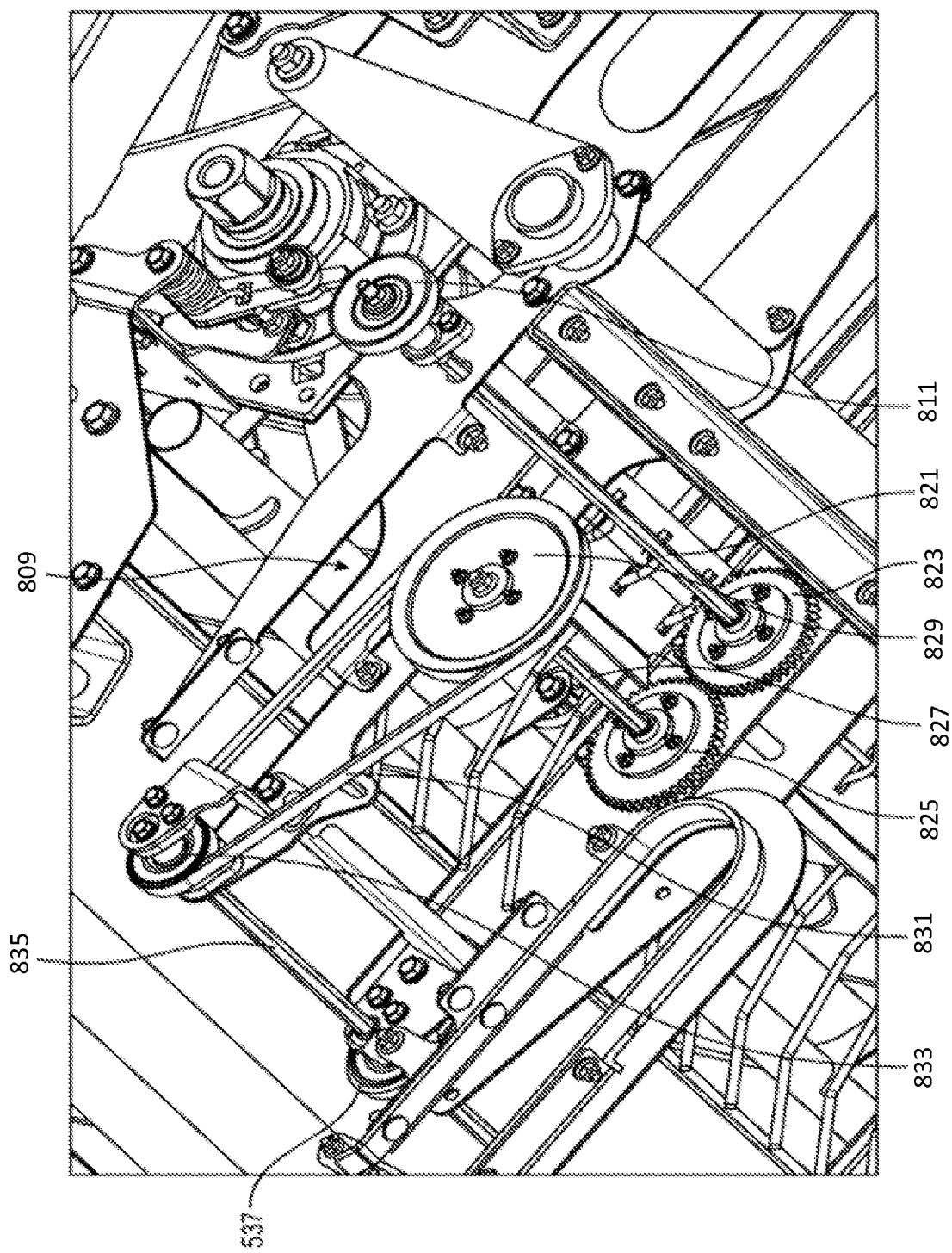
FIG. 10 is a bottom perspective view of the drive system from FIG. 8.

In FIGS. 8, 9, and 10, one form of the second drive system 809 includes a first roller 811 offset a second roller 817 and a tensioner belt 815 that wraps around the first and second rollers 811 and 817 to drive a shaft 821 of the drive sprocket 823. The belt 815 is tensioned by the roller 813 when the wrap floor engages. Other forms of the second drive system 809 can include a friction wheel driven wrap system, one or more gears that engage shaft 821 or drive sprocket 823 to generate the input motion, a chain and sprocket arrangement, one or more of the wrap box rollers, and an electric clutch, to name a few examples.

In FIG. 10, the first roller 811 includes a shaft 821 operationally attached to a drive sprocket 823 that is coupled to a driven sprocket 825 through a series of teeth on each of the sprockets 823, 825 that engage each other. The driven sprocket 825 includes a shaft 827 that is operationally connected to a rear belt sheave 829. The rear belt sheave 829 receives a tensioner belt 831 that wraps around the rear belt sheave 829 and a wrap floor sheave 833 to drive a shaft 835 of a second wrap floor sheave 837. A wrap floor system 820 includes one of the second wrap floor sheaves 837 associated with each wrap floor belt wherein each of the second wrap floor sheaves 837 is assembled with the shaft 535 that extends across a width of the wrap floor system 820.

The driven sprocket 806 may have a shaft (not particularly shown) coupling the driven sprocket 806 to a drive gear 812 of the first drive system 802. The drive gear 812 may further be in contact with the upper front wrap roller 306 that is in turn selectively in contact with the lower wrap roller 314.

When the rollers 306, 314 are in the first position, the rotational movement of the lower rear gate roll 240 rotates the drive sprocket 804. The rotation of the drive sprocket 804 is transferred to the driven sprocket 806 through the chain 808. From the driven sprocket 806 the shaft rotates the drive gear 812. The drive gear 812 rotates the corresponding upper front wrap roller 306 and the lower wrap roller 314. Rotation of the drive sprocket 804 also activates the second drive system 809 such that the shaft 835 and the second wrap floor sheave 837 rotate.

In the illustrate implementation, the drive sprocket 804, the chain 808, and the driven sprocket 806 collectively comprise the drive mechanism 520 (FIG. 5) of the sheet drive system 510 of the associated harvester 10. In addition and as described above, the drive gear 812 may be in contact with the upper front wrap roller 306 that is in turn selectively in contact with the lower wrap roller 314, whereby a portion of the drive gear 812 or an extension thereof that contacts with the upper front wrap roller 306 that is in turn selectively in contact with the lower wrap roller 314 collectively comprise the output member 512 (FIG. 5) of the sheet drive system 510 configured to drive the associated wrap feed mechanism 514 of the associated harvester 10.

In accordance with an implementation, the drive gear 812 carried with the driven sprocket 806 comprises an electric clutch responsive to a feed control signal 551 (FIG. 5) to cause the rollers 306, 314 to pay out or otherwise feed the sheet 1 (wrapping unit) of the wrap material 2 from the wrap roll hopper 282. The electric clutch initially turns while the rear lower gate roller 240 is turning but is not engaged. When the wrap cycle begins, it sends an electrical signal (current) to the electric wrap clutch to engage the clutch. The clutch then creates input rotation through a mechanism to couple the upper front wrap roller 306 and the lower wrap roller 314 with the lower rear gate roller 240 via the sprockets 804, 806 and chain 808. As described above, the ratio of teeth of the sprockets 804, 806 may dictate the feed speed of the wrapping assembly 302 relative to the rotation speed of the rolls of the module forming chamber 185. In the example implementation, the ratio of teeth of the sprockets 804, 806 dictates the feed speed of the wrapping assembly 302 to be less than the rotation speed (outer surface speed) of the rolls of the module forming chamber 185. When the wrap floor cycle is disengaged, the electrical signal is turned off and the clutch also disengages halting the rotation of the upper front wrap roller 306 and the lower wrap roller 314.

In an implementation, the electric clutch of the drive gear 812 is operable in multiple modes including a disengaged or "free wheel" mode, a connected or "engaged" mode, and a lock or "brake" mode. The clutch is responsive to the control signal 551 from the wrap delivery control module 550 to transition between the various modes of operation when appropriate based on one or more signals relating to the crop module being formed received by the wrap delivery control module 550. In the disengaged mode the driven sprocket 806 is effectively disconnected from driving the rollers 306, 314 of the wrap delivery system. In the engaged mode the driven sprocket 806 is effectively connected with the rollers 306, 314 of the wrap delivery system thereby feeding the wrapping material towards the nip 191 in the module forming chamber. In the lock mode the mechanism(s) coupling the rollers 306, 314 are effectively clamped preventing further feeding of the wrap material form the roll whereby the individual wrapping units may be separated from each other at predefined locations forming separation zones that may be areas of the wrap material that are connected using an adhesive material that is breakable under appropriate circumstances without destroying the wrap material.

This example implementation is effective for delivering wrapping units onto the rotating crop module in a stretched condition, and particularly for delivering wrapping units formed of polymeric materials such as plastic wrap for example. However, it is to be appreciated that this example implementation is also highly effective in delivering wrapping units formed of one or more materials having two or more different elastic properties such as for example for delivering wrapping units having a leading side comprising an extensible paper and having a trailing side comprising a polymeric material. In an example implementation, the wrap feed system 500 is highly effective in delivering wrapping units onto the rotating crop module in a stretched condition wherein the leading side of the wrapping units comprises an extensible paper having an elasticity of about 8%, and wherein the trailing side of the wrapping units comprises a plastic material. In an implementation, the extensible paper comprises a crepe paper material having the desired elasticity properties.

The example implementation enables a method of supplying wrap material to an associated baler rotating an agricultural product module using an endless member moving at a bale forming rate. The enabled method comprises directing a leading end (leading edge) of the wrap material (a wrapping unit) to a nip formed between the rotating agricultural product module and the moving endless member. Further in the method, a first portion (leading side) of the wrap material is delivered to the nip at a first feed rate relative to the bale forming rate to transfer the first portion of the wrap material onto the rotating agricultural product module under a first wrap condition. Further in the method, a second portion (trailing side) of the wrap material is delivered to the nip at a second feed rate relative to the bale forming rate to transfer the second portion of the wrap material onto the rotating agricultural product module under a second wrap condition different than the first wrap condition.

In the example implementation, the delivering the first portion of the wrap material to the nip at the first feed rate comprises delivering the first portion of the wrap material to the nip at a first feed rate relative to the bale forming rate configured to transfer the first portion of the wrap material onto the rotating agricultural product module under a stretched wrap condition. In addition in the example implementation, the delivering the second portion of the wrap material to the nip at the second feed rate comprises delivering the second portion of the wrap material to the nip at a second feed rate relative to the bale forming rate configured to transfer the second portion of the wrap material onto the rotating agricultural product module under a stretched wrap condition. In the example implementation, the first and second feed rates are less than bale forming rate. Further in the example implementation, the delivering the first portion of the wrap material to the nip comprises delivering an elastic extensible paper portion of the wrap material to the nip, and the delivering the second portion of the wrap material to the nip comprises delivering an elastic plastic portion of the wrap material to the nip. In an embodiment the elastic extensible paper portion of the wrap material comprises a crepe paper wrap material having the desired elastic properties.

In the example implementation, the first feed rate is substantially the same as the second feed rate. In the example implementation, the second feed rate is set by the ratio of the teeth of the sprockets 804, 806.

With continued reference to FIGS. 8, 9, and 10, in some implementations, a wrap floor system 820 is positioned partially between the wrapping assembly 302 and the module forming chamber 185. The wrap floor 820 may have a plurality of continuous wrap belts 822 or the like positioned thereon. The wrap belts 822 and the wrap floor 820 may guide the wrap material, in part, from the wrap roll to the lower front gate roll 245 and ultimately into the module forming chamber 185.

The carry roller 308 may not be directly coupled to the first drive system 802. Rather, the carry roller 308 may be free to rotate as the wrap roll placed thereon rotates. In other words, the carry roller 308 may be an idler roller that supports the wrap roll while simultaneously allowing the wrap roll to rotate as wrap material is fed to the module forming chamber 185. Further, the carry roller 308 may be spaced from the upper front wrap roller 306 to provide a cradle or the like between the rollers 306, 308 to allow the wrap roll to sit thereon. The rollers 306, 308 may maintain the proper positioning of the wrap roll while facilitating rotation as directed by the first drive system 802.

With continued reference to FIGS. 8, 9, and 10, while the drive gear 812 is described as powered through an electromechanical linkage to the lower rear gate roll 240, the drive gear 812 or the upper front wrap roller 306 and the lower wrap roller 314 may be independently powered. More specifically, hydraulic, pneumatic, electrical, or the like motors may be coupled directly to any one of the above-mentioned rollers, gears, or sprockets to provided rotational power thereto. In this regard, the controller 550 (FIG. 5) may communicate with the motor of the respective roller, gear, or sprocket to dictate the feed speed generated by the wrapping assembly 302.

Figure 8A:
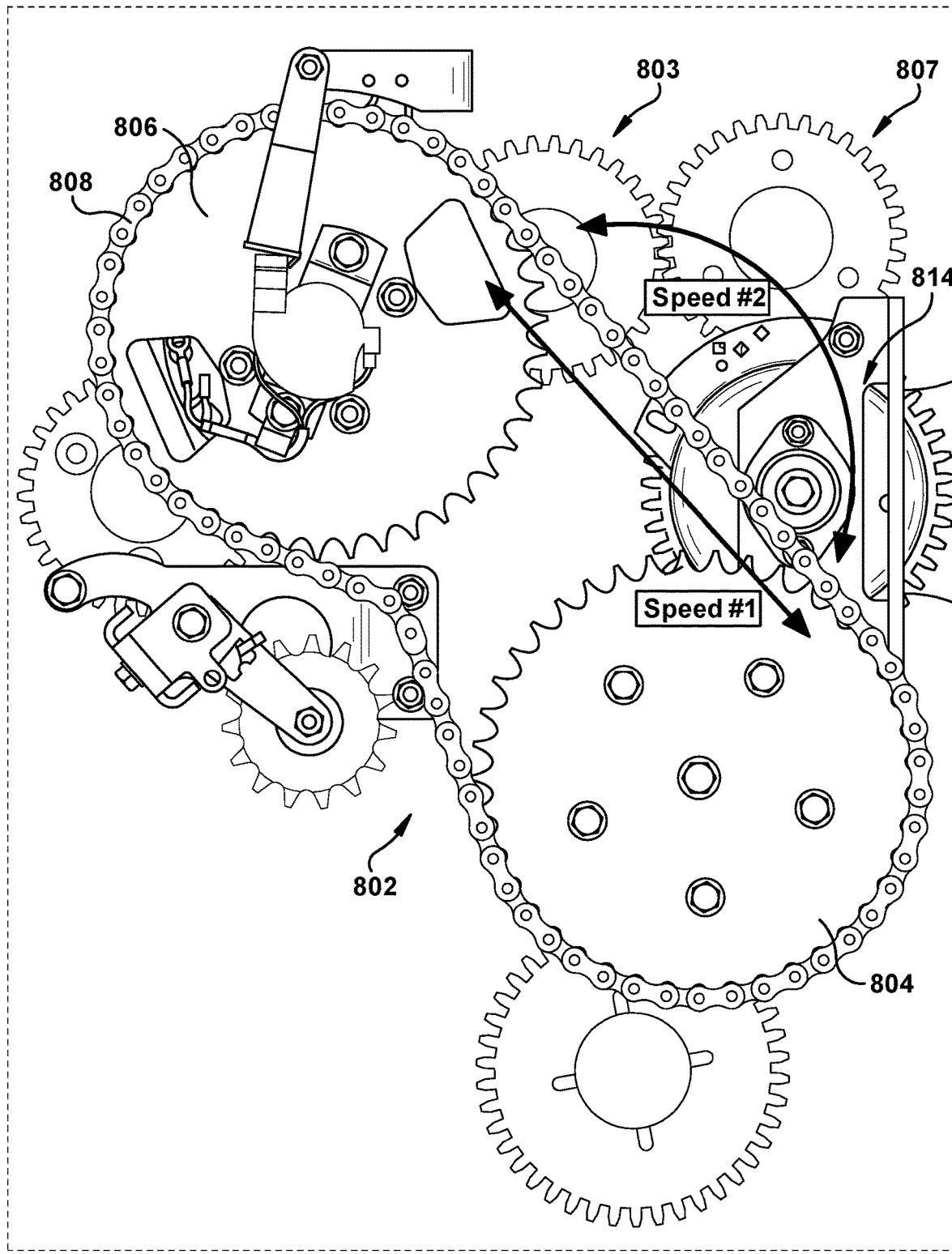
FIG. 8A is a perspective view of an implementation of a multiple speed drive system for an implementation.

FIG. 8A is a perspective view of an implementation of a multiple speed drive system 803 for an implementation. As shown and as described above, the first drive system 802 has a drive sprocket 804 coupled to a driven sprocket 806 via a chain 808, belt, or the like. In accordance with an implementation, the drive gear 812 (FIG. 9) carried with the driven sprocket 806 comprises an electric clutch responsive to a feed control signal 551 (FIG. 5) to cause the rollers 306, 314 to pay out or otherwise feed the sheet 1 (wrapping unit) of the wrap material 2 from the wrap roll hopper 282. The electric clutch initially turns while the rear lower gate roller 240 is turning but is not engaged. When the wrap cycle begins, it sends an electrical signal (current) to the electric wrap clutch to engage the clutch. The clutch then creates input rotation through a mechanism to couple the upper front wrap roller 306 and the lower wrap roller 314 with the lower rear gate roller 240 via the sprockets 804, 806 and chain 808. As described above, the ratio of teeth of the sprockets 804, 806 dictates the feed speed of the wrapping assembly 302 relative to the rotation speed of the rolls of the module forming chamber 185. In the example implementation, the ratio of teeth of the sprockets 804, 806 dictates the feed speed of the wrapping assembly 302 to be less than the rotation speed (outer surface speed) of the rolls of the module forming chamber 185. When the wrap floor cycle is disengaged, the electrical signal is turned off and the clutch also disengages halting the rotation of the upper front wrap roller 306 and the lower wrap roller 314.

In addition, the multiple speed drive system 803 includes a further set of gears 807 that are operatively coupled between the drive sprocket 804 and the drive gear 812 (FIG. 9), wherein the further set of gears 807 dictates a second feed speed of the wrapping assembly 302 relative to the rotation speed of the rolls of the module forming chamber 185. That is, the ratio of the teeth of the gears comprising the further set of gears 807 dictates a second feed speed of the wrapping assembly that is different than the feed speed that is dictated by the ratio of teeth of the sprockets 804, 806. A clutch mechanism 814 is responsive to a feed control signal 551 (FIG. 5) to cause the rollers 306, 314 to pay out or otherwise feed the sheet 1 (wrapping unit) of the wrap material 2 from the wrap roll hopper 282. The clutch mechanism 814 is operative to disengage the further set of gears 807 from driving the wrap when the cutch described above is activated for coupling the drive gear 812 with the driven sprocket 806. In this way, rotational power is delivered to the drive gear 812 either via the drive sprocket 804, driven sprocket 806, and chain 808 (first drive speed) or via further set of gears 807 and clutch mechanism 814 (second drive speed).

Figure 11:
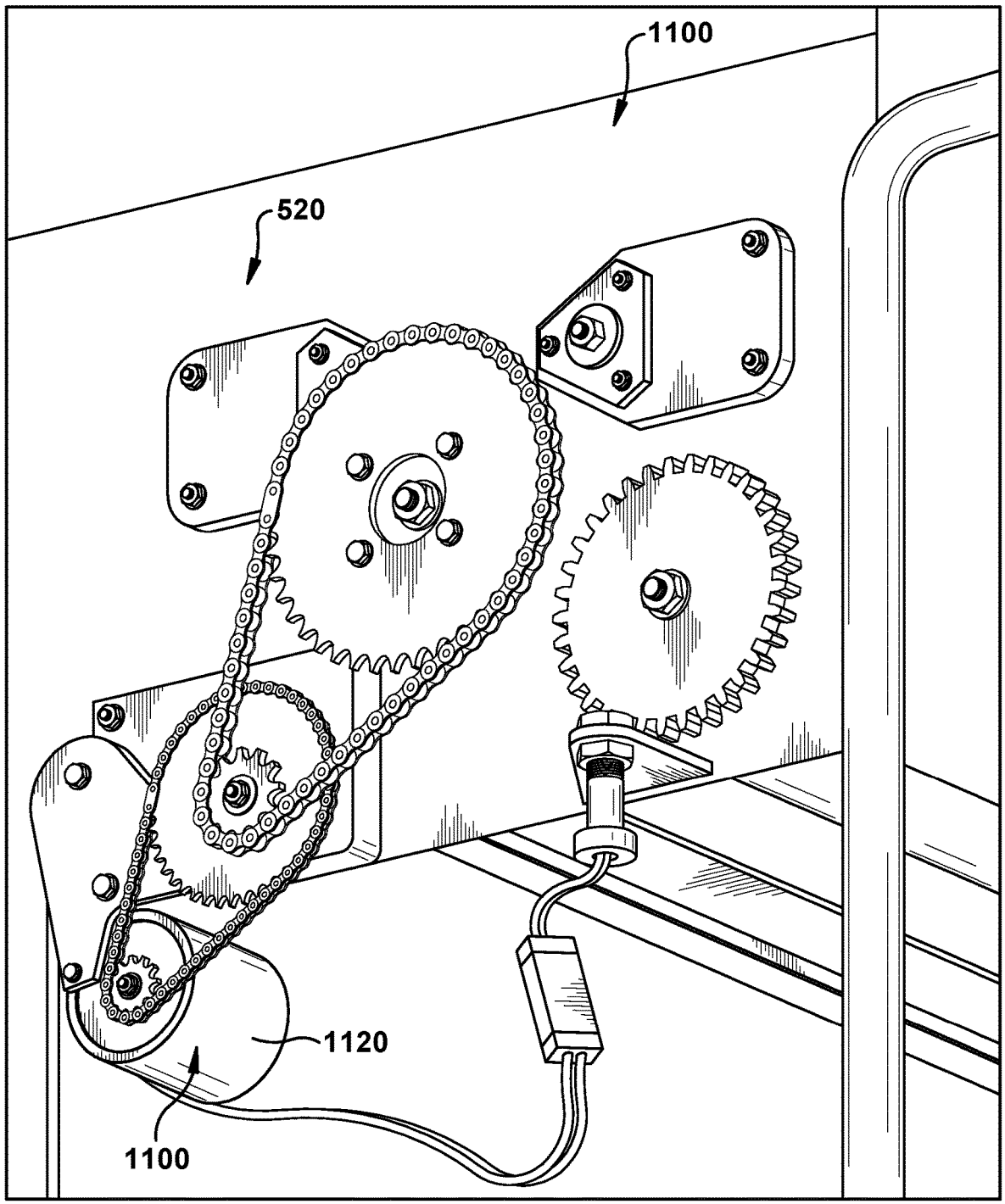
FIG. 11 is a perspective view of an implementation of a drive system for the FIG. 3 implementation.

With reference next to FIG. 11, the wrap delivery system 500 in accordance with an implementation operates to selectively deliver the wrap material onto the crop module in the chamber 185 in various stretch conditions including for example in a stretched condition, in an un-stretched condition, and/or in stretched and un-stretched conditions. In an implementation, a first portion (a leading side) of a wrapping unit of the wrap material may be transferred onto the crop module in an un-stretched condition, and a second portion (a trailing side) of the wrapping unit of the wrap material may be transferred onto the crop module in a stretched condition. In this regard of the wrapping assembly 90 illustrated in FIGS. 2 and 3 and by way of example, the lead edge of the sheet is delivered to the module builder 80 in the un-stretched condition using an auxiliary device 1110 such as for example an electric motor 1120. The electric motor 1120 is responsive to the feed control signal 551 to drive the one or more of the front and rear carry rollers 284, 286 and the lower wrap roller 288 (FIG. 2) or the upper front wrap roller 306 and the lower wrap roller 314 (FIG. 3) thereby feeding the leading side of the wrapping unit to the module builder in an un-stretched condition such as shown for example in FIG. 6B. For this the module surface speed signal 126 received from the module surface speed sensor 124 may be used to ensure that the leading side of the wrapping unit is fed to the module builder at the same speed as the rotating crop module for providing the un-stretched condition. In accordance with an implementation the output circuit 580 of the wrap delivery control module 550 is operable to generate the feed control signal 551 for controlling the electric motor 1120 of the sheet drive system 510 during the first time period 0-t1 to feed the first portion 3 of the sheet 1 of the wrap material 2 from the wrap roll hopper 282 at the first sheet feed rate SF1 624 matching a surface speed SS of a round module rotating in the module builder 80 of the associated harvester 10, and to feed the second portion 4 of the sheet 1 of the wrap material 2 from the wrap roll hopper 282 using suitable gears or the like operably connected with the endless members 190 during the second time period t1-t2 at the second sheet feed rate SF2 626 mismatching the surface speed SS of a round module rotating in the module builder 80 of the associated harvester 10 for a first portion of the sheet.

In accordance with the implementation, during the first period 0-t1, the clutch of the electric clutch of the drive gear 812 is operable in a disengaged or "free wheel" mode. The clutch is responsive to the control signal 551 from the wrap delivery control module 550 to transition to the disengaged mode of operation when appropriate based on one or more signals relating to the crop module being formed received by the wrap delivery control module 550. In the disengaged mode the driven sprocket 806 is effectively disconnected from driving the rollers 306, 314 of the wrap delivery system. In that way, the auxiliary device 1110 such as for example the electric motor 1120 is solely used for feeding the leading side of the wrapping unit to the module builder.

After a sufficient length of the wrapping unit is layered onto the module in the module builder, the clutch and the auxiliary device 1110 such as for example the electric motor 1120 are responsive to the control signal 551 from the wrap delivery control module 550 for the electric motor to cease operation, and for the clutch to transition from the disengaged mode of operation to the engaged mode of operation when appropriate based on one or more signals relating to a transition in a characteristic of the wrap material to be delivered for wrapping onto the crop module. As an example, the transition from the disengaged mode of operation to the engaged mode of operation may be implemented by the wrap delivery control module 550 based on a characteristic change in the wrap material from a stiff paper or stiff plastic first portion to an elastic plastic or extensible paper portion of the wrap material. The characteristic change in the wrap material may be detected by the sheet property sensor 130 sensing one or more properties of the sheet of wrap material and generating a sheet transition sensor 133 used by the wrap delivery control module 550. In the engaged mode of the clutch, the driven sprocket 806 is effectively connected for driving the rollers 306, 314 of the wrap delivery system. In the implementation illustrated and by way of example, the ratio of teeth of the sprockets 804, 806 dictate the feed speed of the wrapping assembly 302 relative to the rotation speed of the rolls of the module forming chamber 185. In that way, the auxiliary device 1110 such as for example the electric motor 1120 may be an appropriately sized small motor since the system may rely on the ratio of teeth of the sprockets 804, 806 to set and control the feed speed of the wrapping assembly 302 relative to the rotation speed of the rolls of the module forming chamber 185 for wrapping the trailing side of the wrapping unit onto the module, rather than using the electric motor itself for this purpose.

The auxiliary device 1110 such as for example the electric motor 1120 in accordance with an implementation may generate a feedback signal for use by the wrap delivery control module 550 of the wrap delivery system 500 to determine a point in time for determining that the electric motor should cease operation. In this regard, the electric motor 1120 is operative to power or otherwise drive one or more of the front and rear carry rollers 284, 286 and the lower wrap roller 288 (FIG. 2) and/or the upper front wrap roller 306 and the lower wrap roller 314 (FIG. 3) to feed the wrap material from the wrap roll 280 to the module forming chamber 185 at a linear surface speed that is the similar to but slightly less than the outer surface speed of the round module 100 as it rotates in the module forming chamber 185. In that way certain wrap materials that are relatively inelastic but that exhibit strength and/or protective properties such as for example those made of a paper material may be advantageously used to form round crop modules having a desired outer protective layer. Also in that way, the electric motor may be used to sense a torque reversal wherein the torque reversal can be used to signal that the leading edge of the wrap material has been received and effectively pulled by the nip 191. This the termination of the use of the electric motor and to also trigger the initiating the use of the clutch to transition from the disengaged mode of operation to the engaged mode of operation when appropriate based on the reverse torque signal. In the engaged mode of the clutch, the driven sprocket 806 is then effectively connected for driving the rollers 306, 314 of the wrap delivery system.

Figure 12:
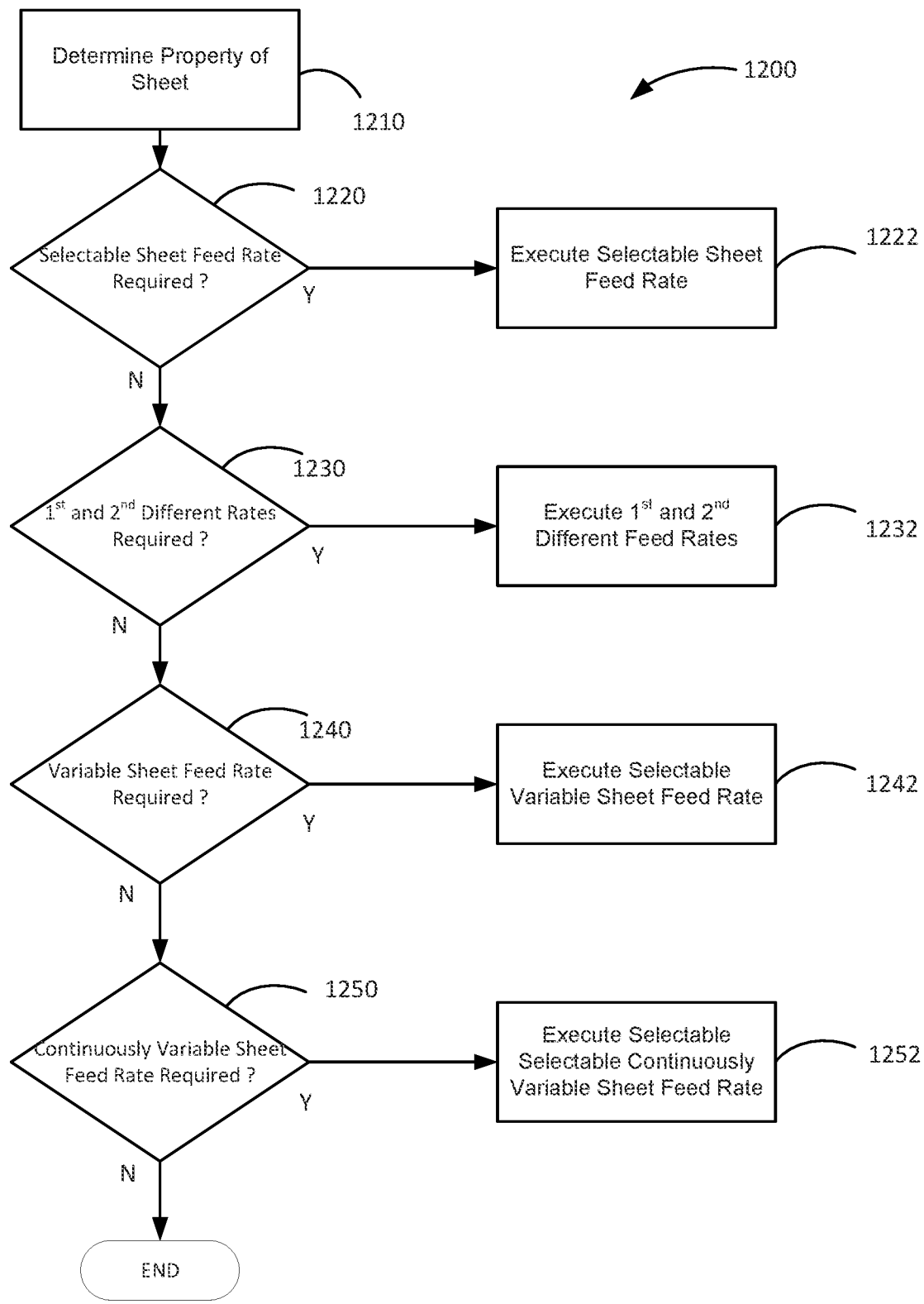
FIG. 12 shows a flow diagram of a method for controlling delivery of a sheet of wrap material using sheet property and/or one or more other feedback signal(s) in accordance with an implementation.

FIG. 12 shows a flow diagram of a method 1200 for controlling delivery of a sheet 1 of wrap material 2 from a wrap roll hopper 282 of an associated harvester 10 to a module builder 80 of the associated harvester 10 in an implementation using sheet property and/or one or more other feedback signal(s) in accordance with an implementation. A property of the wrap material is determined at 1210. In an implementation the feedback signal 132 from the sheet property sensor 130 may be used in action 1210 to determine the property of the sheet of material. The feedback signal 126 from the temperature and humidity sensor 134 may also be used in the method 1200. In further addition, input received by the wrap delivery system 500 from an operator of the harvester 10 may be used as well for determining the property of the sheet of material at action 1210.

For sheets 1 having the properties such as shown in FIG. 7A a determination is made at action 1220 to implement in action 1222 the sheet wrap protocol of FIG. 6A.

Similarly, for sheets 1' having the properties such as shown in FIG. 7B a determination is made at action 1230 to implement in action 1232 the sheet wrap protocol of FIG. 6B.

Also similarly, for sheets 1", 1''' having the properties such as shown in FIGS. 7C and 7D a determination is made at actions 1230 and 1250 to implement in actions 1242 and 1252 the sheet wrap protocols of FIGS. 4c and 4d. Operator input may be used to select between the sheet wrap protocols of FIGS. 6C and 6D for sheets 1", 1''' having the properties such as shown in FIGS. 7C and 7D. In addition, the feedback signal 126 from the temperature and humidity sensor 134 may also be used alone and/or in combination with the operator input and/or the sheet sensor signal 132 to select between the sheet wrap protocols of FIGS. 6C and 6D for sheets 1", 1''' having the properties such as shown in FIGS. 7C and 7D.

Figure 13:
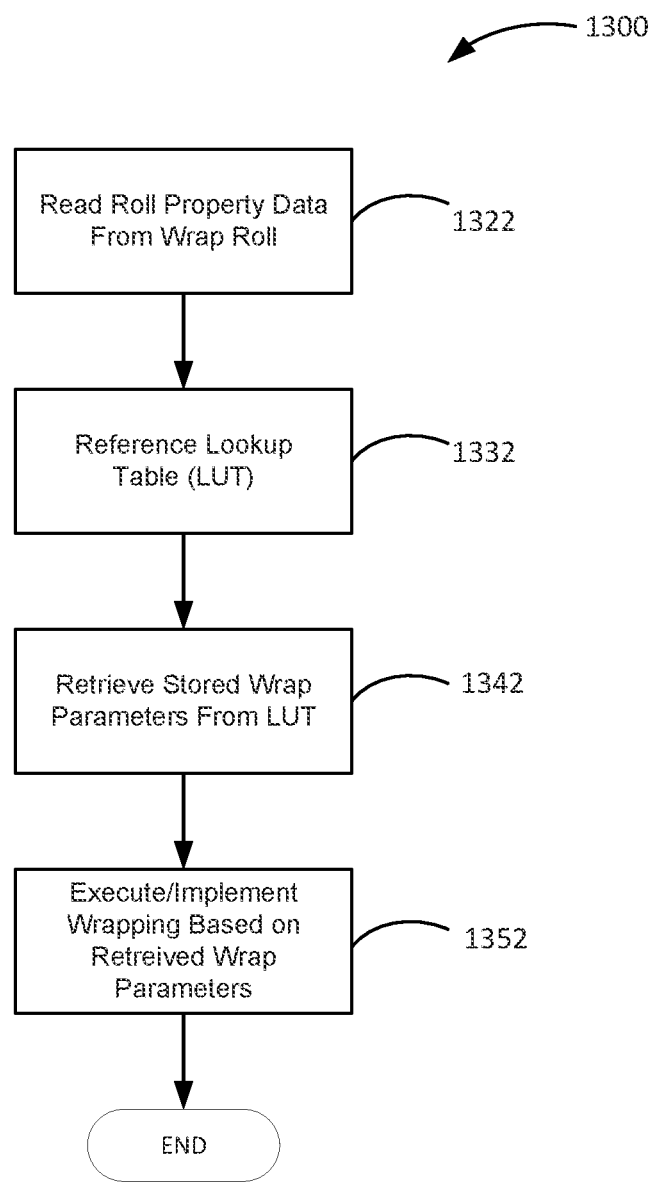
FIG. 13 shows a flow diagram of a method for controlling delivery of a sheet of wrap material using sheet property data obtained from a tag on a roll of the sheet material to reference wrap protocols stored in a memory in accordance with an implementation.

FIG. 13 shows a flow diagram of a method 1300 for controlling delivery of a sheet 1 of wrap material using sheet property data obtained from a tag on a roll of the sheet material to reference wrap protocols stored in a memory in accordance with an implementation. In action 1310 a sensor or reader 144 reads data from a tag affixed to the roll 280 of sheet material stored in the wrap roll hopper 282. The tag affixed to the roll 280 of sheet material may be a radio frequency identification (RFID) tag, for example, and the sensor or reader 144 may be an RFID reader. Further, the tag affixed to the roll 280 of sheet material may be a bar code tag, for example, and the sensor or reader 144 may be a bar code reader.

The roll property data obtained in action 1310 is used in action 1320 to index a look up table (LUT) in the memory device 552 of the wrap delivery control module 550.

Stored wrap parameters are retrieved in action 1330 from the look up table (LUT) in the memory device 552 of the wrap delivery control module 550 based on the index to the table provided by the roll property data obtained in action 1310. The retrieved wrap parameters may represent any wrap protocol appropriate for the specific wrap roll disposed in the wrap roll hopper 282. For example, the retrieved wrap parameters may represent any of the wrap protocols such as shown and described in connection with FIGS. 6A-6F, and/or others, for example.

In action 1340 wrap parameters retrieved from the memory device 552 for the suitable wrap protocol is executed by the processor device 570 of the wrap delivery control module 550 of the wrap delivery system 500.

Figure 14:
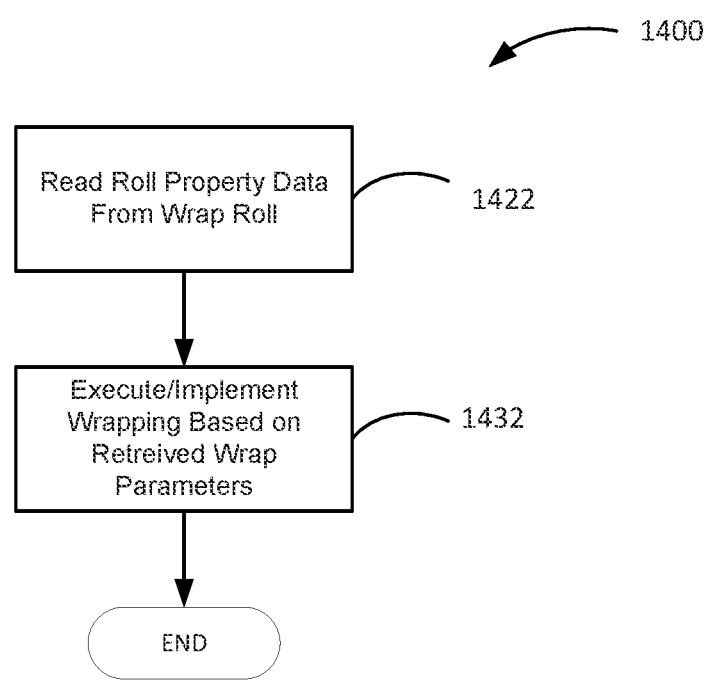
FIG. 14 shows a flow diagram of a method for controlling delivery of a sheet of wrap material using sheet property data obtained from a tag on a roll of the sheet material in accordance with an implementation.

FIG. 14 shows a flow diagram of a method 1400 for controlling delivery of a sheet of wrap material using sheet property data obtained from a tag on a roll of the sheet material in accordance with an implementation.

In action 1410 a sensor or reader 144 reads data from a tag affixed to the roll 280 of sheet material stored in the wrap roll hopper 282. The tag affixed to the roll 280 of sheet material may be a radio frequency identification (RFID) tag, for example, and the sensor or reader 144 may be an RFID reader. Further, the tag affixed to the roll 280 of sheet material may be a bar code tag, for example, and the sensor or reader 144 may be a bar code reader.

The roll property data obtained in action 1410 expressly included parameters for a sheet wrap protocol.

The wrap parameters read from the tag affixed to the roll 280 of sheet material may directly represent any wrap protocol appropriate for the specific wrap roll disposed in the wrap roll hopper 282. For example, the read wrap parameters may represent any of the wrap protocols such as shown and described in connection with FIGS. 6A-6F, and/or others, for example.

In action 1420 the wrap parameters for the suitable wrap protocol read from the tag are executed by the processor device 570 of the wrap delivery control module 550 of the wrap delivery system 500.

Figure 15:
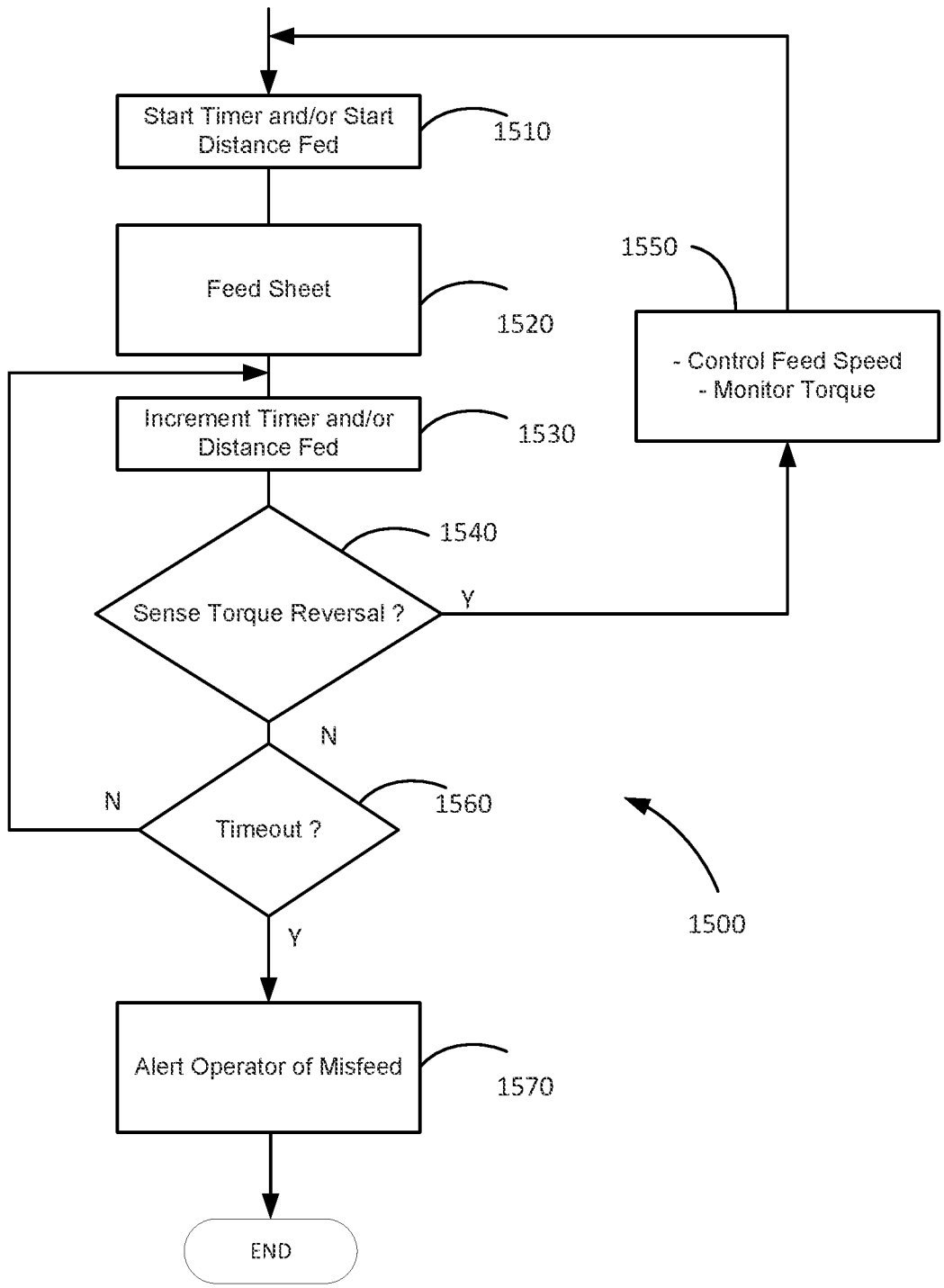
FIG. 15 shows a flow diagram of a method for controlling delivery of a sheet of wrap material using a motor drive mechanism in accordance with an implementation.

FIG. 15 shows a flow diagram of a method 1500 for controlling delivery of a sheet of wrap material using a motor drive mechanism in accordance with an implementation. Utilizing a motor and in particular an electric motor to power the wrap feeding system provides many benefits. These include an ability to detect misfeed of the wrap, for example.

In an implementation, the drive mechanism 520 is an electric motor. However, it is to be appreciated that in alternative implementations the drive mechanism 520 is a hydraulic motor or by any other drive system as may be necessary or desired including for example by direct or indirect coupling with the power module 45. In further alternative implementations the drive mechanism 520 is an electric and/or hydraulic motor in combination with a mechanical and/or hydraulic braking mechanism for applying counter torque on the sheet as necessary or desired. In still further alternative implementations the drive mechanism 520 is an electric and/or hydraulic motor in combination with a mechanical and/or hydraulic gear system including for example a multiple (>1) speed gear system, a continuously variable transmission (CVT) or any other mechanism for applying counter torque on the sheet as necessary or desired.

In the method 1500 a timer is started in action 1510, and an aggregated feed length value is zeroed. For misfeed detection and in general, the leading edge of the sheet of wrap material travels while being fed at action 1520 some distance before it is engaged by the baler. During this time the timer is incremented at action 1530, there is no tension on the wrap, and a positive torque is used to advance the wrap by the motor. The linear speed of the wrap at this point, and during the feeding cycle, is some percentage slower than the liner speed of the baler belts to impart a controlled small amount of stretch. Once the wrap is pinched between the baler belts and the cotton bale, due to the different speeds of the wrap feed rolls and the baler belts, a further controlled amount of the stretching begins. At this point, a torque reversal occurs and is sensed at action 1540 wherein a negative torque in the motor is required to impart the stretching to the wrap. This torque reversal occurs within a relatively short period of time after feeding is initiated. The system can monitor for this torque reversal, and if it does not occur in said amount of time as determined at action 1560, this will indicate a misfeed, and the feeding process can be stopped. At this point, the operator can be alerted at action 1570, or it may offer the opportunity automatically take pre-defined steps to address the misfeed so that operator involvement is not necessary. On the other hand if the torque reversal is detected within the timeout period any of the wrap protocols such as shown and described in connection with FIGS. 6A-6F, and/or others, for example may be executed or otherwise performed at action 1550 for controlled delivery of the wrap onto the module under normal conditions.

Use of an electric drive control system in an implementation addresses the problem of sheets of wrap having dissimilar properties. It is desirable to provide a defined and repeatable force to elastic sheet material in order to stretch it to a targeted amount as it is applied onto the crop. So rather than defining the speed as in a fixed drive, the implementations herein essentially define and control the torque during the wrap feeding. This provides sufficient and desired stretch for the one or more elastic portion(s) of the sheet as it is wrapped onto the rotating crop module, and it also provides an acceptable force to the one or more relatively stiff (relatively inelastic or minimally inelastic) material portion(s) of the sheet. One or more transitions between the various different materials forming the wrap would occur seamlessly in the implementation by the electric drive control system to control the torque during the wrap feeding. One alternate is a variable speed drive that is adjustable to provide the sufficient and desired stretch for the one or more elastic portion(s) of the sheet as it is wrapped onto the rotating crop module, and also to provide an acceptable force to the one or more relatively stiff (relatively inelastic or minimally inelastic) material portion(s) of the sheet. In these implementations, the property of the material as well as the changes in the properties of the material as it is fed are sensed using the sheet property sensor 130 or the like.

In an implementation, for wrap having uniform elastic properties along its length the electric drive control system provides a defined and repeatable force to elastic sheet material in order to stretch it to a targeted amount along its length as it is applied onto the crop. The electric drive control system further provides, for wrap having non-uniform elastic properties along its length, defined and repeatable forces to various portions of the wrap in order to stretch the various portions along the length of the wrap to targeted amounts as the sheet is applied onto the crop. The electric drive control system further provides, for wrap having discontinuous elastic properties along its length, defined and repeatable forces to various portions of the wrap in order to stretch the various portions along the length of the wrap to targeted amounts as the sheet is applied onto the crop. The electric drive control system supplies wrap to an associated baler rotating an agricultural product module using an endless member moving at a bale forming rate by directing a leading end of the wrap to a nip formed between the rotating agricultural product module and the moving endless member, and controlling a stretch of a first portion of the wrap as the wrap is transferred onto the rotating agricultural product module by delivering the first portion of the wrap to the nip at a first feed rate that is less than the bale forming rate.

In an implementation, the first portion of the wrap is delivered to the nip at the first feed rate using an electric drive motor, and torque of the electric motor is controlled for providing the first feed rate that is regulated relative to the bale forming rate.

In an implementation, the torque of the electric motor is controlled for providing the first feed rate that is regulated relative to the bale forming rate for controlling the stretch of the first portion of the wrap as the wrap is transferred onto the rotating agricultural product module.

In an implementation, the torque of the electric motor is controlled based on one or more sensed properties of the wrap for providing the first feed rate that is regulated relative to the bale forming rate for controlling the stretch of the first portion of the wrap as the wrap is transferred onto the rotating agricultural product module. The properties of the wrap may be sensed using one or more of the sheet property sensor 130 or the like, or communicated to the system as manufacturer's data received from the roll tag reader/sensor 144, or the like.

In an implementation, the torque of the electric motor operatively engaged with the is controlled against the tug of the wrap being pulled into the nip by engagement of the leading end of the wrap with the rotating agricultural product module.

In an implementation, the torque of the electric motor is controlled based on a plurality of sensed properties of the wrap for providing a plurality of feed rates that are regulated relative to the bale forming rate for controlling the stretch of a plurality of portions of the wrap as the wrap is transferred onto the rotating agricultural product module. The plurality of properties of the wrap may be sensed using one or more of the sheet property sensor 130 or the like, or communicated to the system as manufacturer's data received from the roll tag reader/sensor 144, or the like.

In an implementation, the torque of the electric motor is controlled based on one or more sensed environmental conditions such as temperature, for example, for providing the first feed rate that is regulated relative to the bale forming rate for controlling the stretch of the first portion of the wrap as the wrap is transferred onto the rotating agricultural product module. The environmental properties may be sensed during the wrapping process using the temperature and/or humidity sensor 134, or the like.

Tension desired to stretch an elastic material to a given degree varies with the temperature. This would need to be taken into account to establishing the target feeding torque, but could easily be pre-defined. In addition the system uses the temperature and/or humidity feedback signal(s) 136 from the temperature and/or humidity sensor 134.

As mentioned above, the temperature significantly impacts an elastic material. For a fixed-ratio system, it is typical for cover-edge width to be less in hot temperatures and more in cold temperature. An electric drive of an implementation would allow this to be easily adjusted to attain the desired cover-edge. A higher stretch target in cold temps to decrease the cover-edge width and make it lay more flat on the face of the bale, and perhaps a lower stretch target in hot temperatures where cover-edge may be more narrow than desired.

The implementations using one or more electric motors herein (full electric implementation) provide for less abrupt separation between sheets at the separation zones 401. It is common practice for the wrap to be pre-portioned and connected to one another via a patented "Z-lock" system. The current fixed-ratio chain drive system abruptly separates by applying a sudden brake via the electric clutch. An electric drive in accordance with the implementations herein ramps down the speed in a controlled manner that would allow a much 'softer' separation. In certain conditions, the abrupt separation can cause a snap-back of the wrap which is undesirable, and can have a negative effect on the trailing edge of the wrap being fed, and the feeding of the leading edge of the next portion.

The implementations herein further provides for a reversing capability. The drive mechanism would provide easy reversing capabilities of the feeding system. This would be used at every roll change as there is a tail on the spent wrap roll core than needs to be re-wound before loading the next full roll. This is currently manually done now but could be done with the touch of a button with an electric drive. In the event of a misfeed, this reverser would also likely get used.

In an implementation, the drive mechanism 520 of the wrap delivery system 500 is responsive to a feed control signal from the wrap delivery control module 550 to supply wrap carried on roll 280 disposed in a wrapping assembly 90 to an associated baler rotating an agricultural product module using an endless member moving at a bale forming rate by directing a leading end of the wrap to a nip formed between the rotating agricultural product module and the moving endless member, feeding a first portion of the wrap to the nip at a first feed rate relative to the bale forming rate to transfer the first portion of the wrap onto the rotating agricultural product module under a first wrap condition, and reversing the feeding to re-spool an unspent portion of the wrap back onto the roll 280 disposed in the wrapping assembly 90.

In an implementation, the drive mechanism 520 that reverses the sheet feeding to re-spool an unspent portion of the wrap back onto the roll 280 disposed in the wrapping assembly 90 is an electric motor. In a further implementation, the drive mechanism 520 that selectively re-spools the wrap is an electromechanical apparatus comprising various mechanisms including for example gears, clutches, brakes, pulleys and the like. In a further implementation, the drive mechanism 520 is an electromechanical apparatus comprising one or more electric motors, gears, clutches, brakes, pulleys, transmissions, and the like. However, it is to be appreciated that in alternative implementations the drive mechanism 520 is a hydraulic motor or by any other drive system as may be necessary or desired including for example by direct or indirect coupling with the power module 45. In further alternative implementations the drive mechanism 520 is an electric and/or hydraulic motor in combination with a mechanical and/or hydraulic braking mechanism such as suitably-sized and arranged friction disk brakes or the like for applying counter torque on the sheet as necessary or desired. In still further alternative implementations the drive mechanism 520 is an electric and/or hydraulic motor in combination with a mechanical and/or hydraulic gear system including for example a multiple (>1) speed gear system, a continuously variable transmission (CVT) or any other mechanism for applying counter torque on the sheet as it is pulled by the portion located in the nip 191 (FIG. 2) as necessary or desired.

In an implementation, the wrap delivery system 500 is responsive to an automated signal indicating an end of the wrap roll and/or an end of a previous sheet wrapped onto the agricultural product module to automatically reverse the feeding and re-spool the unspent portion of the wrap back onto the roll 280 disposed in the wrapping assembly 90. The automated end of wrap roll signal may be generated by the sheet property sensor 130, or the like, for example.

In an implementation, the wrap delivery system 500 is responsive to a manual signal indicating an end of the wrap roll to selectively reverse the feeding and re-spool the unspent portion of the wrap back onto the roll 280 disposed in the wrapping assembly 90. The manual end of wrap roll signal may comprise an input received by the wrap delivery system 500 from an operator of the harvester, for example.

The implementations herein using one or more electric motors including for example full electric implementation, as well as those implementations using an elastic wrapping material further provide for improved utilization of wrap/leading edge fully stretched. The distance between the lower wrap feed roll to the pinch point of the baler belts and cotton module is in practice approximately 2.6 meters. At the moment that the leading edge of the wrap gets pinched and the round module builder begins pulling on the wrap, there is essentially no stretch in that 2.6 meters of wrap. Once a torque reversal is sensed, the electric drive could momentarily pause to fully stretch the 2.6 meters to the amount. This would allow the total length of the wrap to be reduced by that amount. Current wrap length in practice is about 21 meters in length. The torque on the motor driving the roller paying out the wrap is "reversed" in the sense that the torque in a first rotational direction works to pay out the wrap to feed it to the nip and becomes reversed as the lead edge gets caught in the nip and begins to starts to pull the wrap into the nip and onto the module. On 2.6 meters of wrap, this equates to about 0.25-0.40 meters of 'bonus' wrap length. In addition and in accordance with an aspect, the wrap is payed out by the control system 500 in a sense that the control system imposes a tensioning control over the wrap as it is surrendered from the feed rollers to the pull of the nip in the various controlled fashions described herein.

In an implementation, a wrap delivery system controls delivery of a sheet of wrap from a wrap roll hopper of an associated harvester to a rotating agricultural product module in a module builder of the associated harvester, by feeding a leading end of the wrap to a nip 191 formed between the rotating agricultural product module and the moving endless member, sensing a counter torque on the sheet as it is pulled by the portion located in the nip 191, temporarily suspending the sheet feeding to stretch a first portion of the sheet between the nip 191 and the one or more feed roller(s) onto the rotating agricultural product module in a first stretched wrap condition, and then resuming the feeding to deliver a second portion of the wrap to the nip at a selected feed rate relative to the bale forming rate to transfer the second portion of the wrap onto the rotating agricultural product module under a desired second stretched wrap condition. In an implementation, the first and second stretched wrap conditions are the same. In a further implementation, the first and second stretched wrap conditions are the different.

Figure 16:
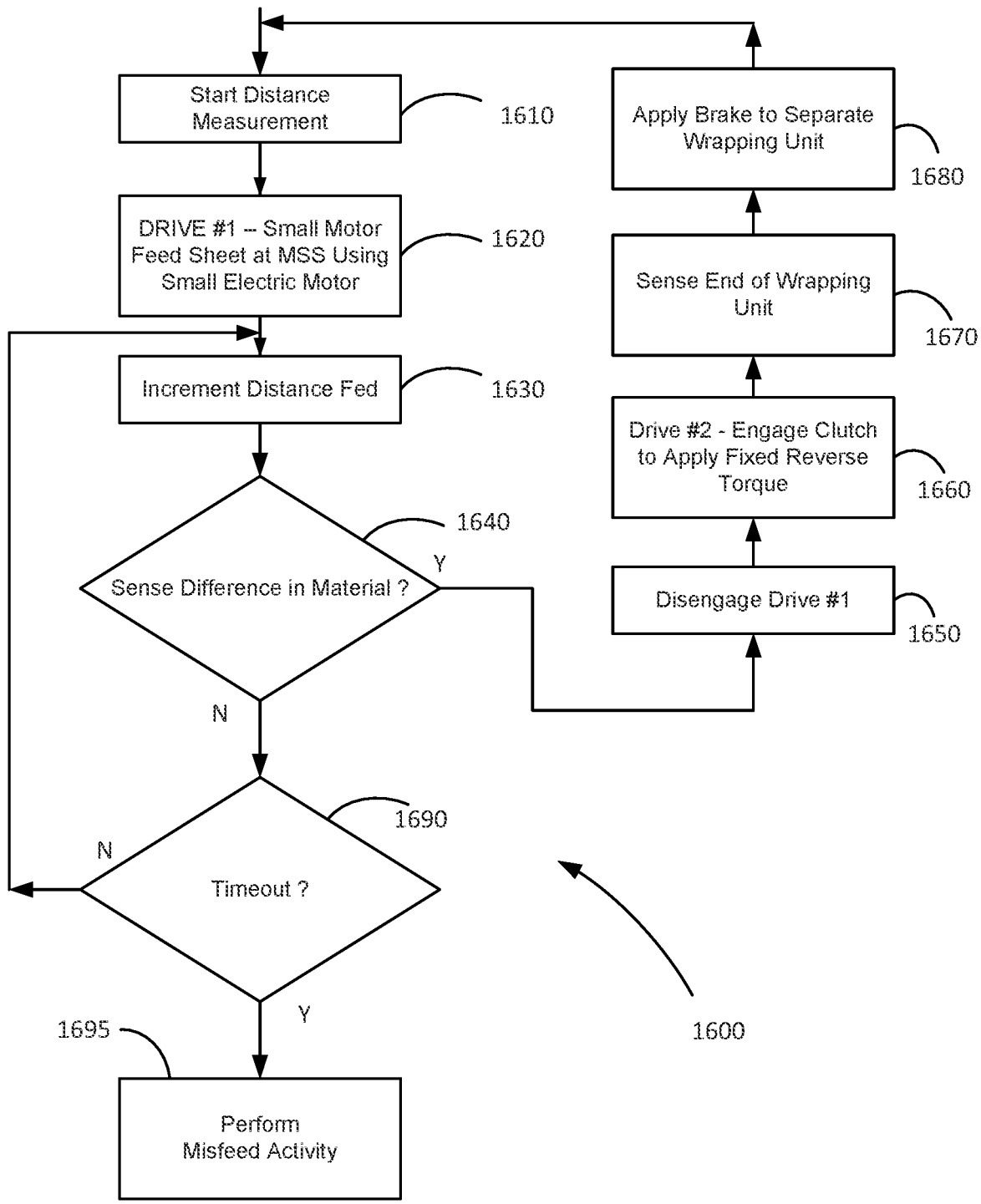
FIG. 16 shows a flow diagram of a method for controlling delivery of a sheet of wrap material using a combination motor and gear system drive mechanism in accordance with an implementation.

FIG. 16 shows a flow diagram of a method 1600 for controlling delivery of a sheet of wrap material using a combination motor and gear system drive mechanism in accordance with an implementation. In further alternative implementations the drive mechanism 520 is a small electric and/or hydraulic motor in combination with a mechanical and/or hydraulic gear system including for example a multiple (>1) speed gear system, a continuously variable transmission (CVT) or any other mechanism for applying counter torque on the sheet as necessary or desired.

Utilizing a motor and in particular a small electric motor in combination with a gear system drive mechanism to power the wrap feeding system provides many benefits. These include misfeed detection for example as well as reduced size because the small electric motor can be used to initially pay out the leading portion of the sheet material until it enters into the forward nip since no counter torque is required at that time in the wrap process. The counter torque may thereafter be provided using the gear system drive mechanism whereby the sheet feed speed can be controlled relative to the module surface speed for ensuring sufficient wrap stretch and without the need for a large motor providing the counter torque.

In an implementation, the drive mechanism 520 includes an the auxiliary device 1110 such as for example an electric motor 1120 in combination with a gear system drive mechanism. However, it is to be appreciated that in alternative implementations the drive mechanism 520 is a hydraulic motor or by any other drive system as may be necessary or desired including for example by direct or indirect coupling with the power module 45 in combination with a gear system drive mechanism. In further alternative implementations the drive mechanism 520 is an electric and/or hydraulic motor in combination with a mechanical and/or hydraulic braking mechanism for applying counter torque on the sheet as necessary or desired. In still further alternative implementations the drive mechanism 520 is an electric and/or hydraulic motor in combination with a mechanical and/or hydraulic gear system including for example a multiple (>1) speed gear system, a continuously variable transmission (CVT) or any other mechanism for applying counter torque on the sheet as necessary or desired.

In the method 1600 a distance measurement is initiated in action 1610. For misfeed detection and in general, the leading edge of the sheet of wrap material must travel while being fed at 1620 some distance before it is engaged by the baler. During this time the feed distance is incremented at action 1630. The linear speed of the wrap at this point, and during the feeding cycle, is some percentage slower than the liner speed of the baler belts to impart stretch. Once the wrap is pinched between the baler belts and the cotton bale, due to the different speeds of the wrap feed rolls and the baler belts, the stretching begins. At this point the systems monitors the wrapping material in action 1640 for a change in the property of the material such as for example monitoring and detecting a change in material from a paper to a plastic material. The system can monitor for this change in material, and if it does not occur in a predetermined amount of time as determined at 1690 this may indicate a misfeed, and the feeding process can be stopped in favor of a misfeed activity such as for example sounding an alarm such as an audible annunciator or displaying a visual message on a screen for observation by an operator. At this point, the operator can be alerted or it may offer the opportunity automatically take pre-defined steps to address the misfeed so that operator involvement is not necessary. On the other hand if the different material transition is detected at 1640 within the timeout period the drive system #1 including the auxiliary device 1110 such as for example the electric motor 1120 is disengaged at action 1650, and the drive system #2 including the gear system is engaged at action 1660 for applying a fixed reverse torque to the sheet of wrap material. It is to be appreciated that this approach can be retro-fitted on existing machines to enable the use of such alternate wraps. The end of the wrap sheet is detected at 1670 and the brake is applied at 1680 to separate the wrap sheet from the second wrap sheet at the transition area.

While the control system 500 and blocks 1650-1680 have been described and shown sequentially, this disclosure is not limited to the particular sequence shown. Many of the blocks 1650-1680 can be executed by the controller 500 in a different sequence. Further still, in one implementation, many of the blocks 1650-1680 may be executed by the controller 500 at substantially the same time. A person having skill in the relevant art understands that the controller 500 may execute the blocks 1650-1680 in many difference sequences and at different times without straying from the teachings of this disclosure. Accordingly, this disclosure is not limited to the sequence of the control system 500 shown in FIG. 16.

This approach permits the very stiff material portion of the sheet of wrap material to be fed first, followed by the elastic material portion of the sheet of wrap material.

In a further implementation, any of the wrap protocols such as shown and described in connection with FIGS. 6A-6F, and/or others, for example may be executed or otherwise performed at action 1660 if instead of applying the gear system, a mechanical and/or hydraulic braking mechanism is used for applying counter torque on the sheet as necessary or desired. In still further alternative implementations the drive mechanism 520 is an electric and/or hydraulic motor in combination with a mechanical and/or hydraulic gear system including for example a multiple (>1) speed gear system, a continuously variable transmission (CVT) or any other mechanism for applying counter torque on the sheet as necessary or desired.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative implementation(s) have been shown and described and that all changes and modifications that come within the spirit of the present disclosure are desired to be protected. Alternative implementations of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A wrap delivery system for controlling delivery of a sheet of wrap from a wrap roll hopper of an associated harvester to a module builder of the associated harvester, the wrap delivery system comprising:
   a sheet drive system comprising:
      an output member operably coupled with an associated wrap feed mechanism of the associated harvester engaged with the wrap, the output member being configured to drive the associated wrap feed mechanism of the associated harvester engaged with the wrap; and
      a drive mechanism operably coupled with the output member, the drive mechanism being configured to operate the output member responsive to a feed control signal to pay out the sheet of the wrap from the wrap roll hopper;
   a sensor operably coupled with the sheet drive system, the sensor being operable to detect a property of the sheet of the wrap; and
   a wrap delivery control module operably coupled with the sheet drive system, the wrap delivery control module comprising:
      an output circuit operable to generate the feed control signal for controlling the sheet drive system to automatically pay out the sheet of the wrap at a sheet feed rate based on the detected property of the sheet of the wrap.

2. The wrap delivery system according to claim 1, wherein:
   the output circuit of the wrap delivery control module is operable to generate the feed control signal for controlling the sheet drive system to:
      pay out a first portion of the sheet of the wrap from the wrap roll hopper at a first sheet feed rate $SF_1$ substantially matching a surface speed SS of a round module rotating in the module builder of the associated harvester; and
      pay out a second portion of the sheet of the wrap from the wrap roll hopper at a second sheet feed rate $SF_2$ mismatching the surface speed SS of a round module rotating in the module builder of the associated harvester for a first portion of the sheet.

3. The wrap delivery system according to claim 1, wherein:
   the wrap delivery control module comprises:
      an input circuit operable to receive:
         a module property signal representative of a property of the round module rotating in the module builder of the associated harvester; and
         the wrap delivery control module is operable to generate the feed control signal based on the received module property signal.

4. The wrap delivery system according to claim 3, wherein:
   the input circuit is operable to receive a module speed signal as the module property signal, the module speed signal being representative of a surface speed SS of the round module rotating in the module builder of the associated harvester; and
   the wrap delivery control module is operable to generate the feed control signal based on the module speed signal to pay out a first portion of the sheet of the wrap from the wrap roll hopper at a first sheet feed rate $SF_1$ matching the surface speed SS of the round module, and to pay out a second portion of the sheet of the wrap from the wrap roll hopper at a second sheet feed rate $SF_2$ less than the surface speed SS of the round module rotating in the module builder of the associated harvester.

5. The wrap delivery system according to claim 3, wherein:
   the wrap delivery control module comprises:
      a memory device storing feed control logic; and
      a processor device operatively coupled with the memory device, the input circuit, and the input circuit, the processor device being operable to execute the feed control logic to generate feed control data based on the module property signal received by the wrap delivery system; and
   the output circuit of the wrap delivery control module generates the feed control signal based on the feed control data to pay out a first portion of the sheet of the wrap at a first sheet feed rate $SF_1$ and pay out a second portion of the sheet of the wrap at a second sheet feed rate $SF_2$ different than the first sheet feed rate $SF_1$.

6. The wrap delivery system according to claim 1, wherein the sensor comprises:
   a sheet transition sensor operably coupled with the wrap delivery control module, the sheet transition sensor being operable to detect the property of the sheet of the wrap by detecting a boundary between a first portion of the sheet and a second portion of the sheet and to generate a sheet transition location signal representative of a location on the sheet along a longitudinal axis X of the sheet of the boundary between a first portion and a second portion of the sheet,
   wherein the sheet drive system pays out via the output member the sheet of the wrap from the wrap roll hopper in a feed direction defining the longitudinal axis X of the sheet,
   wherein the wrap delivery control module is operable to generate the feed control signal for controlling the sheet drive system to pay out the first portion of the sheet of the wrap at a first sheet feed rate $SF_1$ and pay out the second portion of the sheet of the wrap at a second sheet feed rate $SF_2$ different than the first sheet feed rate $SF_1$ based on the sheet transition location signal.

7. The wrap delivery system according to claim 1, wherein the sheet drive system comprises:
   a first set of gears configured to pay out a first portion of the sheet of the wrap from the wrap roll hopper at a first sheet feed rate $SF_1$; and
   a second set of gears configured to pay out a second portion of the sheet of the wrap from the wrap roll hopper at a second sheet feed rate $SF_2$.

8. The wrap delivery system according to claim 1, wherein:
   the sensor comprises a roll tag reader configured to detect the property of the sheet of the wrap by reading manufacturer data from a roll of the sheet of wrap disposed in the wrap roll hopper of the associated harvester; and
   the output circuit of the wrap delivery control module operates to generate the feed control signal for controlling the sheet drive system to automatically pay out the sheet of the wrap at a sheet feed rate based on the manufacturer data read from the roll of the sheet of wrap.

9. The wrap delivery system according to claim 1, wherein:
the sensor comprises an environment sensor configured to detect the property of the sheet of the wrap by sensing an environmental condition of the wrap delivery system; and
the output circuit of the wrap delivery control module operates to generate the feed control signal for controlling the sheet drive system to automatically pay out the sheet of the wrap at a sheet feed rate based on the sensed environmental condition of the wrap delivery system.

10. A method of supplying wrap to an associated baler rotating an agricultural product module using an endless member moving at a bale forming rate, the method comprising:
detecting a property of the wrap;
directing a leading end of the wrap to a nip formed between the rotating agricultural product module and the moving endless member; and
automatically delivering the wrap to the nip at a feed rate relative to the bale forming rate to transfer the onto the rotating agricultural product module under a wrap condition based on the detected property of the wrap.

11. The method according to claim 10, further comprising:
delivering a first portion of the wrap to the nip at
a first feed rate substantially the same as the bale forming rate of the moving endless member; and
delivering a second portion of the wrap to the nip at
a second feed rate different than the bale forming rate of the moving endless member.

12. The method according to claim 11, wherein:
the delivering the first portion of the wrap to the nip comprises delivering a substantially inelastic portion or a stiff plastic portion of the wrap to the nip; and
the delivering the second portion of the wrap to the nip comprises delivering an elastic plastic portion of the wrap to the nip.

13. The method according to claim 10, further comprising:
delivering a first portion of the wrap to the nip at a first feed rate relative to the bale forming rate to transfer the first portion of the wrap onto the rotating agricultural product module based on the detected property of the wrap under an un-stretched wrap condition; and
delivering a second portion of the wrap to the nip at a second feed rate relative to the bale forming rate to transfer the second portion of the wrap onto the rotating agricultural product module based on the detected property of the wrap under a stretched wrap condition.

14. The method according to claim 13, wherein:
the first feed rate relative to the bale forming rate is different than the second feed rate relative to the bale forming rate.

15. The method according to claim 14, wherein:
the first feed rate relative to the bale forming rate is less than the second feed rate relative to the bale forming rate.

16. The method according to claim 10, wherein:
the automatically delivering the wrap to the nip at the feed rate based on the detected property of the wrap comprises:
delivering a first portion of the wrap to the nip at a first feed rate relative to the bale forming rate configured to transfer the first portion of the wrap onto the rotating agricultural product module under a stretched wrap condition; and
delivering a second portion of the wrap to the nip at a second feed rate relative to the bale forming rate configured to transfer the second portion of the wrap onto the rotating agricultural product module under a stretched wrap condition;
the first feed rate is less than bale forming rate;
the second feed rate is less than the bale forming rate;
the delivering the first portion of the wrap to the nip comprises delivering an extensible portion of the wrap to the nip; and
the delivering the second portion of the wrap to the nip comprises delivering an elastic plastic or stiff plastic portion of the wrap to the nip.

17. The method according to claim 16, wherein:
the first feed rate is substantially the same as the second feed rate.

18. The method according to claim 10, further comprising:
detecting the property of the wrap by sensing a first property of a first portion of the wrap and sensing a second property of a second portion of the wrap;
delivering the first portion of the wrap comprising a first material to the nip at a first feed rate relative to the bale forming rate based on the sensed first property of the wrap; and
delivering the second portion of the wrap comprising a second material to the nip at a second feed rate relative to the bale forming rate based on the sensed second property of the wrap,
wherein the first and second feed rates are different.

19. The method according to claim 18, wherein:
the delivering the second portion of the wrap comprising the second material to the nip comprises:
delivering the second portion of the wrap comprising a second material different than the first material to the nip.

20. The method according to claim 10, further comprising:
detecting the property of the wrap by reading manufacturer data from a roll of the wrap disposed in a wrap roll hopper of an associated harvester; and
automatically delivering the wrap to the nip at a feed rate relative to the bale forming rate to transfer the wrap onto the rotating agricultural product module under a wrap condition based on the manufacturer data read from the roll of the wrap.

21. The method according to claim 10, further comprising:
detecting the property of the wrap by sensing an environment condition of the wrap; and
automatically delivering the wrap to the nip at a feed rate relative to the bale forming rate to transfer the wrap onto the rotating agricultural product module under a wrap condition based on the sensed environmental condition.

* * * * *